United States Patent [19]
Conti et al.

[11] Patent Number: 5,465,660
[45] Date of Patent: Nov. 14, 1995

[54] AIRCRAFT TRASH COLLECTION AND COMPACTING APPARATUS

[75] Inventors: Walter Conti, Woodside; William R. Feemster, Malibu; Jeffrey L. Felts, Poppy Meadow; Antony J. Fields, San Francisco; Robert W. Henderson, Claremont; Paul L. Howard, Palo Alto; Kevin F. Kaub, Palmdale; Joel A. Lederman, Canoga Park; Thomas M. Lee, Sherman Oaks; Gilbert Martinez, Castaic; Mark H. Mathews, Northridge; Ravi V. Patel, Newhall; Michael W. Waldrep, Santa Clarita; John H. Wetzel, Glendora, all of Calif.

[73] Assignee: Aero-Design Technology, Valencia, Calif.

[21] Appl. No.: 198,072

[22] Filed: Feb. 16, 1994

[51] Int. Cl.⁶ ........................................... B30B 15/06
[52] U.S. Cl. ................ 100/48; 100/53; 100/100; 100/131; 100/221; 100/226; 100/229 A; 280/47.34
[58] Field of Search ................ 100/48, 53, 100, 100/131, 221, 224, 226, 229 A, 269 R; 280/47.34, 47.35, 79.2, 79.5

[56] References Cited

U.S. PATENT DOCUMENTS

| | | |
|---|---|---|
| 583,462 | 6/1897 | Dederick . |
| 3,514,969 | 6/1970 | Harza . |
| 3,557,683 | 1/1971 | Boyd . |
| 3,734,006 | 5/1973 | Hennells . |
| 3,748,820 | 7/1973 | Fox . |
| 3,754,503 | 8/1973 | Hennells . |
| 3,808,766 | 5/1974 | Hutchinson et al. . |
| 3,831,513 | 8/1974 | Tashman ................................ 100/100 |
| 3,838,636 | 10/1974 | Engebretsen . |
| 3,853,052 | 12/1974 | Engebretsen . |
| 3,861,117 | 1/1975 | DeFilippi . |
| 3,863,561 | 2/1975 | Karls ..................................... 100/100 |
| 3,890,890 | 6/1975 | Hennells ............................. 100/229 A |
| 3,910,181 | 10/1975 | Andrews et al. . |
| 3,945,313 | 3/1976 | Komberec et al. . |
| 3,945,314 | 3/1976 | Hennells ............................. 100/229 A |
| 3,953,956 | 5/1976 | Massman . |
| 3,967,548 | 7/1976 | Moriconi ............................. 100/229 A |
| 4,044,569 | 8/1976 | Harza . |
| 4,064,798 | 12/1977 | Wolbrink et al. . |

(List continued on next page.)

FOREIGN PATENT DOCUMENTS

| | | | |
|---|---|---|---|
| 564467 | 7/1975 | Switzerland ........................ 100/229 A |

OTHER PUBLICATIONS

Godfrey Aerospace—In Flight Trash Compactor Type GTC brochure, No Date.
Orwak—Multiple Bin Recycling Baler advertisement, "Resource Recycling" Dec. 1991.

*Primary Examiner*—Stephen F. Gerrity
*Attorney, Agent, or Firm*—Kelly, Bauersfeld & Lowry

[57] ABSTRACT

A trash collection and compacting apparatus primarily intended for use onboard an aircraft comprising a stationary compactor unit and interrelated movable wheeled trolley unit, the trolley unit having a plurality of separate trash collection chambers into which trash is deposited and compacted and support rails for supporting the trolley unit on the compactor unit for the direct compaction of trash in the trolley. The trolley unit also has separable sides to facilitate removal of compacted trash, and multiple fail safe locks and latches to ensure that the sides are not inadvertently separated during trash collection and compaction. Fire doors are provided to close the chambers, and removable trash bins are disposed in each trash chamber to facilitate handling of compacted trash, the bins having separable sides for emptying the compacted trash therefrom. The compactor unit includes a compaction ram mounted on a carriage assembly for movement into discrete positions overlying each collection chamber of the trolley unit and supports the trolley so that compaction forces are not transmitted to the aircraft.

79 Claims, 22 Drawing Sheets

U.S. PATENT DOCUMENTS

| | | |
|---|---|---|
| 4,072,097 | 2/1978 | Seibel . |
| 4,119,028 | 10/1978 | Khan . |
| 4,130,054 | 12/1978 | Tashman . |
| 4,156,386 | 5/1979 | Gould ................................. 100/229 A |
| 4,188,872 | 2/1980 | Chrablow . |
| 4,414,788 | 11/1983 | Berg . |
| 4,444,099 | 4/1984 | Paleschuck . |
| 4,620,479 | 11/1986 | Diamond et al. . |
| 4,700,623 | 10/1987 | Durbin et al. . |
| 4,711,390 | 12/1987 | Andrews et al. . |
| 4,719,852 | 1/1988 | Durbin et al. . |
| 4,729,303 | 3/1988 | Durbin ................................. 100/229 A |
| 4,821,903 | 4/1989 | Hayes ................................. 280/47.34 |
| 5,024,151 | 6/1991 | Girardin et al. .................... 100/229 A |
| 5,263,412 | 11/1993 | Chenard et al. .................... 100/229 A |

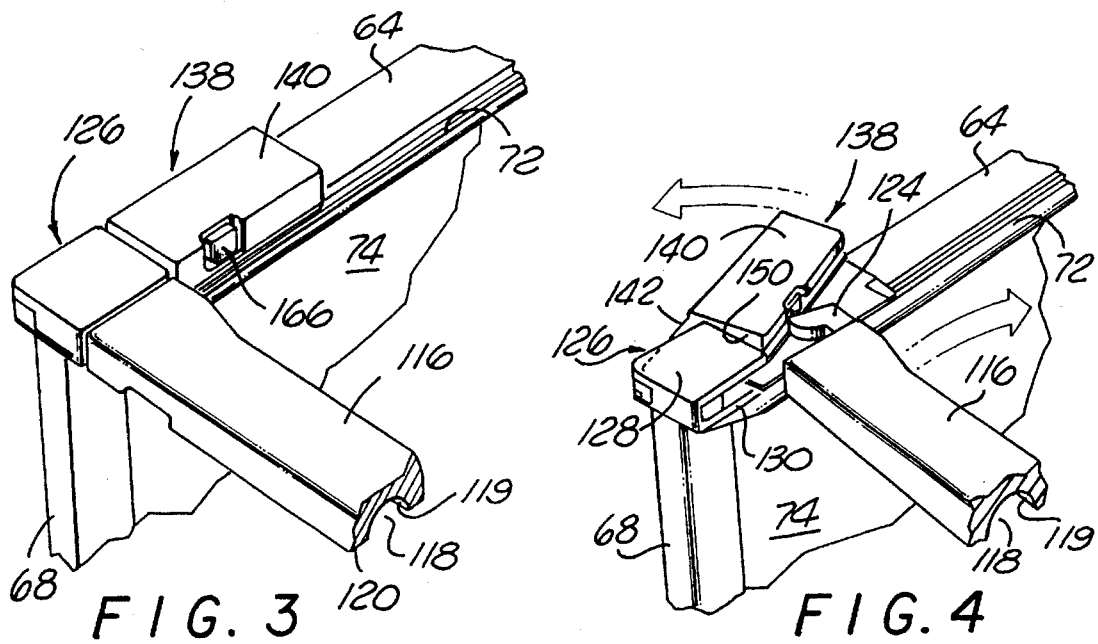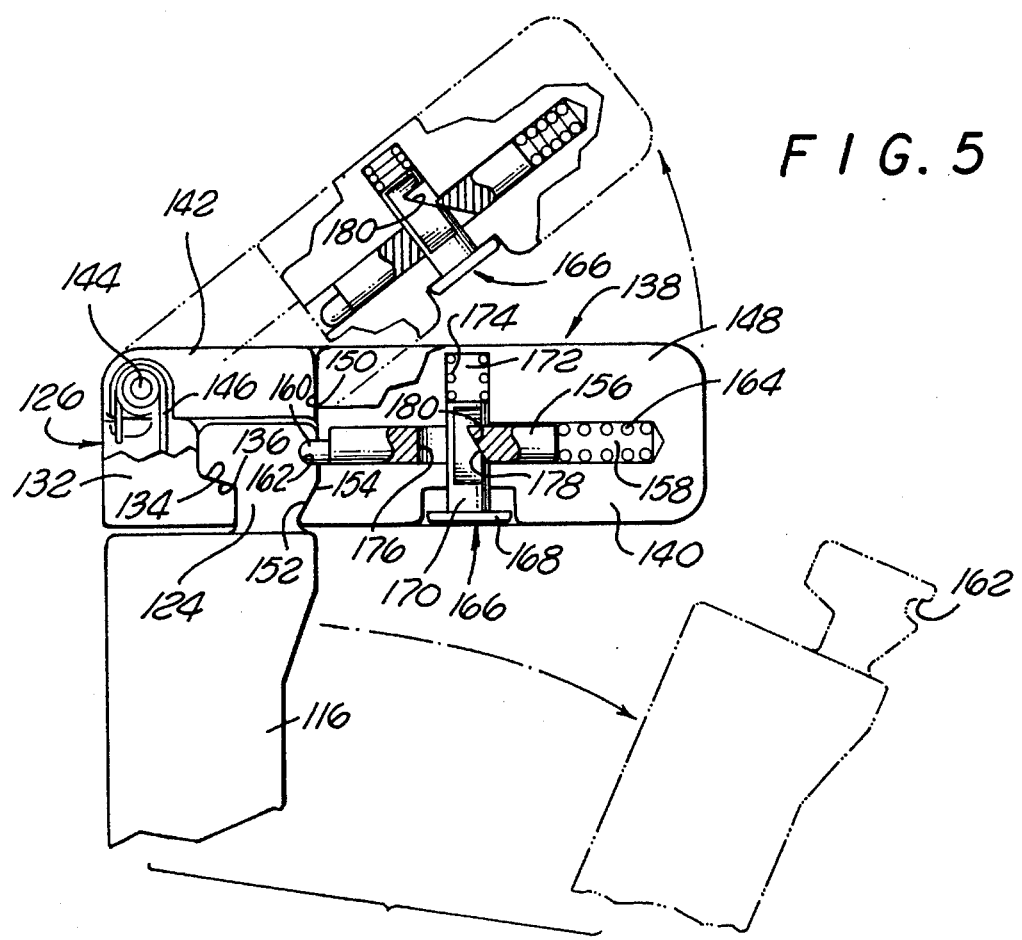

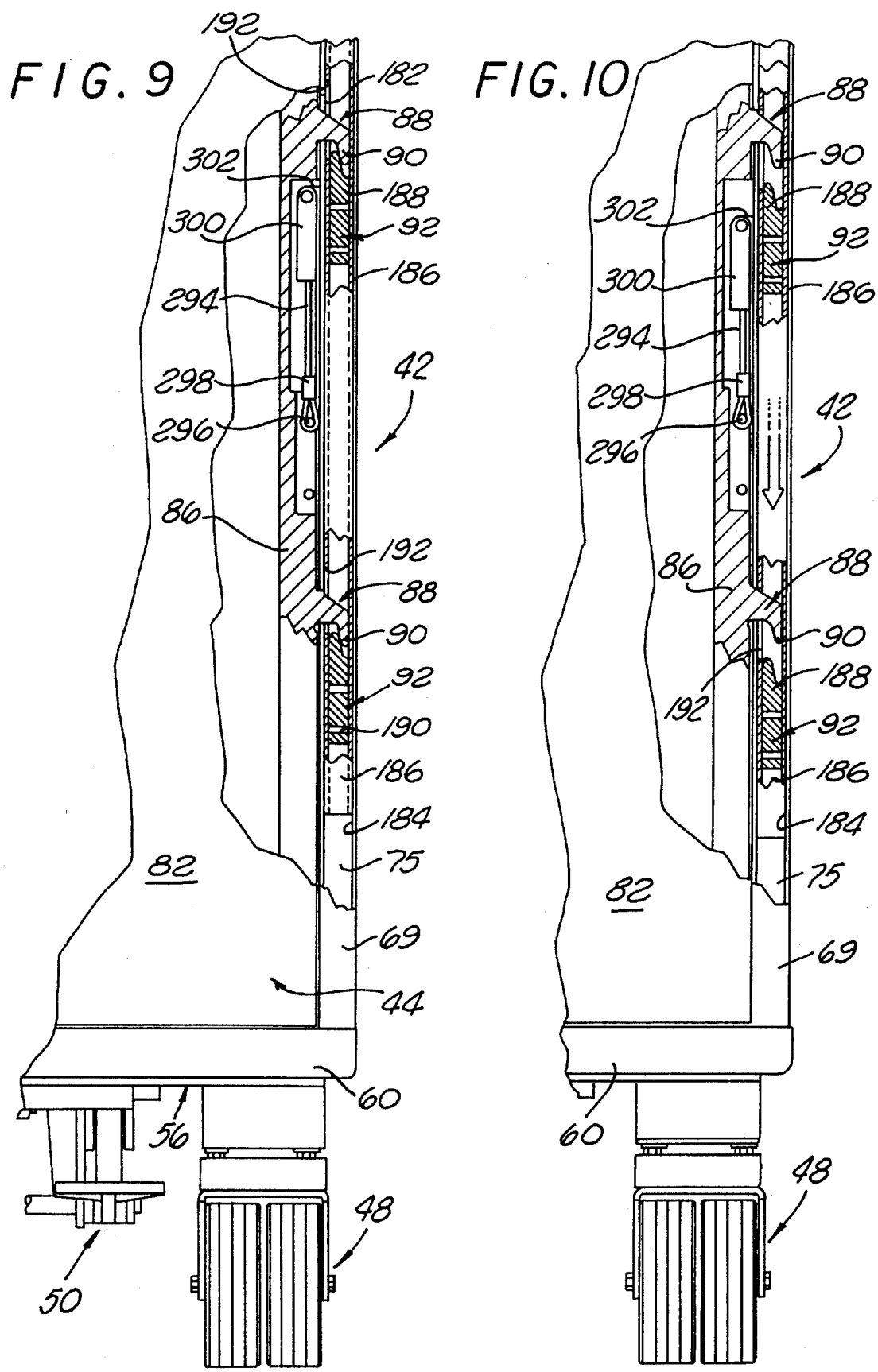

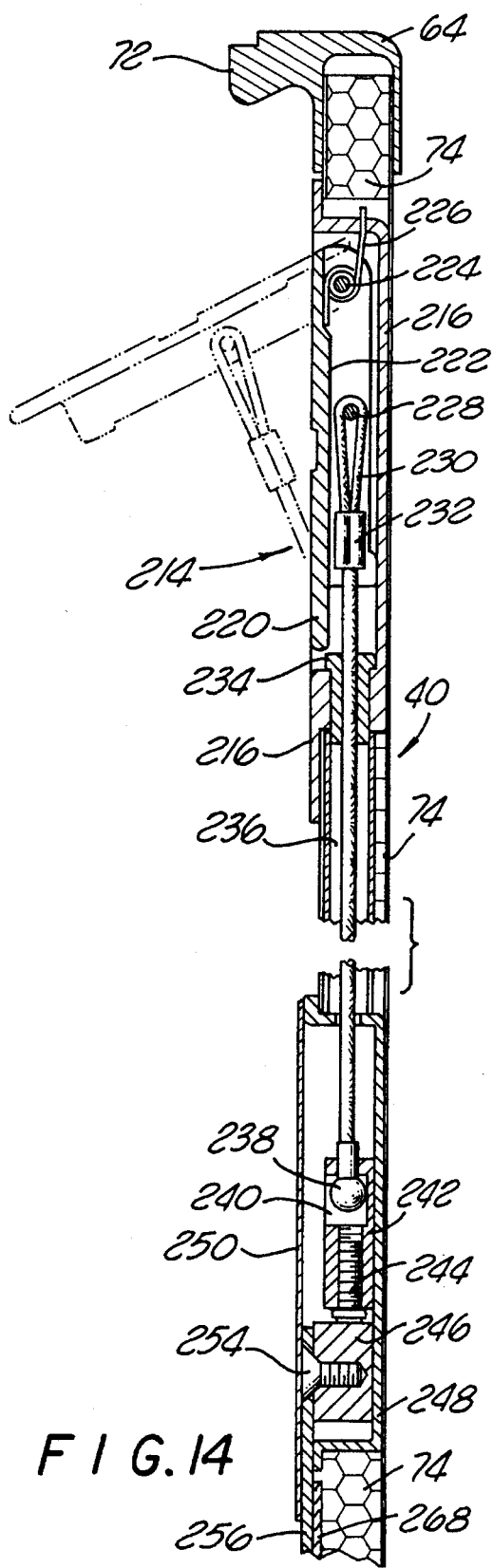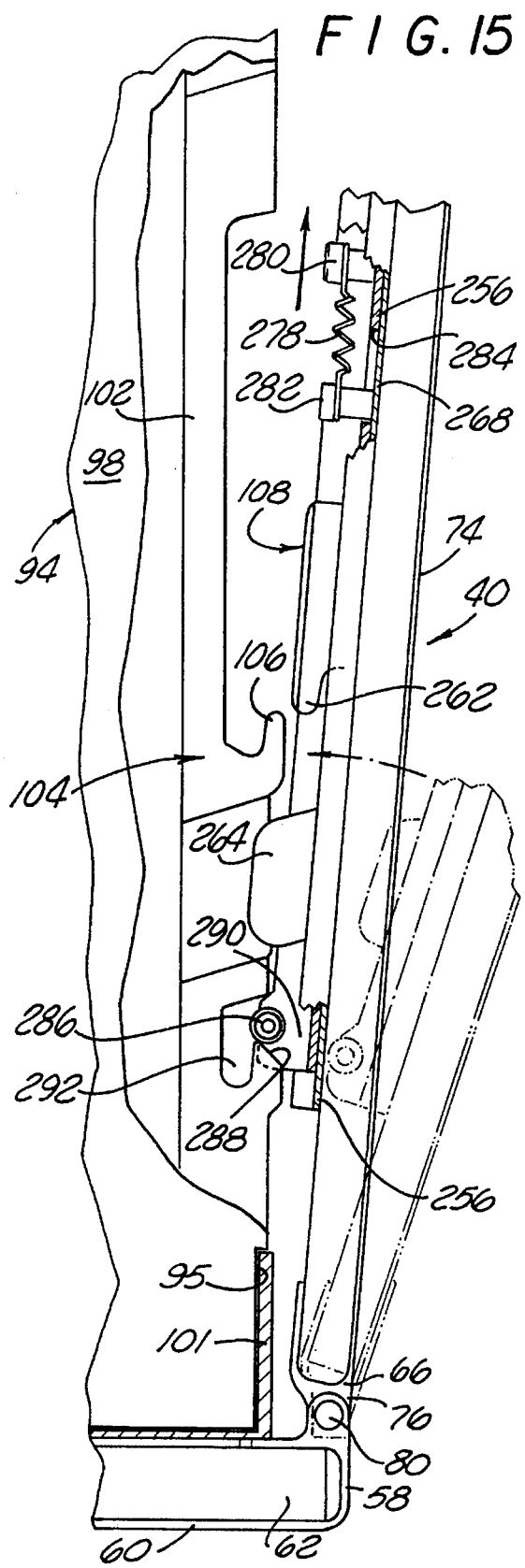

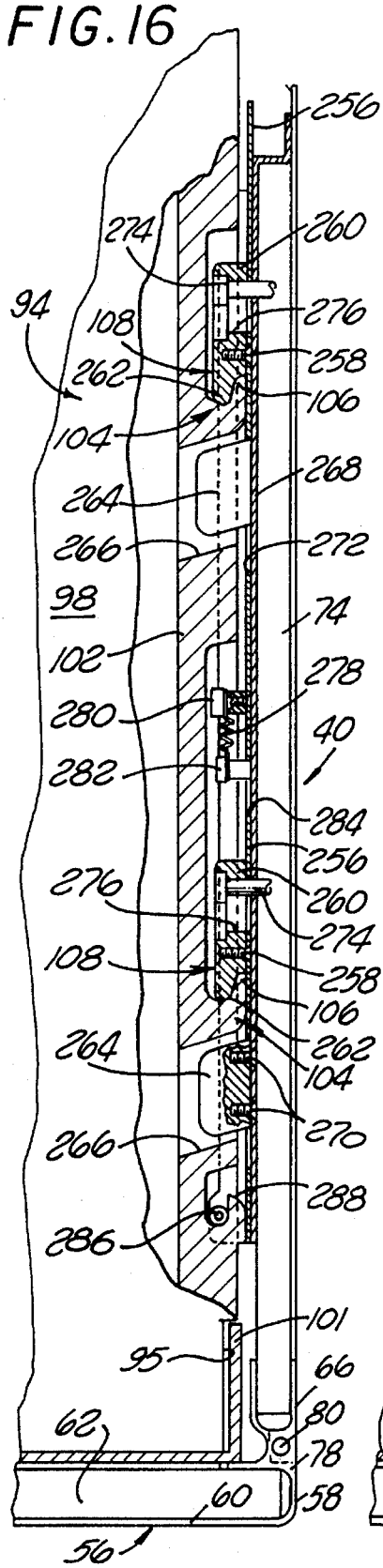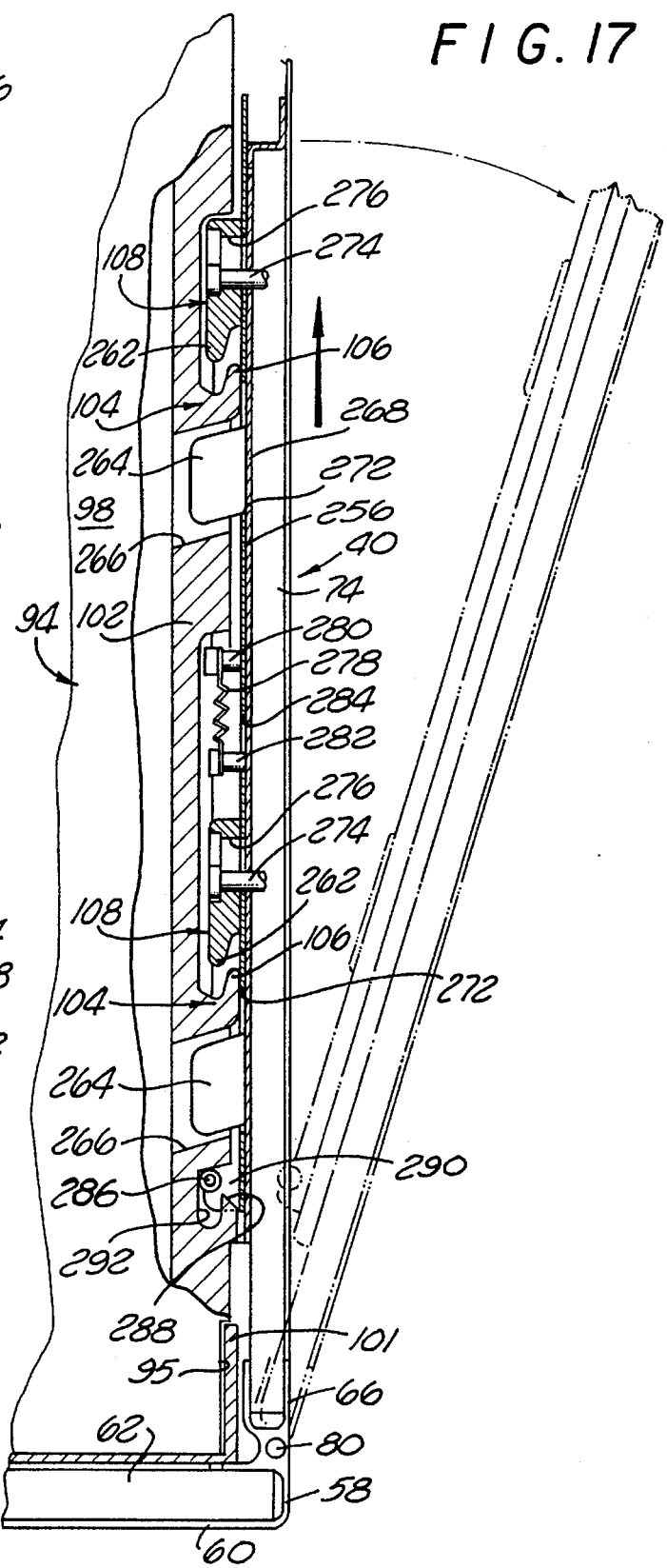

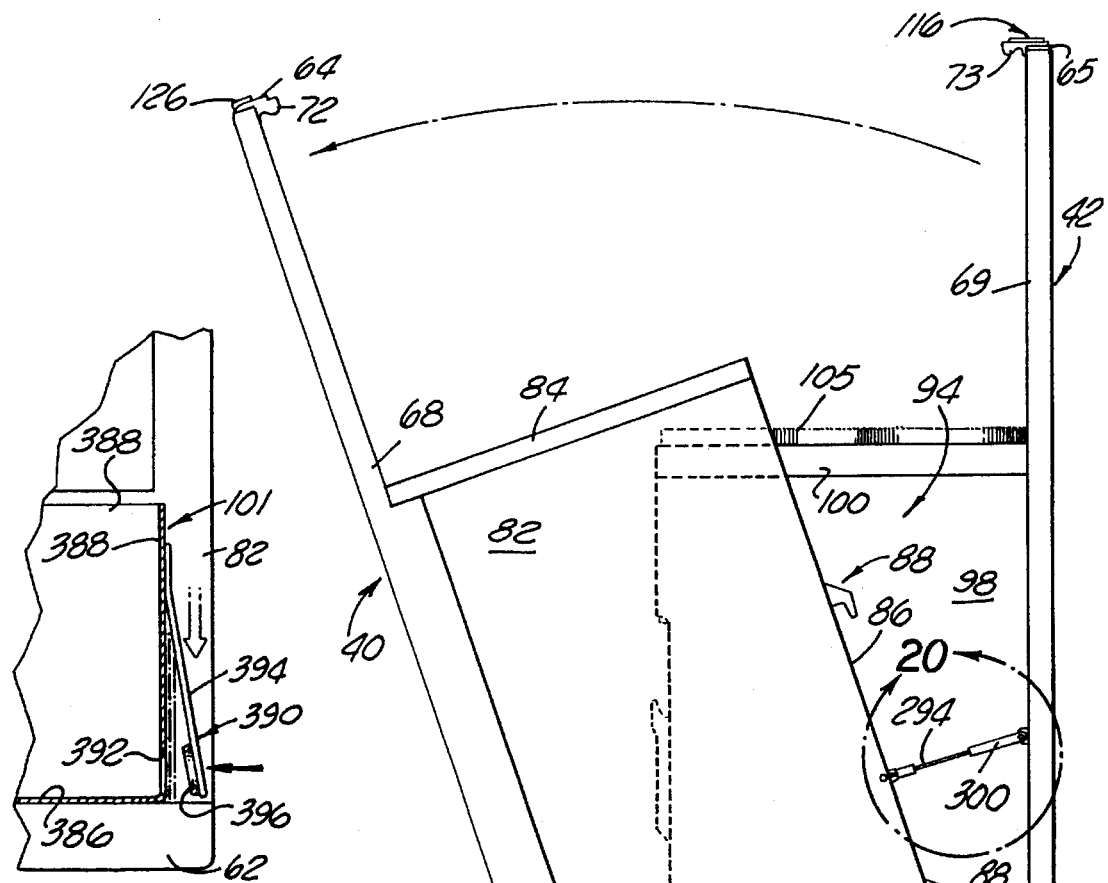
FIG. 19
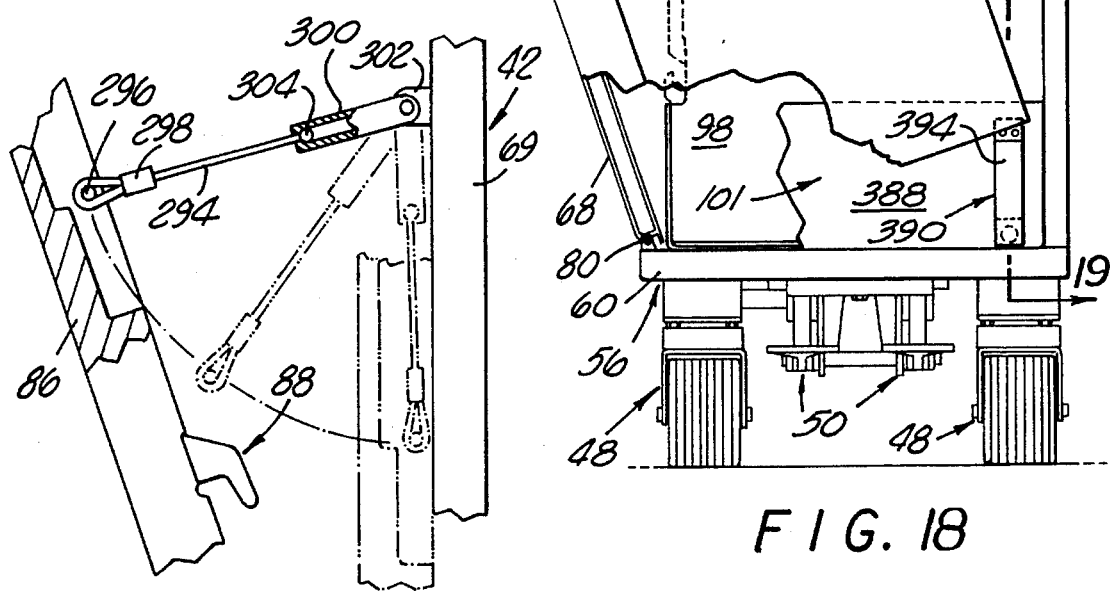
FIG. 20
FIG. 18

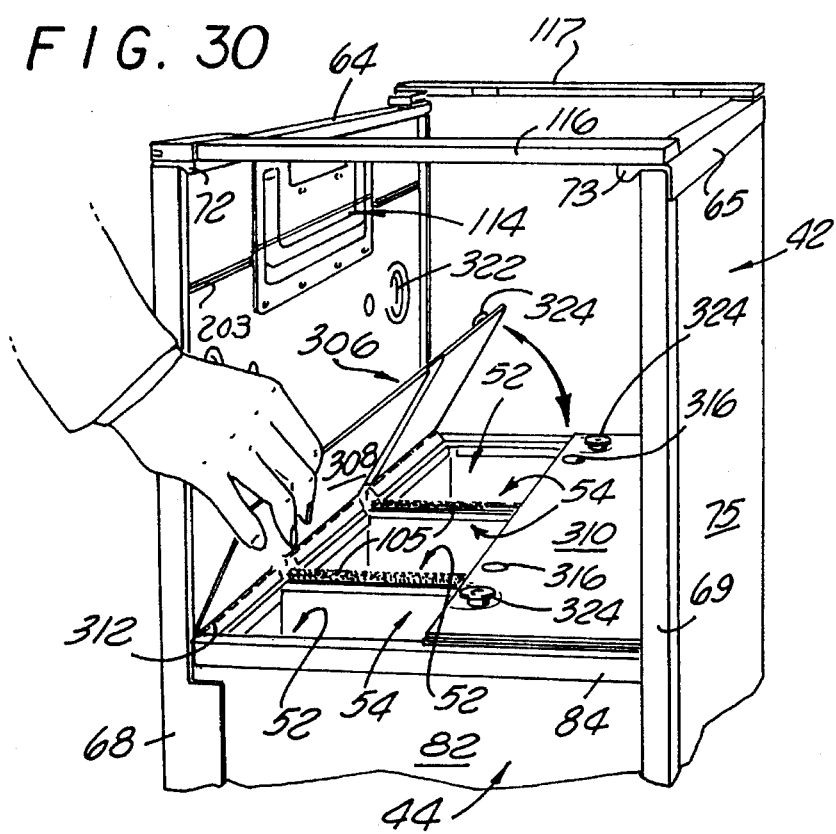
FIG. 30
FIG. 32
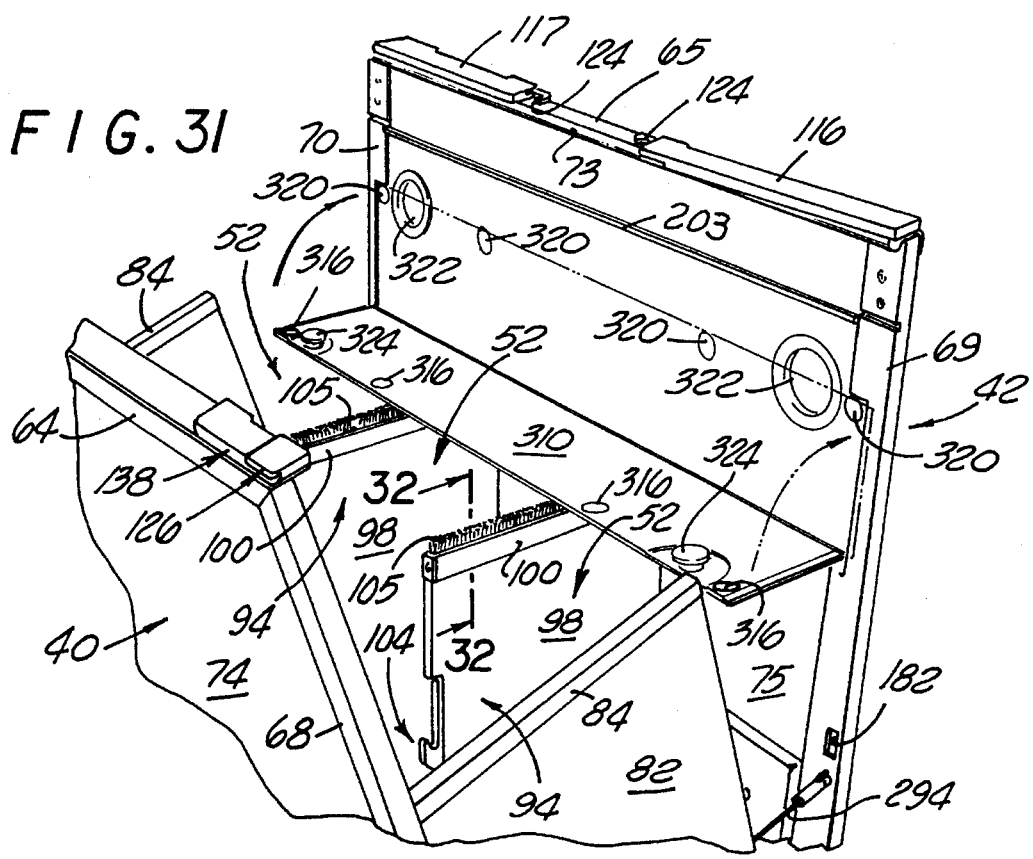
FIG. 31

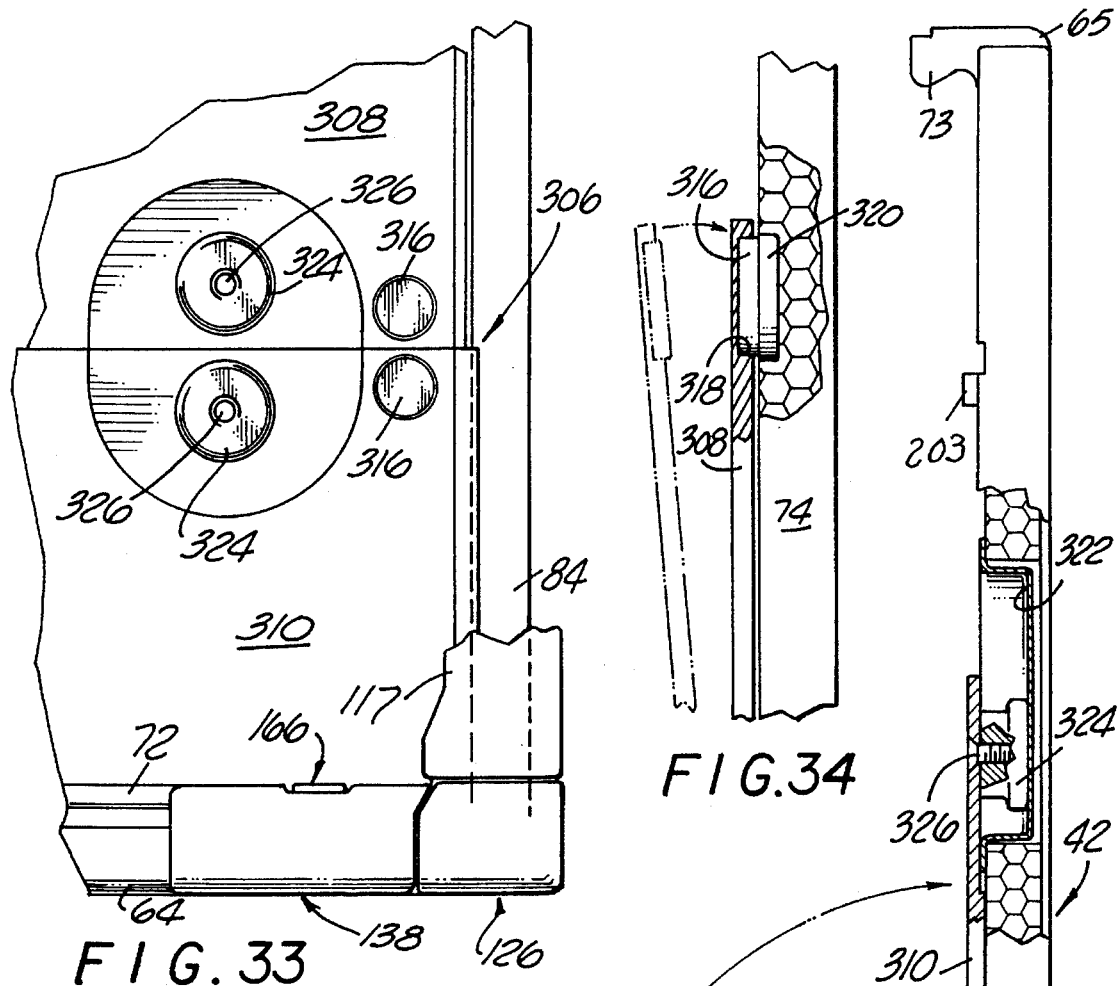
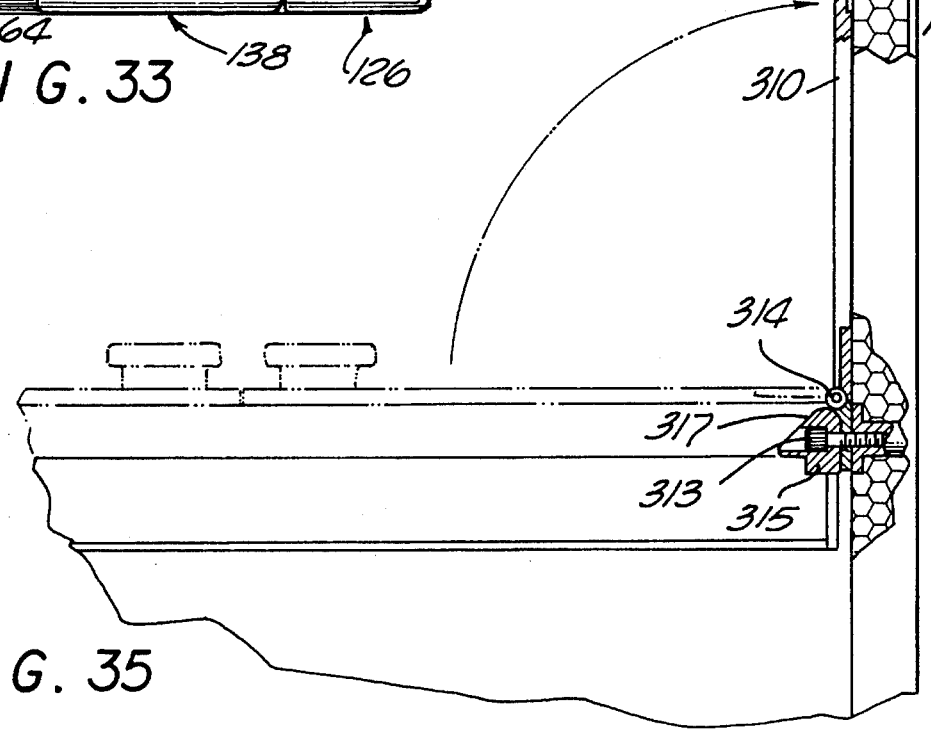
FIG. 33
FIG. 34
FIG. 35

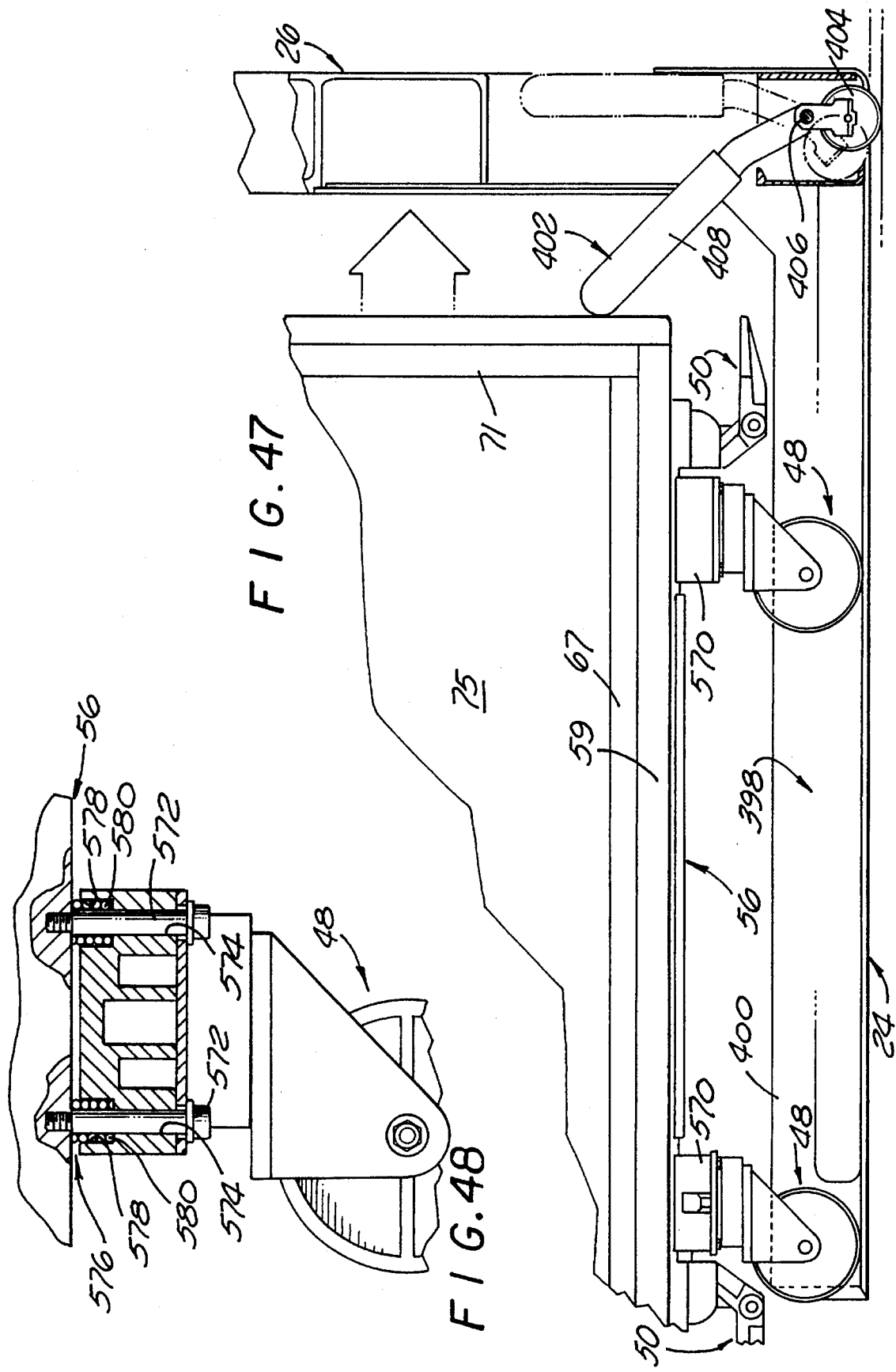

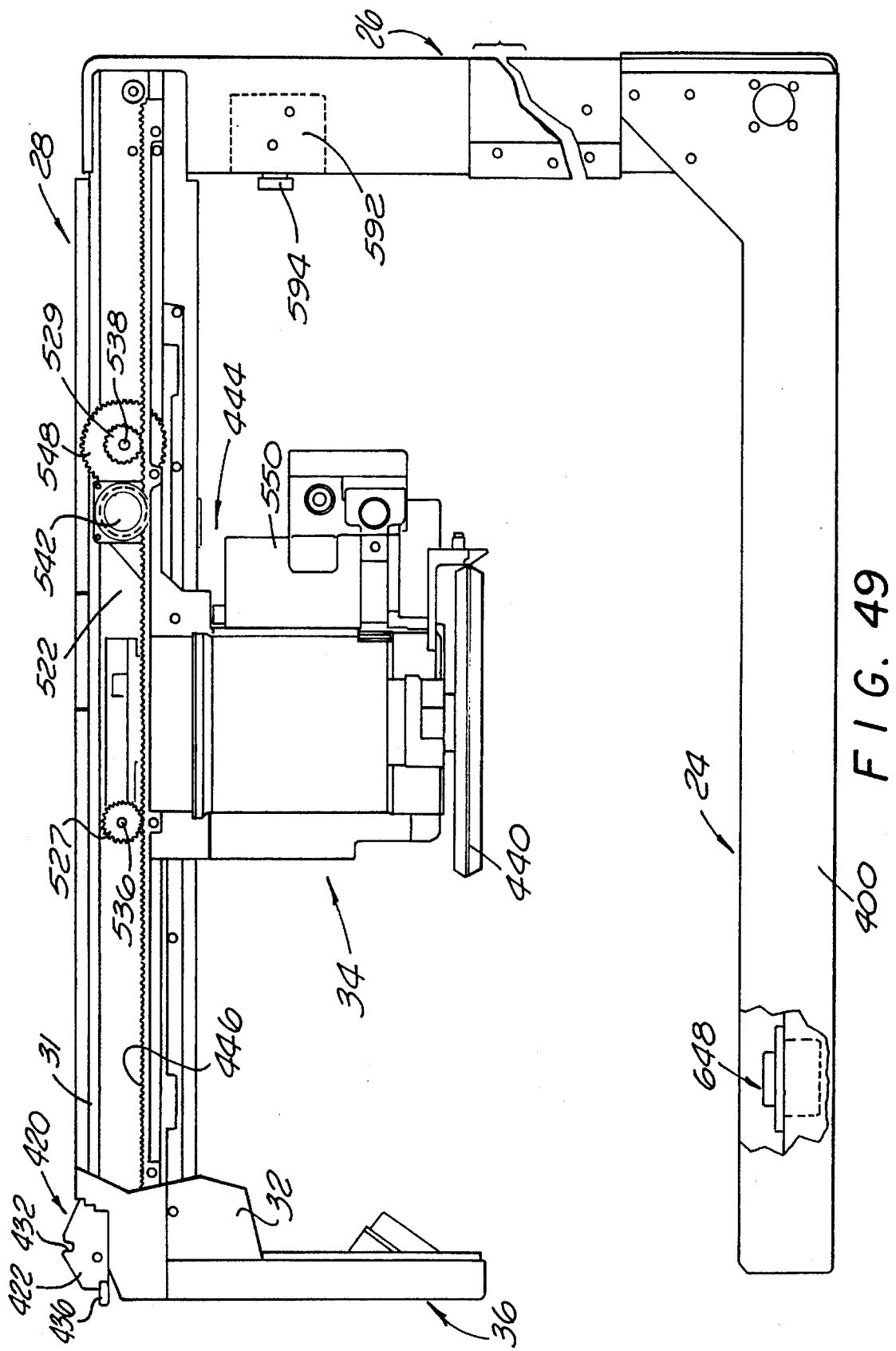

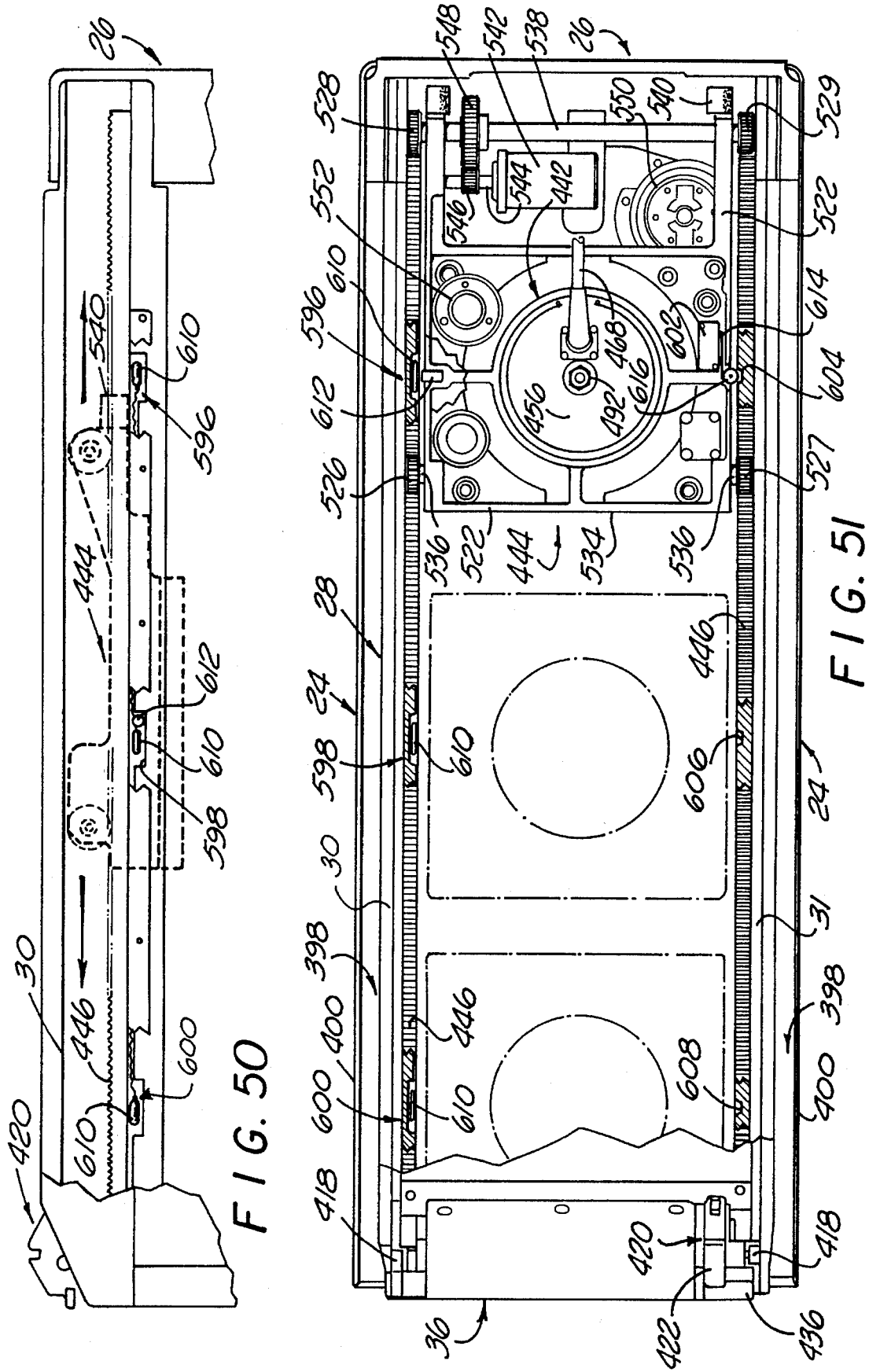

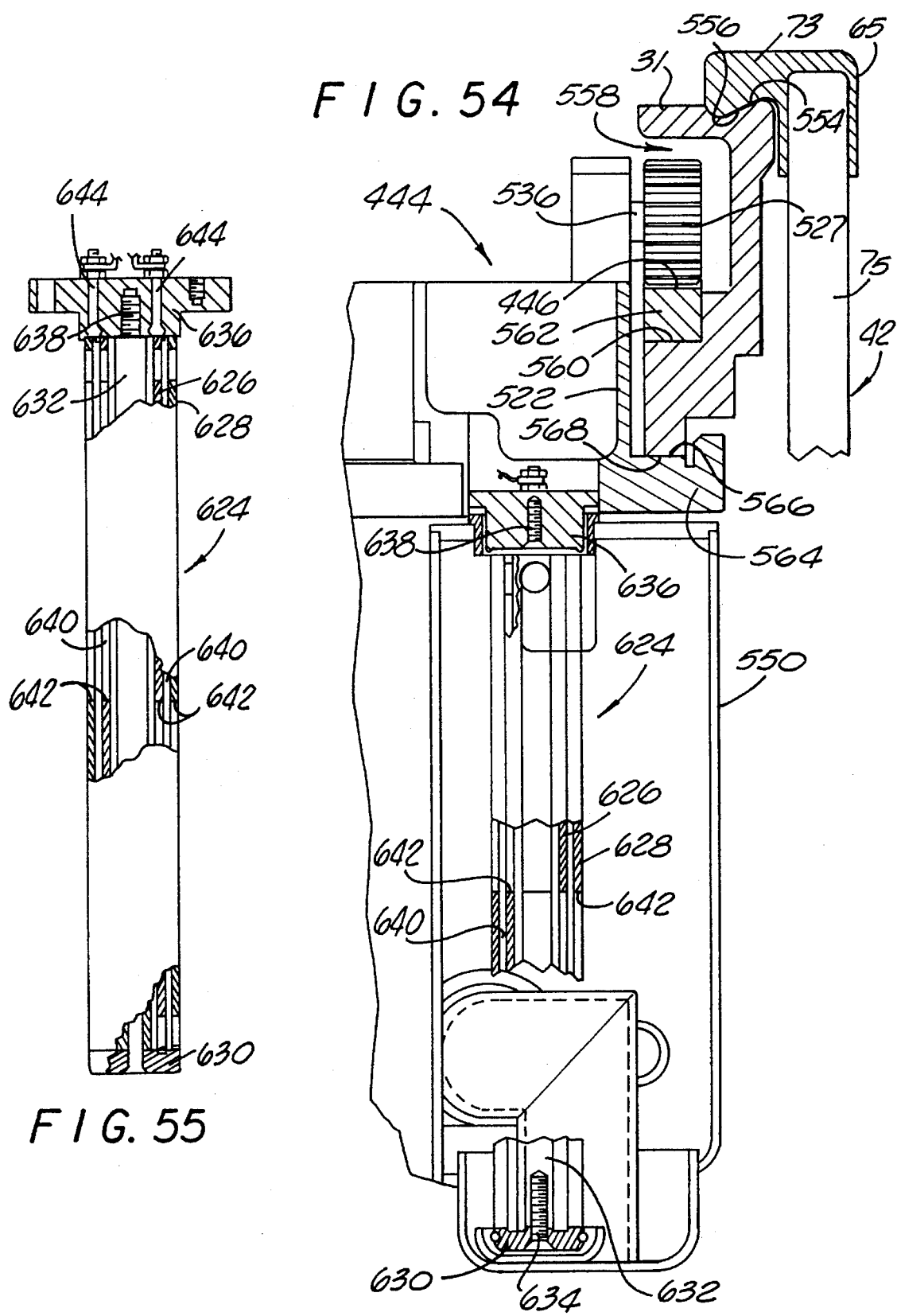

AIRCRAFT TRASH COLLECTION AND COMPACTING APPARATUS

BACKGROUND OF THE INVENTION

This invention relates to apparatus for the collection and handling of trash, and more particularly, to a new and improved trash collection and compaction apparatus primarily intended for use onboard commercial passenger aircraft for the collection and compaction of trash during flight.

The handling and storage of trash collected onboard aircraft during flight has long presented a major problem for the airline industry. On a typical transoceanic flight employing a wide bodied aircraft such as a Boeing 747-400 operating at range, it is not uncommon that seventy five to one hundred cubic feet of waste for galley disposal (that is, excluding food trays and refuse thereon which are separately collected and stored in special food carts) may be generated during the flight. The storage of such high volumes of galley waste or trash have presented particular problems, as collection is usually performed simply by service personnel moving through the aircraft cabin and collecting trash in plastic bags or trays which are then stowed in substantially any available space on the aircraft. In some cases, trash filled bags and trays are even stored during the flight behind the last row of passengers seats and/or in unused passenger seats and luggage compartments. Storage of trash in such a manner is not only unsightly and an inconvenience to passengers, but presents potential safety and health hazards.

One solution to the trash storage problem which has been gaining in acceptance, is that of the installation of a trash compactor onboard the aircraft. To be used onboard an aircraft, however, the trash compactor must be small in size and relatively light in weight, and must meet stringent Federal Aviation Administration (FAA) safety and airworthiness regulations, as well as airframe manufacturer and airline industry requirements. Exemplary of trash compactors specifically designed and intended for use on aircraft are those disclosed in U.S. Pat. Nos. 4,620,479, 4,700,623, 4,719,852, and 4,729,303, and which disclose trash compactor units into which trash is deposited after collection from the passenger cabin for compaction into relatively small storage boxes. Notably, however, trash compactors of the aforementioned type require that the trash collected, for example in a plastic bag, tray or service trash cart wheeled through the passenger cabin, be separately transferred from the collection bag, tray or cart into the compactor unit for compaction.

In recent years, increasing emphasis has been placed on recycling and the separation of recycleable materials such as aluminum and plastic from other nonrecycleable trash items. Indeed, in many European countries, the separation of recycleable materials from other trash items is mandatory, and many airlines are required to pay a fee to have recycleable items removed from collected trash following termination of a flight. While in theory it may be possible to source-separate trash by separately collecting recycleable items from the passenger cabin through repeated cabin passes, or, in cases where an onboard trash compactor is available, separately depositing recycleable items from the collected trash containers into the compactor, such an approach is totally impractical due to the time and number of personnel that would be required.

Thus, there exists a need for a trash collection and compaction apparatus capable of providing a safe, organized and sanitary one-step trash handling system that allows for the source-separation of trash to promote environmental economy, and the compaction of large volumes of trash into a very small volume to reduce the space required for the storage of trash aboard an aircraft. As will become more apparent hereinafter, the present invention satisfies this need in a highly novel and unobvious way.

SUMMARY OF THE INVENTION

The present invention provides a trash collection and compaction apparatus designed and dimensioned to be located onboard an aircraft in a storage area normally occupied by a conventional service cart and which comprises two separate but interrelated components, a stationary compactor unit and a moveable trolley unit for collecting trash and having the collected trash compacted directly therein. The trolley unit is designed to be conveniently moved through the aircraft cabin for the collection of trash, and is provided with multiple individual trash collection chambers to allow the source-separation of trash during collection. Notably, after the trolley unit has been used for the collection of trash from the aircraft cabin, the trolley unit is easily and quickly coupled to the compaction unit which then separately compacts the collected trash in each of the individual chambers of the trolley without having to rehandle the collected trash.

To facilitate handling and removal of compacted trash from the trolley unit, individual trash collection bins are disposed in each of the compartments and within which the collected trash is compacted, and the trolley unit is constructed to permit the sides to be separated for easy removal of the bins. These bins facilitate the removal of compacted trash from the trolley unit, and the transportation of collected trash to appropriate recycling centers.

The trolley unit and compactor unit are so constructed that during a compaction operation, eventhough the compactor unit can generate up to about 7,000 pounds of force on the trolley unit, those compaction forces will not be transmitted to the aircraft and the aircraft will experience no appreciable local increase by reason of the installation and use of the apparatus of the present invention. Further, the trolley unit is designed and constructed to withstand the forces developed during trash compaction so that trash can be compacted in any of the multiple trash chambers even though the adjacent chamber may be empty.

The trolley unit is preferably constructed of structural extruded and machined aluminum channels and aluminum honeycomb panels, and includes multiple separate fail-safe latches for rigidly securing the side panels together but which can be quickly and simply operated with one hand to permit rapid and easy side separation for removal of the bins containing compacted trash, eventhough the bins may have expanded due to the compaction process. Moreover, the bins are designed and constructed with releasable latches to also permit side separation for dumping compacted trash, and are constructed of puncture resistent material. For safety, fire doors are provided on the trolley unit and which can be quickly and easily deployed from either end of the trolley.

A releasable latch is provided for locking the trolley unit in position on the compactor unit, and the compactor unit includes a compaction ram mounted to a movable carriage assembly which can be indexed to precisely overlie each chamber of the trolley unit for the separate compaction of trash in each chamber. Moreover, the compactor unit has trolley support rails on which the trolley unit is suspended during compaction, and which are located above the compaction ram so that the size of the compaction platen is not limited. Suspension of the trolley unit from the compactor unit allows the forces generated by the compaction operation to be absorbed by the trash collection and compacting apparatus rather than being transmitted to the aircraft.

Additionally, multiple safety interlock switches are provided for ensuring that the trolley unit has been properly mated and locked to the compactor unit before a compaction cycle can be initiated, and which terminate a compaction cycle if the trolley unit is attempted to be removed prior to cycle completion. Sensors are provided for ensuring that the compaction ram is precisely positioned over the appropriate trash chamber before each compaction cycle can be performed, and a fluid level sensor is provided in the hydraulic fluid system to ensure that the hydraulic pump employed for extending and retracting the compaction ram does not become damaged in the event of a loss of hydraulic fluid. Further, an override switch is provided for permitting the compaction ram to be operated by ground personnel for cleaning eventhough a trolley unit is not mated with the compactor unit.

These and many other features and advantages of the present invention will become more apparent from the following detailed description taken in conjunction with the accompanying drawings which disclose, by way of example, the principles of this invention.

BRIEF DESCRIPTION OF THE DRAWINGS

FIG. 3 is an enlarged fragmentary perspective view, partially in cross-section of the area depicted by the circle 3 of FIG. 2;

FIG. 4 is a view similar to FIG. 3 but showing release of the latch handle preparatory to the separation of the sides of the trolley unit;

FIG. 5 is a further enlarged top plan view, partially in cross section showing operation of the latch lock for releasably locking the latch handle of the trolley unit in its normal position;

FIG. 9 is an enlarged front elevational view, partially in cut away cross section showing the locking lugs for locking the end panels to the right side panel;

FIG. 10 is a front elevational view, partially in cut away cross section similar to FIG. 9 and showing the locking lugs disengaged for release of the end panels from the right side panel;

FIG. 14 is an enlarged fragmentary cross sectional view taken substantially in the direction of the arrows 14—14 of FIG. 11;

FIG. 15 is an enlarged elevational view, partially in cut away cross section showing the left side panel released form the dividing walls of the trolley unit;

FIG. 16 is an enlarged elevational view, partially in cut away cross section of the left side panel as seen along the lines 16—16 of FIG. 11;

FIG. 17 is an enlarged elevational view, partially in cut away cross section similar to FIG. 16, but showing the locking fingers and locking projections of the dividing panels and left side panel disengaged for separation of the left side of the trolley unit from the right side;

FIG. 18 is a front end elevational view depicting separation of the left side of the trolley unit from the right side;

FIG. 19 is fragmentary cross sectional view taken substantially along the lines 19—19 of FIG. 18;

FIG. 20 is an enlarged elevational view, partially in cut away cross section of the area depicted by the circle 20 of FIG. 18;

FIG. 30 is a fragmentary perspective view of the trolley unit showing deployment of the fire doors over the trash chambers and bins;

FIG. 31 is a fragmentary perspective view of the trolley unit showing the sides separated and the right side panel fire door in the deployed condition;

FIG. 32 is an enlarged fragmentary cross sectional view taken substantially along the line 32—32 of FIG. 31;

FIG. 33 is an enlarged fragmentary top plan view looking down on the trolley unit with the fire doors in the horizontal deployed condition;

FIG. 34 is an enlarged fragmentary end elevational view, partially in cut away cross section showing the right side fire door in its normal position against the right side panel;

FIG. 35 is end elevational view, partially in cut away cross section of the right side panel of the trolley unit showing the position of the right side fire door when stowed in its normal condition against the right side panel;

FIG. 47 is an enlarged fragmentary side elevational view of the trolley as it mates with the lower portion of the frame of the compactor unit;

FIG. 48 is an enlarged side elevational view, partially in cross section of the mounting block for mounting the wheels of the trolley unit to the bottom of the trolley unit;

FIG. 49 is a side elevational view with portions cut away for compact illustration, and depicting the carriage assembly of the compacting ram and its mounting to the tracks of the compactor unit frame;

FIG. 50 is a fragmentary side elevational view, partially in cut away of the top portion of the frame of the compactor unit;

FIG. 51 is a top plan view, partially in cut away elevational, of the compactor unit;

FIG. 54 is an enlarged fragmentary cross sectional view of the hydraulic fluid tank mounted to the carriage assembly of the compactor unit; and FIG. 55 is a fragmentary perspective view partially in elevational of the fluid level sensor mounted within the hydraulic fluid supply tank.

DETAILED DESCRIPTION OF THE PREFERRED EMBODIMENT

Figure 1:
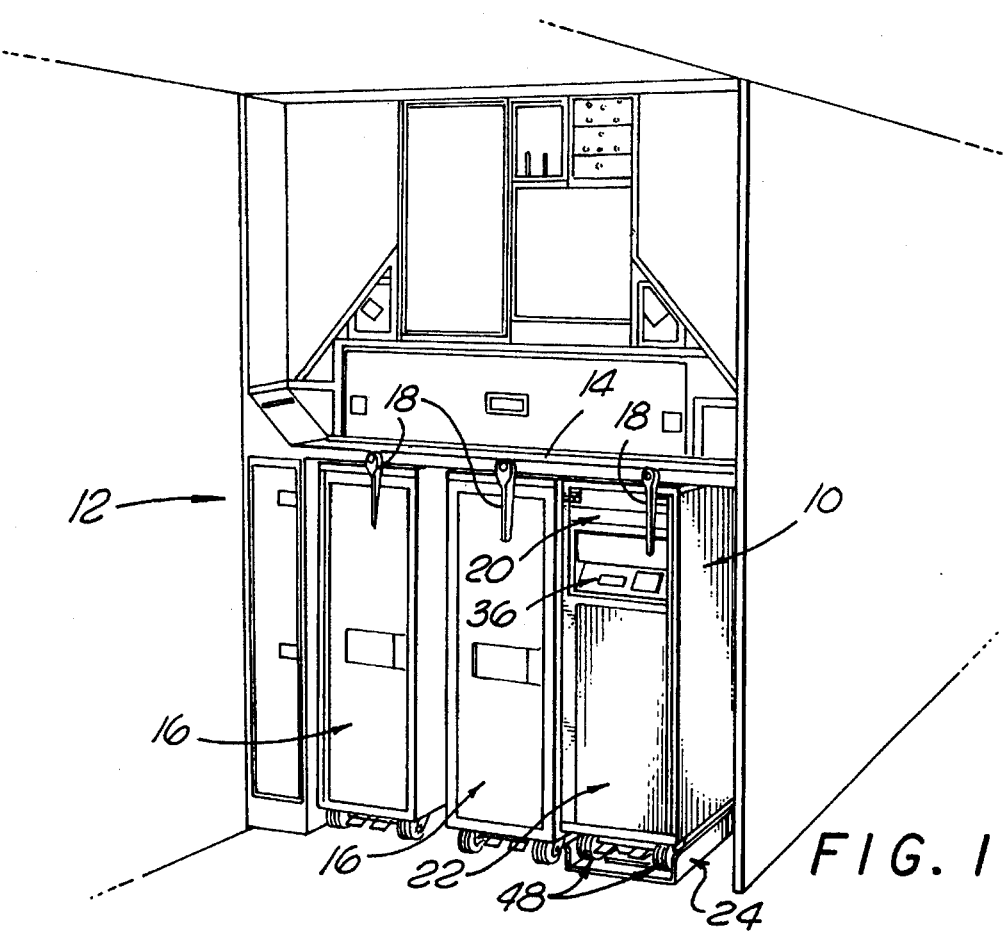
FIG. 1 is a perspective view of the trash collection and compaction apparatus of the present invention shown installed in a conventional galley unit of a commercial passenger aircraft, and with the trash trolley unit mated with the compactor unit for performance of a trash compaction cycle.

As shown in the exemplary drawings, the present invention is embodied in a new and improved trash collection and compaction apparatus, generally designated 10, primarily intended for use aboard commercial passenger aircraft for the collection and storage of trash during flight. In this instance, as shown in FIG. 1, the trash collection and compaction apparatus 10 is illustrated installed in a conventional aircraft galley unit, generally designated 12, and disposed in a storage area below a galley service counter 14 in side-by-side relation with two conventional prior art service carts 16 of the type typically used aboard aircraft for the service of food and beverages and the collection of trash, the service carts and trash collection and compaction apparatus being shown each retained in position by rotatable locking levers 18 attached to the service counter, as is typically required during aircraft take-offs and landings. It should be noted that the galley unit 12 per se forms no part of the present invention and may take various forms and have various configurations, the only requirement being that the aircraft have a suitable storage area and electrical power supply for installation of the trash collection and compaction apparatus 10.

In accordance with the present invention, the trash collection and compaction apparatus 10 employs economy of design, efficiency of operation and savings in space to enhance profitability of aircraft operation. Moreover, the trash collection and compaction apparatus 10 is relatively small in size, light in weight, and reliable in use, yet meets all FAA and global airworthiness design requirements to provide a safe, organized and sanitary one-step trash handling system that allows for the source-separation of trash to promote environmental economy and the compaction of large quantities of trash into a very small volume to promote substantial savings in aircraft space.

Figure 2:
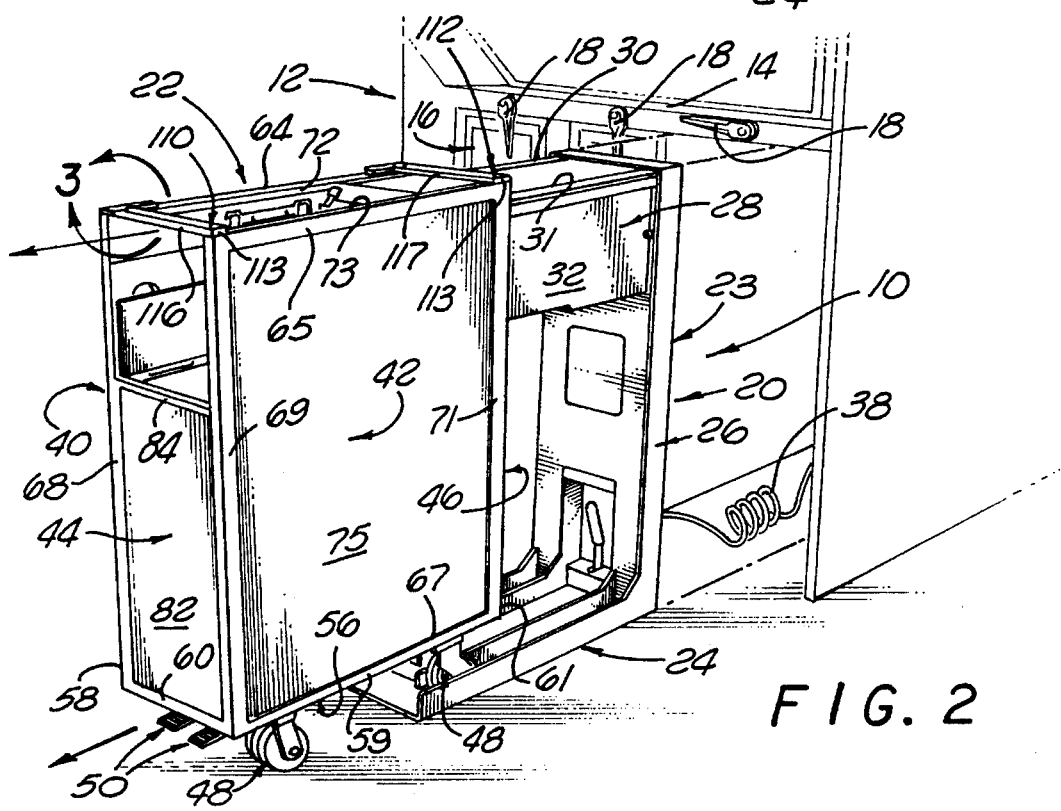
FIG. 2 is a perspective view similar to FIG. 1 but showing the apparatus of the invention withdrawn from it storage location in the galley unit and with the trolley unit partially removed from the compactor unit.

Toward the foregoing ends, the trash collection and compaction apparatus 10 is designed and dimensioned to be removably installed for use in a portion of the storage area normally occupied by a conventional service cart 16, and, as generally shown in FIG. 2, comprises two separate but interrelated components, a stationary compactor unit, generally designated 20, and a wheeled trolley unit, generally designated 22. As can be seen in FIG. 1, the combined compactor unit 20 and trolley unit 22 comprising the trash collection and compaction apparatus 10 of the invention is dimensioned to have a size substantially the same as an industry standard for a conventional service cart 16, that being a vertical height of approximately 40 inches, a lateral width of approximately 12 inches, and an end-to-end length of approximately 30 inches. Moreover, the trolley unit 22 is designed to structurally interfit with the compactor unit 20 such that forces generated during trash compaction are absorbed by the trash compaction apparatus 10 and not transmitted to the surrounding aircraft structure, thereby to meet the established airframe and galley manufacturer stress load restrictions for conventional service carts 16 that the combined trash and apparatus not exceed 250 pounds in total weight.

As generally shown in FIG. 2, the compactor unit 20, which is illustrated moved outwardly from its normal stowed position below the galley service counter 14, includes a frame 23, preferably formed from structural aluminum, having a horizontal base portion 24 adapted to rest on the aircraft galley floor, an upstanding rear wall portion 26, and a forwardly projecting upper portion 28 which includes a pair of laterally spaced trolley support rails 30 and 31, a housing 32 within which a compaction ram 34 and associated components are housed, as will be explained more fully hereinafter (see, generally FIG. 39), and an operating control panel 36 (best seen in FIGS. 1 and 39). A power cord 38 is herein shown in FIG. 2 for electrically connecting the compactor unit 20 to a suitable electrical power supply in the aircraft galley unit 12.

The trolley unit 22, shown in FIG. 2 partially removed from the compactor unit 20, has a generally rectangular shape defining, as seen in FIGS. 2, a left side 40, a right side 42, a front end 44 and a rear end 46, and is constructed to have an external size substantially the same in dimension as that of a conventional service cart 16. Like a conventional service cart 16, the trolley unit 22 includes support wheels 48 for rolling the trolley through the aircraft cabin during trash collection, and incorporates foot operated pedals 50 for operating a conventional brake system like that employed on conventional service carts for releasably locking the wheels against turning such as may be necessary if the trolley is temporarily left unattended in the aircraft cabin. It should be noted that as used herein, the references to "right side", "left side" "front end" and "rear end" are for clarity of description in relation to the accompanying drawings and are not intended to be limiting since either end of the trolley unit 22 may be considered the "front end" and may be coupled with the compactor unit 20.

In accordance with an important aspect of the present invention, the trolley unit 22 is constructed to provide multiple individual trash collection chambers 52, herein three (see, e.g., FIGS. 21, 22, 30 and 31), each structurally formed to withstand the forces generated by the compaction ram 34, typically up to 7,000 pounds, and to transmit compaction forces exerted on the trolley back through the compactor frame 23, so as to create a stress path through the trash collection and compaction apparatus 10 which is not transmitted to the aircraft floor. In this respect, to conserve weight yet provide rigidity and strength, the trolley unit 22 is preferably formed of structural aluminum comprising a generally rectangular frame formed from machined and extruded aluminum channels, and bottom, side and end panels secured to the channels and formed as a laminate of aluminum honeycomb material sandwiched between face plates of aluminum sheet material, as seen for example in FIGS. 12, 14 and 35.

To facilitate removal of compacted trash from the trolley unit 22, the trolley is constructed to permit one side to be unlocked from the other and pivoted away, thereby opening the chambers 52 and relieving any stress on the chamber walls developed during the trash compaction operation. Further, to conserve space and enhance efficiency, specially designed and constructed individual trash bins 54 are removably received in each of the three collection chambers 52 of the trolley 22, and which can be separately removed from the trolley for storage and transportation of compacted trash (see FIG. 22–29). The provision of three separate chambers 52 and bins 54 facilitates the source-separation of trash during collection and promotes environmental efficiency by permitting, for example, one chamber and bin to be used for the collection of aluminum cans, one for the collection of plastic items, and the third for the collection of mixed waste items so that after compaction, the individual bins can be quickly and simply removed from the trolley unit 22 and, after termination of the flight, easily transported to an appropriate ground recycling location (see, e.g., FIGS. 21–23). Moreover, each bin 54 disposed in one of the chambers 52 of the trolley unit 22 is capable of having compacted therein by the compaction ram 34 approximately 250 standard 12 ounce aluminum cans, thus enabling one trolley unit to be capable of collecting and storing approximately 750 cans or an equivalent volume of compacted trash.

More particularly, as best seen in FIGS. 2, and 15–18, the trolley unit 22 includes a rectangular shaped bottom, generally designed 56, formed by a pair of laterally spaced, longitudinally extending left and right side channel bars 58 and 59, each having a length of approximately twenty seven inches, interconnected at the front and rear ends by laterally extending front and rear end channel bars 60 and 61, each approximately twelve inches long, and to which a horizontally disposed floor panel laminate 62 is rigidly secured. Preferably, for structural rigidity, the side and end channel bars 58, 59, 60 and 61 are each formed to have a generally C-shaped cross section defining a horizontally extending and inwardly open groove into which the side and end edges of the floor panel laminate 62 are received and secured. As can best be seen in FIGS. 2, 18 and 47, the wheels 48 of the trolley unit 22 are mounted to project downwardly from the bottom 56, and the foot pedals 50 for operating the wheel brakes (not shown) are pivotally attached to the bottom, two separate sets of brake operating foot pedals 50 being provided, one on each end of the trolley unit so that the wheel brake can be operated from either end of the trolley.

Figure 13:
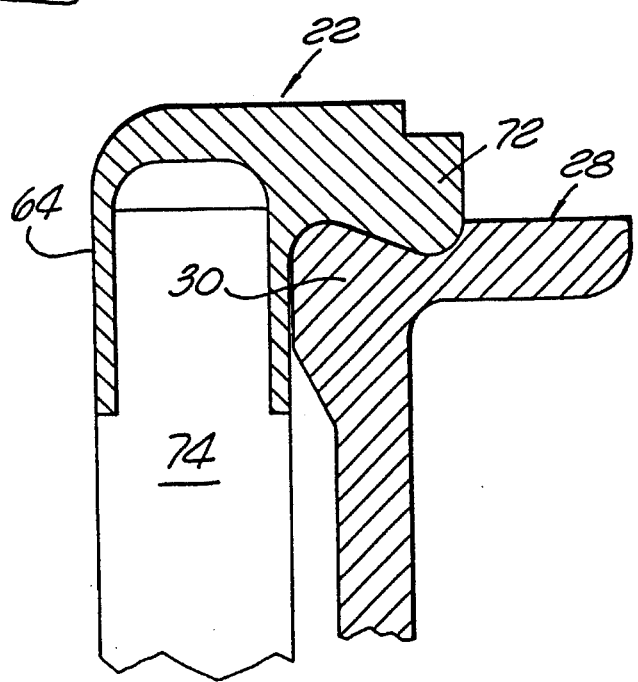
FIG. 13 is an enlarged fragmentary cross section view of the engagement of the top rails of the trolley unit with the trolley support rails of the compactor unit.

As previously mentioned, to facilitate removal of compacted trash, one side of the trolley unit 22, herein the right side 42 as viewed in FIGS. 2 and 17, is rigidly secured to the trolley bottom 56, while the opposite or left side 40 is pivotally connected to the trolley bottom. In both cases, the sides 40 and 42 are each formed as structurally rigid frames defined by top longitudinally extending horizontal left and right channel bars 64 and 65, and lower longitudinally extending left and right channel bars 66 and 67 interconnected at their front ends by vertically projecting left and right channel posts, 68 and 69, respectively, and at their rear ends by left and right rear vertical channel posts 70 and 71 to form rectangular shaped frames. To structurally couple the trolley unit 22 with the compactor unit 20 during a trash compaction operation, the top channel bars 64 and 65 include laterally inwardly extending flanges formed to define longitudinally extending top rails 72 and 73 adapted (see, e.g., FIGS. 13 and 14) to mate with the trolley support rails 30 and 31 of the compactor unit, as will be further explained hereinafter.

Like the trolley bottom 56, rectangular shaped left and right side panel laminates 74 and 75, respectively, are secured to the respective longitudinal channels 64 and 65, 66 and 67, and to the vertical channels 68 and 69, and 70 and 71, each of which has a generally C-shaped, inwardly open cross section for receiving the edges of the panels. As best seen in FIGS. 11, 15, 16 and 17, the lower channel bar 66 of the left side 40 is formed along its length with an integral downwardly directed piano-type hinge portion 76 which mates with a cooperating upwardly directed piano-type hinge portion 78 integrally formed along the length of the left side channel bar 58 of the trolley bottom 56, and are rotatably coupled together by a horizontally extending hinge pin 80 to permit the trolley left side 40 to pivot outwardly relative to the trolley right side 42, the right side 42 being rigidly secured along the length of its lower channel bar 67 to the right side longitudinal channel bar 59 of the trolley bottom 56.

The front and rear ends 44 and 46 of the trolley 22 are provided with rectangular shaped end panel laminates 82 and 83 which extend, respectively, between the front and rear vertical channel posts 68, 69, and 70, 71 from adjacent the trolley bottom 56 to a vertical location approximately twenty two inches upwardly above the bottom. Notably, the lower two thirds of each of the front and rear vertical channel posts 68 and 70 forming the frame for the left side 40 of the trolley 22 is formed with a vertically extending and laterally inwardly open groove for receiving the left side edges of each end panel laminate 82 and 83 so that only the left side edges of the panels are permanently secured to the trolley 22. Herein, top channel bars 84 are secured across the top edges of each end panel 82 and 83.

As best seen in FIGS. 9, 10 and 18, secured along the free vertical right side edges of the end walls 44 and 46 are substantially identical vertical end bars 86 which are formed to include laterally outwardly projecting locking lugs 88 having downwardly directed locking fingers 90 which are adapted to mate with cooperatively formed releasable locking lugs 92 formed along the front and rear vertical channel posts 69 and 71 of the right side 42 of the trolley unit 22. Engagement of the locking lugs 88 of the end walls 44 and 46 with the locking lugs 92 of the vertical posts 69 and 71 serves to releasably secure the end walls to the right side panel 75 during trash collection and compaction.

To separate the interior of the trolley unit 22 into the three separate trash collection chambers 52, two vertical dividing walls 94 are formed to extend laterally between the sides 40 and 42 of the trolley, and are positioned to form, together with the end panels 82 and 83, three substantially identical sized chambers, each having a vertical height of approximately 22 inches, a lateral width of approximately 10 inches, and a longitudinal depth of approximately 8 inches. As best can be seen in FIGS. 18, 31 and 32, the dividing walls 94 are each formed of rectangular shaped aluminum honeycomb core panel laminates 98 having an internal extruded aluminum channel 97 bonded along the top edge, and to which is attached, herein by screws 99, a cap 100, and are dimensioned to have a vertical height substantially the same as that of the end panels 82 and 83. The dividing walls 94 are bolted or otherwise removably but rigidly secured along their right side edges to the right side panel 75 of the trolley 22, and have bottom edges extending slightly above the trolley bottom 56.

As best seen in FIG. 32, it will be noted that each of the caps 100 along the top edges of the dividing walls 94 includes an upwardly open channel 103 through which upwardly project the brushes of an elongated brush 105. These brushes 105 act to wipe clean the compaction face of the compaction ram 34 as the compaction ram is indexed from a compaction position over one chamber 52 to the compaction position over the next, thereby to prevent trash from one bin 54 being transferred to the next. Notably, extending approximately four inches upwardly from the bottom edges, the right side edges of the dividing walls 94 are formed with a step defining vertical slots 95 for receiving the side of a liquid collection pan 101, the details of which will be later described.

Secured along the length of the left side vertical edge of each of the dividing walls 94 is a vertical end bar 102, best seen in FIGS. 16 and 17, and which is formed to include a pair of vertically spaced, laterally outwardly projecting locking lugs 104 having upwardly directed locking fingers 106 which are adapted to mate with cooperatively formed releasable locking lugs 108 formed along the inside sidewall of the left side panel 74. In a manner similar to that of the cooperative locking lugs 88 and 92 of the end walls 44 and 46 and vertical posts 69 and 71, the locking lugs 104 and 108 of the dividing walls 94 and left side panel 74 serve to releasably secure the left edges of the dividing walls to the left side panel during trash collection and compaction.

It should be noted that upon release of the locking lugs 92 of the right side vertical posts 69 and 71 from the locking lugs 88 of the end walls 44 and 46, and release of the locking lugs 108 of the left side panel 74 from the locking lugs 104 of the dividing walls 94, when the left side 40 of the trolley 22 is pivoted away from the right side 42, the dividing walls remain stationary relative to the trolley bottom 56 and right side so as to pivot as a unit. With this construction, any stresses imposed against the vertical faces of the end panels 82 and 83 and the dividing walls 94 as a result of the compaction of trash and lateral expansion of the sides of the bins 54, can be readily overcome to facilitate bin removal since movement of the left side 40 away from the right side 42 results in a lateral shearing action of the end panels relative to the dividing walls.

In accordance with another important aspect of the present invention, the trolley unit 22 includes a fail-safe multiple latch system which meets all FAA and airline safety requirements for preventing the sides 40 and 42 of the trolley from being accidentally separated, even under crash load situations, yet which permits simple and easy one hand opening by an operator. Toward this end, the trolley unit 22 includes two fail-safe positive acting cam latch mechanisms, generally designated 110 and 112, one at each end of the trolley for locking the front and rear end walls 44 and 46 to the trolley right side 42, and a third "slam latch" mechanism, generally designated 114, located on the left side panel 74 of the trolley for locking the dividing walls 94 to the left side panel, each of which must be independently released in order for the sides of the trolley to be separated, yet each of which is capable of being quickly and simply operated with a single hand.

More particularly, as best seen in FIGS. 2–10, two separate but identically operated latch handles 116 and 117 are provided, one at each end 44 and 46 of the trolley unit 22, and which serve the dual function of forming handle bars for pushing or pulling the trolley on its wheels 48, and forming positive latch operators for the releasable latch mechanisms 110 and 112 which secure the front and rear end walls to the right side 42 of the trolley. It should be pointed out that although the structure illustrated in FIGS. 3–10 is that of the latch handle 116 and latch mechanism 110 employed at the front end 44 of the trolley unit 22, the structure and operation of the latch handle 117 and latch mechanism 112 employed at the rear end 44 is substantially identical, the major difference being that one is essentially the mirror image of the other.

Figure 6:
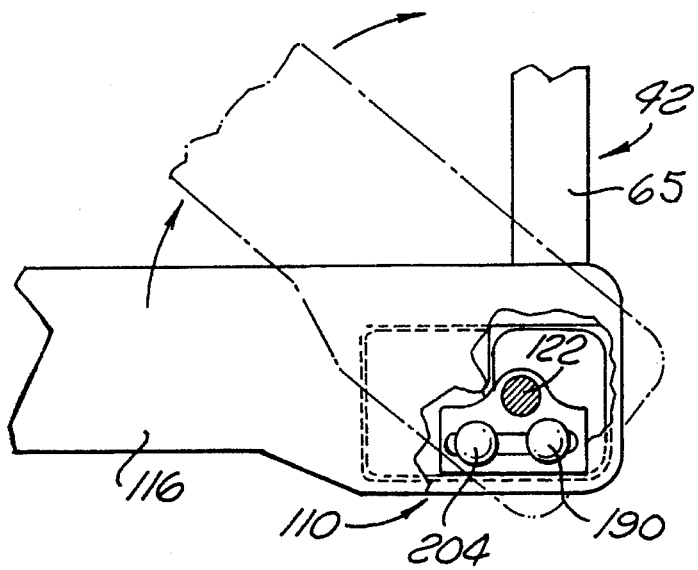
FIG. 6 is an enlarged fragmentary top plan view, partially in cross section illustrating movement of the latch handle for release of the end panels from the right side panel.
Figure 8:
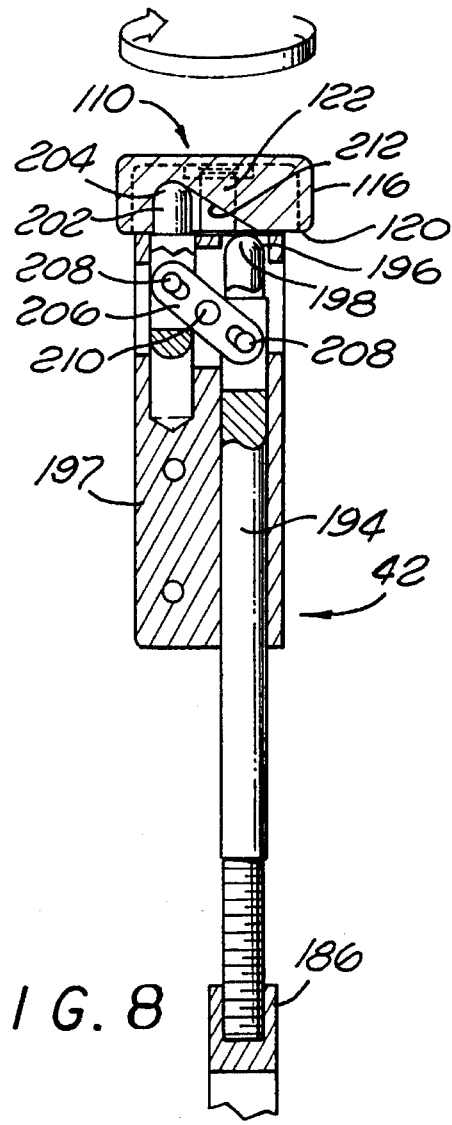
FIG. 8 is a fragmentary cross sectional view of the latch handle rotated to the unlatch position for releasing the end panels from the right side panel.

In this instance, the latch handles 116 and 117 are each formed as an elongated machined aluminum bar having an inverted, generally U-shaped cross section forming a downwardly open longitudinal groove 118 defining an undercut inner edge 119 along the bottom 120, and which are pivotally secured at one of the ends, herein the right side ends 113, to the front and rear right side channel posts 69 and 71 above the right side top bar 65, herein by pivot bolts 122, as shown in FIGS. 6 and 8. The opposite or left side ends of the latch handles 116 and 117 include laterally projecting, generally L-shaped latch fingers 124 which are constructed to interlock with mating L-shaped latch blocks 126 secured on the upper ends of the left side top channel bar 64 above each front and rear left end vertical channel post 68 and 70. Referring to FIGS. 4 and 5, each latch block 126, is constructed to have top and bottom plates 128 and 130, respectively, vertically separated by a longitudinally rearwardly directed and horizontally disposed generally L-shaped body 132 formed with a laterally inwardly and longitudinally rearwardly extending engagement face 134 which is adapted to be engaged by an oppositely directed latch face 136 formed on the latch finger 124 of each of the latch handles 116 and 117. With the latch faces 136 of the latch fingers 124 engaged with the engagement faces 134 of the latch blocks 132, as shown in FIGS. 3 and 5, the latch handles 116 and 117 prevent the right side 42 of the trolley unit 22 from being pivoted away from the left side 40.

To provide a positive and fail-safe locking mechanism to prevent accidental disengagement of the latch finger 124 from the latch block 132, a pushbutton latch lock 138 is provided and which normally holds and locks the latch finger in position with its latch face 134 engaged with the engagement face 136 of the latch block. As shown in FIG. 5, the latch lock 138 herein comprises a generally rectangular shaped aluminum block-like body 140 having a forward end portion 142 of reduced size adapted to fit between the top and bottom plates 128 and 130 of the latch block 126, and to be pivotally secured thereto by a pivot pin 144 for movement about a vertical axis laterally outwardly away from the left side 40 of the trolley unit 22. A torsion spring 146 is herein provided about the pivot pin 144 and which cooperates between the latch block 126 and the forward end portion 142 of the latch lock body 140 to bias the latch lock 138 in a clockwise direction, as viewed in FIG. 5, toward the lock position.

A rear body portion 148 of the latch lock 138, which preferably has a vertical thickness substantially equal to that of the latch block 126, is formed to have a vertically directed retainer face 150 which abuts the rear of the latch finger 124 when the latch finger is in the engaged position with the latch block 126. Notably, a laterally inner portion of the retainer face 150 is formed to extend laterally inwardly and forwardly to define an inclined surface 152 which engages a cooperatively formed inclined face 154 on the rear end of the latch finger 124 adjacent the left end of the latch handle 116. With this construction, when the latch lock 138 is in the lock position as illustrated by the solid lines of FIG. 5, it can be seen that the latch handle 116 can not be pulled laterally out of engagement with the latch block 126 and can be released only by first pivoting the latch lock laterally outwardly as shown by the arrow of FIG. 4 and moved to the broken line position shown in FIG. 5, thereby freeing the rear end of the latch finger 124 to be moved rearwardly away from the engagement face 134 of the latch block 126 as a result of rearward pivotal movement of the latch handle about its pivot bolt 122.

To insure that the latch lock 138 is not accidentally pivoted away from the lock position of FIG. 3, a spring loaded plunger 156 is disposed in a longitudinally directed bore 158 extending rearwardly from the retainer face 150, and has a forward nose portion 160 which is adapted to seat in a corresponding slot 162 formed in the rear of the latch finger 124. A spring 164 herein is compressed between the rear end of the plunger 156 and the closed end of the bore 158 to bias the plunger toward the extended position engaged in the slot 162 of the latch finger 124. To release the plunger 156 from the latch finger 124, a spring loaded release pin 166 is provided in the latch lock 138 and which must be depressed to withdraw the plunger from the latch finger.

In this instance, as seen in FIG. 5, the release pin 166 has a generally T-shaped cross section forming an enlarged finger button portion 168 and an elongated shank portion 170 which projects into a blind bore 172 formed to extend laterally outwardly in the side of the latch lock 138 perpendicular with and in the plane of the plunger 156. A spring 174 is positioned in the closed end of the blind bore 172 and acts to bias the pin 166 outwardly. A longitudinal slot 176 is formed through the body of the plunger 156 centrally between its ends, and through which the shank portion 170 of the pin 166 extends. The rear end of the slot 176 through the plunger 156 is herein formed as an inclined rearwardly and laterally inwardly directed face 178, and which engages a similarly inclined groove 180 formed in the side of the shank portion 170 of the pin 166. When the pin 166 is in its extended position relative to the blind bore 172, the inclined face 178 of the plunger 156 is fully seated in the groove 180 with the nose portion 160 of the plunger fully extended. However, when the button 168 is depressed inwardly against the bias of the spring 174, the inclined groove 180 will cam the inclined face 178 rearwardly, thereby to retract the plunger 156 from engagement with the latch finger 124 and permit the latch lock 138 to be moved to release the latch handle 116.

It should be noted that due to the direction of the engagement of the retainer face 152 of the latch lock 138 with the inclined face 154 of the latch finger 124, even if the plunger 156 should fail, such as by a shearing of the nose portion 160 or if the pin 166 failed to extend, lateral forces applied to the sides 40 and 42 of the trolley unit 22 would not result in release of the latch fingers 124 from their engaged position with the latch block 126 since such lateral forces would tend to rotate the latch lock 138 laterally inwardly, rather than outwardly as is required for release. Thus, to release the latch handles 116 and 117, positive action is required to first pivot the latch locks 138 laterally outwardly out of engagement with the latch fingers 124 before the latch handles can be moved to release the sides 40 and 42 of the trolley unit 22. Further, when it is desired to release the latch handles 116 and 117, all that is required is that the buttons 168 of the pins 166 be depressed and the latch locks 138 pivoted outwardly so that the latch handles can then be freed for movement, as shown, for example, by the directional arrows in FIG. 4, an operation that can be performed with one hand.

Importantly, release of the latch handles 116 and 117 from the latch blocks 126 does not alone release the sides 40 and 42 for movement away from each other, but rather simply acts as one of the multiple steps that must be performed before such release can be accomplished. As best seen, for example in FIGS. 9 and 10, the cam activated latch mechanisms 110 and 112 operated by the latch handles 116 and 117 are provided in each vertical post 69 and 71 on the right side 42 of the trolley unit 22 for releasably mating the locking lugs 92 of the posts with the locking lugs 88 of the front and rear end walls 44 and 46, these locking mechanisms being provided both for added structural strength and rigidity, and for safety.

Referring primarily to FIGS. 9, 10 and 18, it will be seen that the laterally outwardly extending locking lugs 88 of the front and rear end walls 44 and 46 project into mating slots 182 formed in the inner sides of the vertical posts 69 and 71 of the right side panels 42 for mating engagement with the locking lugs 92 of the posts. Disposed for longitudinal sliding movement in longitudinal internal conduits 184 extending centrally through each of the vertical posts 69 and 71 is an elongated, generally hollow tube 186 having a generally square horizontal cross section, and within which are secured a pair of upwardly directed hook-like projections 188, herein having elongated body portions secured to the walls of the tube 186 by rivets 190 or the like, and which are vertically spaced apart the same distance as that of the fingers 90 of the locking lugs 88 of the end walls 44 and 46, and which form the locking lugs 92 of the front and rear vertical posts.

When the tubes 186 are in a raised position as shown in FIG. 9, the projections 188 forming the locking lugs 92 of the front and rear vertical posts 69 and 71 engage the locking fingers 90 of the end walls 44 and 46 to securely hold the walls in engagement with the posts. Movement of the tube 186 downwardly, as indicated by the directional arrow in FIG. 10, causes the projections 188 to disengage from the locking fingers 90, thereby to allow the front and rear end walls 44 and 46 and their locking lugs 88 to be moved laterally away from the front and rear right side vertical posts 69 and 71, suitable slots 192 being provided through the walls of the tubes to permit the tubes to move vertically with respect to the locking fingers. Therefore, as long as the locking fingers 90 are engaged with the projections 188, any movement of the left side 40 of the trolley unit 22 away from the right side 42 is prevented.

Figure 7:
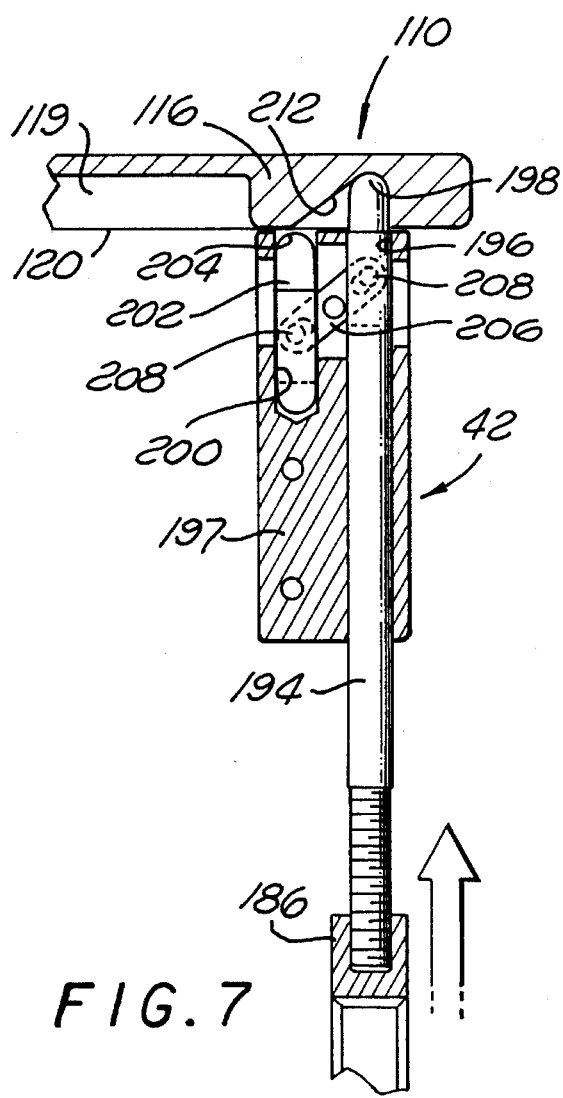
FIG. 7 is a fragmentary cross sectional view of the latch handle in the solid line position of FIG. 6.

To move each of the tubes 186 vertically within the conduits 184, the upper end of each tube is coupled to a vertically extending operating rod 194 actuated by rotation of the latch handles 116 and 117 about the pivot bolts 122. As seen in FIGS. 6–8, the operating rod 194 slidably projects upwardly through a cylindrical hole 196 formed in the upper end portion of a rectangular block 197 secured within the upper end of the front and rear vertical posts 69 and 71, and has a rounded upper end forming a cam surface 198 projecting through the upper end of the post, and over which the bottom 120 of the right side end portion of the latch handle 116, 117 is disposed. Slidably mounted in a parallel blind bore 200 formed to extend downwardly through the upper end of the vertical post 69, 71 adjacent the hole 196 for the operating rod 194, is a relatively short length operating pin 202 which, like the operating rod has a rounded upper end forming a cam surface 204 disposed below the end of the latch handle 116. The operating rod 194 and the operating pin 202 are coupled together by a toggle link 206 rotatably mounted at its ends to the rod and pin, herein by mounting pins 208 extending horizontally through the rod and pin and slightly elongated slots formed in the ends of the link, and the link is pivotally attached to the block 147 by a pin 210 mid-way between its ends. With this arrangement, as can be seen in FIGS. 7 and 8, when the operating rod 194 is extended vertically upwardly, the toggle link 206 moves the operating pin 202 downwardly, and vice versa.

To actuate the operating rod 194 and operating pin 202, a pair of helix shaped cam grooves 212 is formed in the bottom 120 of each of the latch handles 116 and 117 overlying the cam surfaces 198 and 204 of the rod and pin, and is formed such that when the latch handle is in the normal locked position extending laterally across the end panels 44 and 46 between the sides 40 and 42, as shown for example in FIG. 2, the cam groove depresses the pin and allows the rod to be extended fully upwardly. However, when the latch handle 116 is pivoted rearwardly about the pivot bolt 122 to release the latch finger 124 from the latch block 126, as shown by the phantom line positions illustrated in FIGS. 5 and 6, the cam groove 212 will depress the operating rod 194 and permit the operating pin 202 to raise until the latch handle is moved ninety degrees to be aligned along the right side top longitudinal bar 65. In this position, the operating rod 194 will have moved the tube 186 downwardly by a distance sufficient to disengage the locking lugs 92 of the vertical post 69 from the locking lugs 88 of the front end wall 44, thereby freeing the end panel 44 to be separated from the right side 42 of the trolley unit 22.

Figure 21:
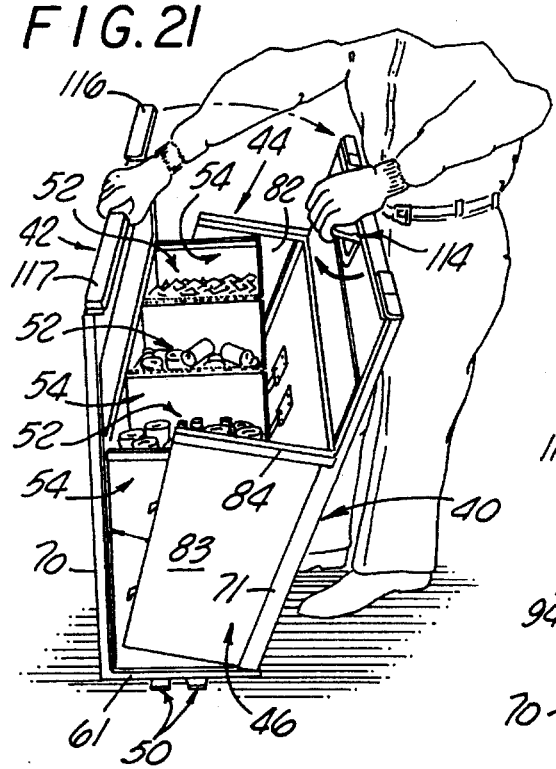
FIG. 21 is a fragmentary perspective view of an operator separating the sides of the trolley unit for removal of compacted trash.
Figure 22:
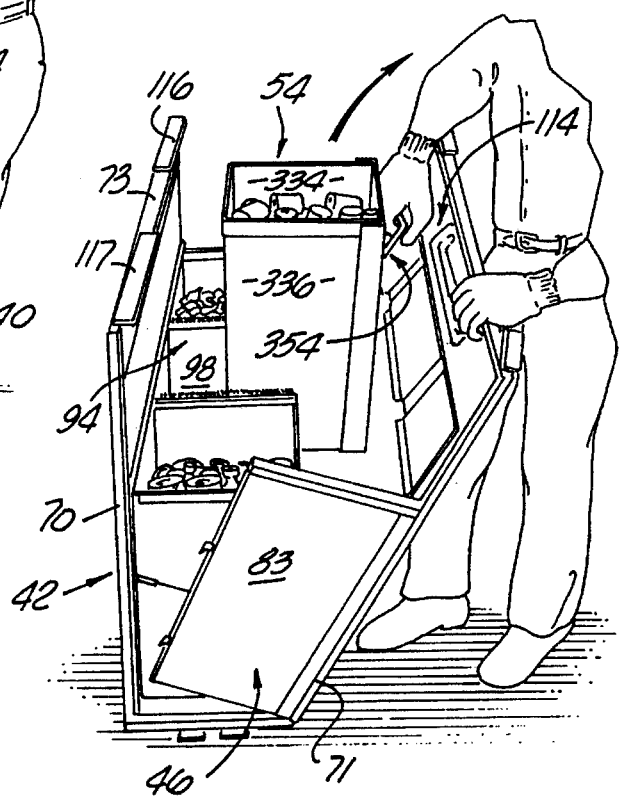
FIG. 22 is a fragmentary perspective view illustrating the operator removing trash bins containing compacted trash from the trolley unit after separation of the sides.

Once the latch handles 116 and 117 at both ends 44 and 46 of the trolley unit 22 have been unlocked and rotated to a position aligned with the right side top longitudinal bar 65, as shown for example in FIG. 21, the sides 40 and 42 can be separated only after independent action is taken to release the "slam latch" mechanism 114 which releasably secures the dividing walls 94 to the left side panel 74. As best can be seen in FIGS. 11, 12 and 14–17, the slam latch mechanism 114 includes an operating handle 214, herein having a generally U-shape, pivotally attached for movement in a vertical direction to the left side panel 74 of the trolly unit 22 adjacent the upper end but below the top bar 64, and is disposed centrally between the front and rear end walls 44 and 46. Preferably, as shown by the solid line position in FIG. 14, when the operating handle 214 is in the inactive position, the handle is recessed into the inner wall of the left side panel 74 to be flush therewith, a suitable concave, generally rectangular shaped mounting frame 216 being herein attached by rivets or screws 218 to a pocket formed in the inner wall of the left side panel to define a recessed mounting for the operating handle.

Figure 11:
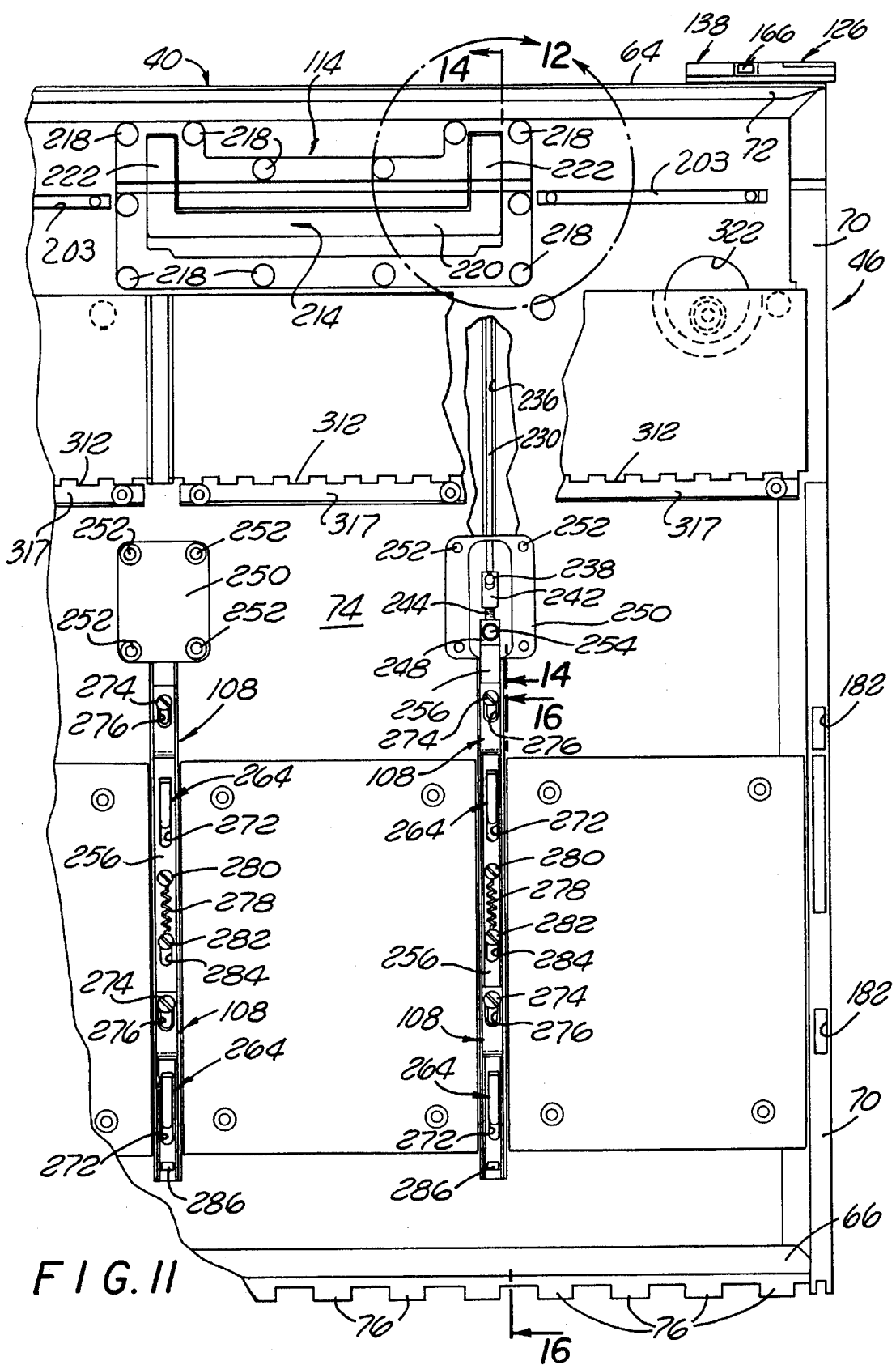
FIG. 11 is an enlarged fragmentary side elevational view of the left side panel of the trolley unit.
Figure 12:
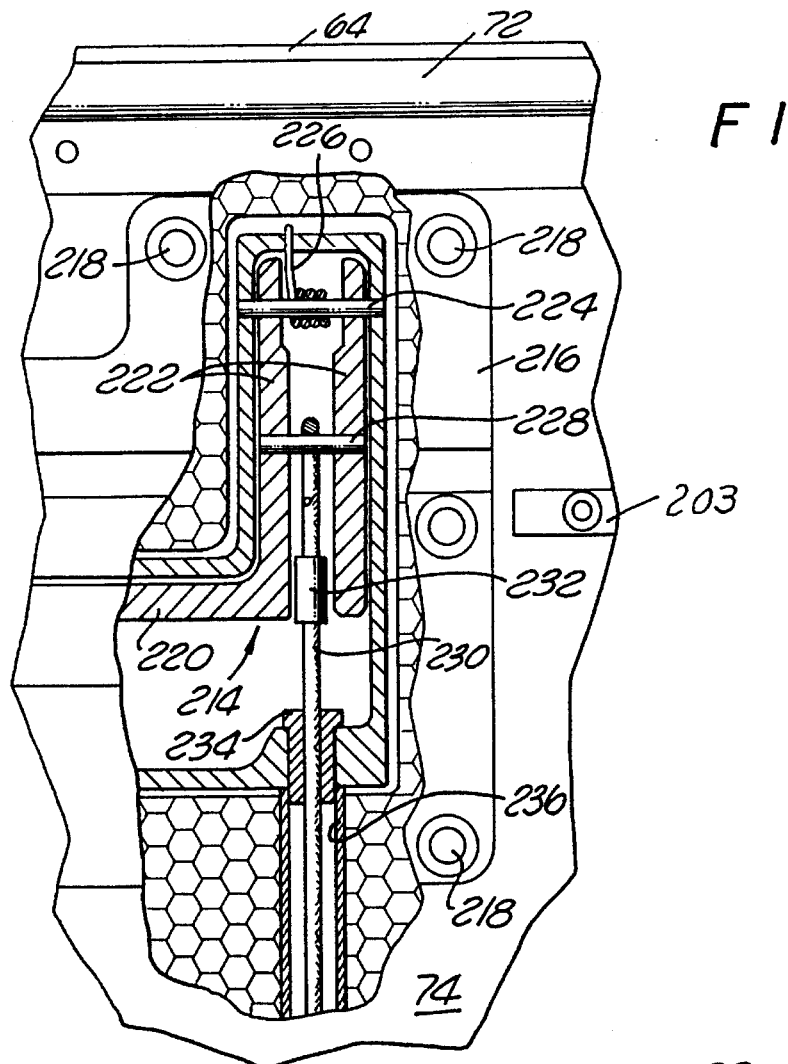
FIG. 12 is an enlarged fragmentary elevational view, partially in cut away cross section of the area depicted by the circle 12 in FIG. 11.

In this instance, referring primarily to FIGS. 11, 12 and 14, the operating handle 214 is formed to have a lower longitudinally extending handle portion 220 with upwardly projecting leg portions 222, the leg portions being longitudinally spaced apart a distance substantially equal to the distance between the dividing walls 94 so that one leg portion is vertically aligned with the left vertical side edge of each dividing wall. Each leg portion 222 is herein pivotally attached at its upper end to the mounting frame 216 by a longitudinally directed pivot pin 224, and includes a torsion spring 226 disposed about the pivot pin to bias the operating handle 214 toward the inactive position recessed into the frame, as shown by the solid line position of FIG. 14.

Disposed intermediate the upper end of each leg portion 222 and the handle portion 220 is a longitudinally extending mounting pin 228 secured to the leg and about which one end of an operating cable 230 is looped and attached by a crimp sleeve 232. From the operating handle 214, each cable 230 extends vertically downwardly through a guide sleeve 234 secured in an opening through the mounting frame 216, and into a passageway 236 formed vertically within the left side panel 40. The lower end of each cable 230 herein terminates in a ball connector 238 which is retained in an opening 240 formed in the upper end of an adjustment sleeve 242, the lower end of which is provided with a threaded bore for adjustably receiving the threaded end of a post 244 upstanding from a slide block 246. Preferably, generally rectangular shaped laterally open box shaped frames 248 are recessed into the inner wall of the left side panel 74 to enclose the areas around each of the adjustment sleeves 242 and slide blocks 246, and which are covered by removable access plates 250, herein attached by screws 252, to permit adjustment of the length of the cables 230. With this construction, as reflected by the phantom line position of the operating handle 214 shown in FIG. 14, when the handle portion 220 is pulled laterally, the leg portions 222 will cause the cables 230 to move upwardly and laterally inwardly, this movement, in turn, causing the adjustment sleeves 242 and attached slide blocks 246 to slide upwardly relative to the left side panel 40.

As best seen in FIG. 11, 14 and 16, attached to each slide block 246, herein by a screw 254, to extend vertically downwardly therefrom, is a channel slide plate 256 to which are attached, herein by screws 258, a pair of laterally inwardly projecting and vertically spaced latch blocks 260 having downwardly directed latch projections 262 and which form the locking lugs 108 of the left side panel 74 which mate with the cooperatively formed upwardly directed latch fingers 106 of the locking lugs 104 formed on each of the dividing walls 94. Engagement of the latch projections 262 with the latch fingers 106 serves to securely lock the dividing walls 94 to the left side panel 74, thereby to also prevent lateral separation of the trolley left side 40 from the right side 42.

With reference primarily to FIGS. 16 and 17, it will be noted that below each of the locking lugs 108 on the left side panel 74 is a laterally inwardly projecting blade 264 which is adapted to be received in a lateral recess 266 cooperatively formed in the end bar 102 along the left vertical edge of each dividing wall 94. Each of these blades 264 is secured directly to an inner wall face plate 268 of the left side panel 74, herein by two screws 270, and extends through elongated slots 272 formed in the slide plate 256 to which the locking lugs 108 are attached. Additionally, laterally inwardly projecting shoulder bolts or pins 274 extend from the inner wall face plate 268 of the left side panel 40 into vertically elongated slots 276 formed in each of the latch blocks 108 above the latch projections 262. The purpose of the blades 264 and pins 274 is to increase structural rigidity of the trolley unit 22 and to transfer loads on the locking lugs 104 and 108 to the left side panel 74 for ensuring that the dividing walls 94 will withstand the forces developed by the compaction ram 34, and that each compartment 52 is able to be independently employed to receive and have compacted therein trash, even though the next adjacent compartment may be empty.

It should be apparent that by vertically moving the slide plate 256 upwardly as a result of lifting the operating handle 214, the locking projections 262 of the locking lugs 108 on the left side panel 74 will become disengaged from the locking lugs 104 of the dividing walls 94, as shown in FIG. 17. To bias each of the slide plates 256 downwardly toward the lock position, an extension spring 278 is coupled between a first post 280 attached to the slide plate and a second post 282 disposed vertically below the first post, and attached to the inner wall face plate 268 of the left side panel 74, the second post projecting laterally through an elongated slot 284 in the slide plate to permit the plate to move vertically relative to the second post. Thus, when the operating handle 214 is raised, the cables 230 pull the slide plates 256 vertically upwardly causing the first pins 280 attached to the slide plates to move upwardly relative to the second pins 282, thereby extending the springs 278. Upon release of the operating handle 214, the springs 278 will pull the slide plates 256 downwardly, thereby moving the locking lugs 108 of the left side panel 40 into a position to be mated and locked with the locking lugs 104 of the dividing walls 94.

To facilitate easy reclosing of the separated sides 40 and 42 of the trolley unit 22 after removal and/or insertion of bins 54 into the compartments 52, the left side panel 74 can be relocked to the dividing walls 94 simply by moving the sides together and without having to manipulate the operating handle 214. This "slam latch" function is achieved by providing cam rollers 286 attached to the slide plates 256 of the left side panel 74 and which ride over upwardly inclined cam surfaces 288 formed on the end bars 102 along the left side edges of the dividing walls 94 and which cause the slide plates to move upwardly and permit the locking projections 262 of the locking lugs 108 to move behind the locking lugs 104 of the dividing walls 94.

As best seen in FIGS. 15–17, the cam rollers 286 are mounted to inwardly projecting brackets 290 secured to the lower ends of the sliding plates 256, and are formed to project laterally inwardly slightly further than the locking lugs 108 of the left side panel 40. As the left side panel 74 is moved toward the dividing walls 94, the cam rollers 286 travel upwardly along the cam surfaces 288 and raise the slide plates 256 against the bias of the springs 278. The lateral and vertical extent of the cam surfaces 288 are dimensioned such that they will deflect the cam rollers 286 and slide plates 256 upwardly by an amount sufficient to permit the latch projections 262 of the locking lugs 108 of the left side panel 74 to move laterally behind the mating fingers 106 of the locking lugs 104 of the dividing walls 94.

Upon reaching the mating condition, the cam rollers 286 are permitted to drop into downwardly extending slots 292 formed behind the cam surfaces 288, thereby permitting the springs 278 to automatically move the slide plates 256 and locking lugs 108 downwardly into the locked position. Thereafter, to fully lock the sides 40 and 42 of the trolley unit 22 together, the latch handles 116 and 117 can be moved from their unlock position aligned with the right side top bar 65 to the lateral positions engaged with the latch blocks 126, and the latch locks 138 moved to securely lock the latch handles in position, as previously discussed.

As best seen in FIGS. 9, 10, 18 and 20, upon release and separation of the left side 40 of the trolley unit 22 from the right side 42, movement of the left side away from the right side is limited by a pair of restraining cables 294, one coupled between each of the end panels 82 and 83 and the adjacent right side vertical posts 69 and 71. Herein, the cables 294 are each attached at one end to the end bar 86 of each of the end panels 82 and 83 by looping the cable end around a pin 296 secured to the bar and securing with a crimp sleeve 298. The opposite end of the cable 294 is coupled to the adjacent vertical posts 69 and 71 through a tubular sleeve 300 which permits the cable to telescope into the sleeve, the sleeve being pivotally attached to the vertical post through a laterally projecting bracket 302 and the end of the cable being retained within the sleeve by a ball termination 304. Provision of the restraining cables 294 permits the sides 40 and 42 of the trolley unit 22 to be moved far enough apart for easy removal of the bins 54 from the compartments 52, yet prevents the left side from falling laterally beyond that necessary for such removal.

To meet FAA established fire safety requirements, manually operable fire doors, generally designated 306, are attached to the left and right side panels 74 and 75 and which can be actuated from either end 44 or 46 of the trolley unit 22 to cover the open upper ends of bins 54 disposed within the compartments 52. As can best be seen in FIGS. 11 and 30–35, the fire doors 306 comprise two separate flat rectangular shaped plates 308 and 310 one of which, 308, is connected along its lower longitudinal edge by piano-type hinges 312 to the inner wall of the left side panel 74 and the other of which, 310, is similarly hingedly connected by hinges 314 to the right side panel 75. Each of the plates 308 and 310 is dimensioned to extend laterally across one half the width between the inner walls of the side panels 74 and 75, and is normally disposed in an inactive position vertically against the inner wall of the associated side panel.

As best shown in FIG. 35, the hinges 312 and 314 are secured along their length to the side panels 74 and 75 by longitudinally spaced bolts 313 which also serve to secure deflection rails 315 longitudinally along each side panel, and which include downwardly and inwardly directed upper surfaces 317 adapted to overlie the upper end edges of the bins 54 to insure that trash deposited into the chambers 52 does not become trapped between the bins and side panels, but rather is deflected into the open upper ends of the bins.

To releasably hold the fire door plates 308 and 310 in the inactive position, yet permit rapid deployment from either end 44 or 46 of the trolley unit 22, magnetic disc shaped buttons 316 are positioned in recesses 318 at spaced locations along the length of the free edges of each plate, and which are magnetically attracted to correspondingly positioned magnets 320 recessed into the inner walls of the panel laminates of each side panel 74 and 75. Additionally, cup-shaped recesses 322 are formed in the inner walls of the side panels 74 and 75 adjacent each end 44 and 46 of the trolley unit 22, and are positioned to permit a flight attendant or other person to readily insert their fingers between the side panels and the free edges of the fire door plates 308 and 310 and overcome the attractive forces of the magnets 316 and 320 to allow the plates to fall to the active horizontal position overlying the open ends of the compartments 52.

In this latter respect, the fire door plate 308 coupled to the left side panel 74 is formed to have a longitudinal length which permits the longitudinal end portions to rest on the top bars 84 overlying the front and rear end panels 82 and 83, while the fire door plate 310 coupled to the right side panel 75 is longitudinally shortened to lie inside the end panels and rest on the brushes 105 disposed along the upper end edges of the dividing walls 94. With this construction, should the sides 40 and 42 of the trolley unit 22 be separated with the fire doors 306 deployed in the active horizontal position, the sides of the trolley can still be reclosed without damaging the fire door plates 308 and 310 since the front and rear end panels 82 and 83 will move freely past the longitudinal ends of the plate 310 attached to the right side panel 75, as can be seen in FIGS. 31 and 33. To facilitate movement of the fire doors 306 from the active horizontal position to the inactive vertical position and to prevent the trolley unit 22 from being coupled with the compactor unit 20 if the fire doors are deployed, upstanding knobs 324 are attached, herein by screws 326, to each fire door plate 308 and 310, and positioned to be received within the recesses 322 formed in the side panels 74 and 75 when the plates are in the vertical position, as shown in FIG. 35. Importantly, if the fire doors 306 are in the horizontal position, the trolley unit 22 can not be mounted to the compactor unit 20 since the front end of the compactor unit frame 23 at the bottom face of the control panel 36 will be hit by the upstanding knobs 324, and prevent the trolley from moving further onto the trolley support rails 30 and 31.

As previously noted, each chamber 52 of the trolley unit 22 is intended to receive a trash bin 54 within which collected trash is compacted. In accordance with a further aspect of the invention, the trash bins 54 are constructed to each have a rectangular, open upper-end shape dimensioned to fit closely within the chambers 52 of the trolley unit 22, and are constructed of puncture resistant material and designed to allow one of the sidewalls to be separated for quick and easy removal of tightly compacted trash without shaking or forcing. Herein, the bins 54 have a height of approximately twenty two inches, a longitudinal length of approximately eight inches, and a lateral width of approximately ten inches.

Figure 24:
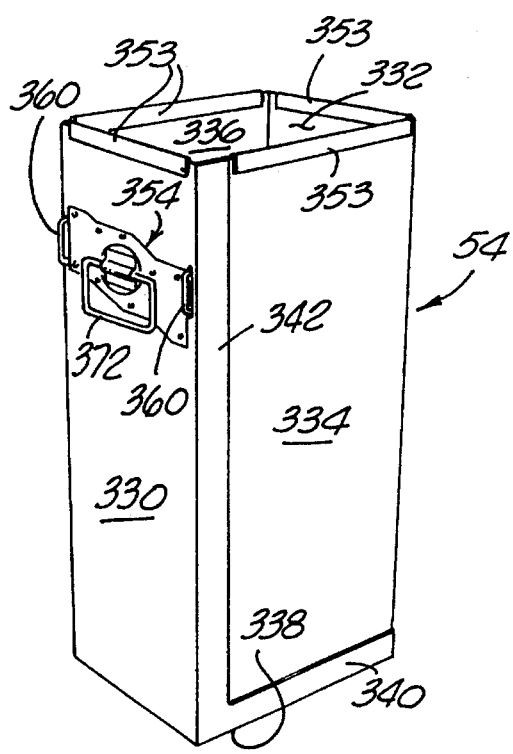
FIG. 24 is a perspective view of the trash bin for use with the trolley unit.
Figure 26:
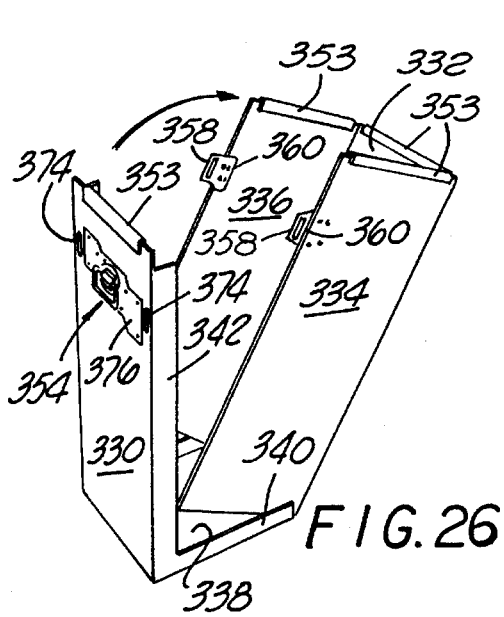
FIG. 26 is a perspective view of the bin of FIG. 24 but shown with the sides separated for dumping of compacting trash.
Figure 27:
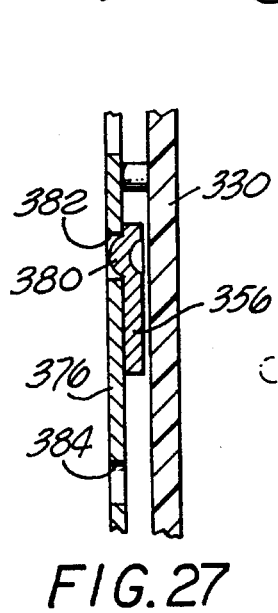
FIG. 27 is an enlarged fragmentary cross sectional view taken substantially along the line 27—27 of FIG. 25.
Figure 28:
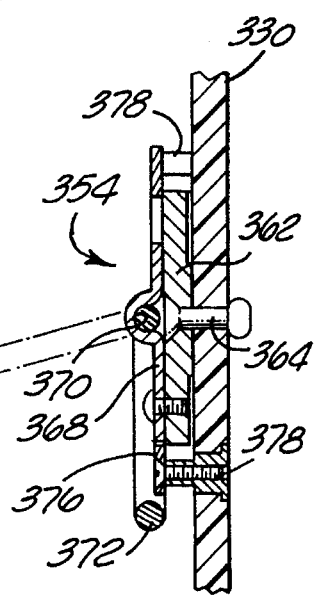
FIG. 28 is an enlarged fragmentary cross sectional view taken substantially along the line 28—28 of FIG. 25.

Toward the foregoing ends, as illustrated in FIGS. 21–29, each bin 54 is constructed to have four upstanding sidewalls 330, 332, 334 and 336, and a bottom 338 which in this instance is integrally formed with one of the sidewalls, herein the left sidewall 330 as seen in FIGS. 24 and 26, and projecting upwardly from the front and rear sides of the bottom 338 is a skirt portion 340 adapted to overlie the lower ends of the front and rear sidewalls 334 and 336, respectively, a similar skirt portion 342 being provided along the front and rear vertical sides of the left sidewall 330 for overlapping the left vertical ends of the front and rear sidewalls. Preferably, the front, rear and right sidewalls 334, 336, and 332, respectively, are integrally formed together as a single unit and movably attached to the bottom 338 by a flexible hinge 344 which permits the sidewall unit to be pivoted relative to the bottom and away from the left sidewall 330. To be puncture resistant, the bottom 330 and each of the sidewalls 332, 334, 336 and 338 of the bin 54 are preferably constructed of a glass reinforced plastic material such as the glass reinforced polypropylene material marketed by the General Electric Company under its tradename Azdel.

Figure 29:
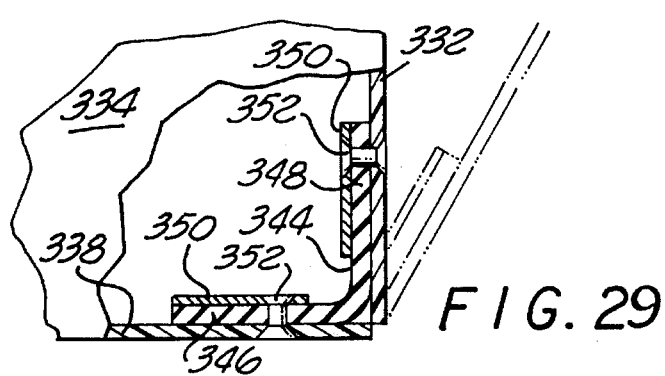
FIG. 29 is an enlarged fragmentary elevational view, partially in cut away cross section showing the hinge for coupling the rear side of the trash bin to the bottom.

With primary reference to FIGS. 26 and 29, it can be seen that the hinge 344, which herein is formed as a living hinge from a molded elongated L-shaped strip of plastic material such as polypropylene or polyethylene to have a length substantially equal to the width of the right sidewall 332, is secured along one side 346 to the bottom 338 along its right edge, and along the other side 348 to the lower edge of the left sidewall 332. In this instance, metal reinforcing plates 350 are disposed over the sides 346 and 348 of the hinge 344, and the composite is attached together by fasteners such as rivets 352 so that the right sidewall 332 and integrally formed front and rear sidewalls 334 and 336 can be flexed laterally away from the left sidewall 330, as indicated by the phantom line position in FIG. 29. In this instance, the upper edges of each of the sidewalls 330, 332, 334 and 336 is provided with a metal U-shaped rim 353 which serves to protect the edge against chafe during use.

Figure 23:
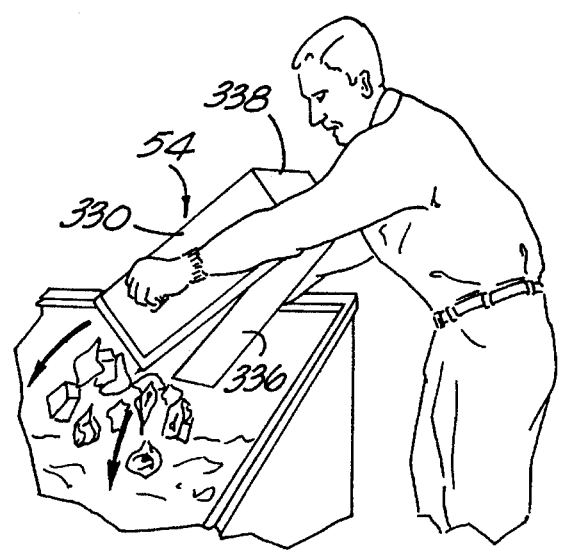
FIG. 23 is a fragmentary perspective view illustrating an operator dumping compacting trash from the bin after removal from the trolley unit.
Figure 25:
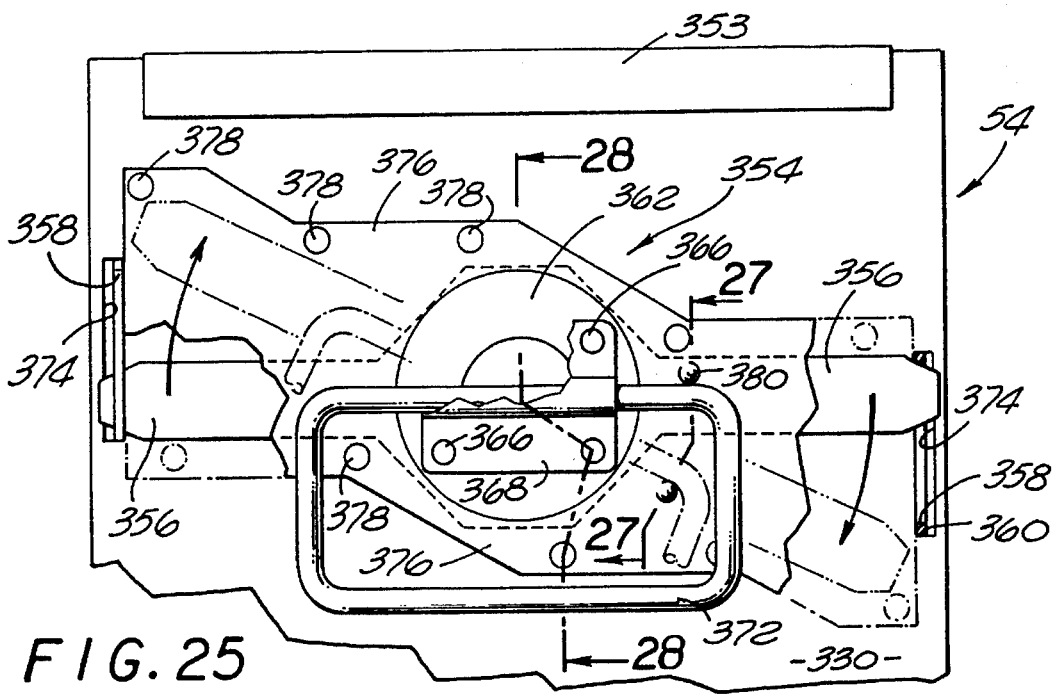
FIG. 25 is an enlarged fragmentary front elevational view of the latch for locking the sides of the bin together.

To releasably hold the left sidewall 330 together with the right, front and rear sidewalls 332, 334, and 336 during use, a combined lifting handle and latch mechanism, generally designated 354, is attached to the left sidewall 330 and which includes a pair of oppositely projecting blades 356, the terminal end portions of which are adapted to engage elongated vertical slots 358 formed in tabs 360 projecting from the left facing vertical edges of the front and rear sidewalls 334 and 336. As shown in FIGS. 25–28, the blades 356 project outwardly from a central hub 362 disposed centrally between the vertical edges of the left sidewall 330 adjacent its upper end, and which is rotatably attached to the left sidewall by a central pivot pin 364. Secured to the face of the hub 362, herein by screws 366, is a sheet metal bracket 368 having an outwardly convex central groove 370 through which loosely extends one leg of a rectangular lifting handle 372, the bracket being secured to the hub such that the groove is aligned in the direction of the blades 356. Notably, a similar shaped lifting handle 372 can be mounted to the opposite sidewall 332 to facilitate lifting and emptying of the bins 54 such as shown in FIG. 23.

The blades 356 extend from the hub 362 across the full width of the left sidewall 330, and slotted openings 374 are provided through the left sidewall adjacent each vertical side edge through which the slotted tabs 360 can project when the front and rear sidewalls 334 and 336 are disposed to abut the left sidewall. With this structure, the blades 356 can be rotated by the handle 372 to extend through the slots 358 of the tabs 360 to secure the left sidewall 330 to the front, right and rear sidewalls 334, 332, and 336, and which can be released to permit the bin 54 to be opened by simply rotating the handle to disengage the blades from the slots.

To promote safety and also provide a positive indication that the blades 356 are fully engaged in the slots 358 of the tabs 360, a metal face plate 376 is attached by screws 378 to the left sidewall 330 about the hub 362, and which is disposed to extend over the blades 356 but behind the handle 372, thereby to conceal all but the terminal end portions of the blades. Raised dimples 380 are formed in the surface of one of the blades 356, and which will detent into a hole 382 formed in the face plate 376 when the blades are in the position fully engaged in the slots 358 of the tabs 360. A second hole 384 is also provided in the face plate 376 which serves to similarly provide a detent indication that the handle 372 has been rotated far enough for the blades 356 to be fully disengaged from the slots 358 of the tabs 360, that position being shown by the phantom line condition in FIG. 25.

It should be noted that since the bins 54 are not formed to seal against the leakage of liquids, to meet sanitary requirements a separate liquid retaining pan 101 is provided within the trolley unit 22 and into which the bins are received. Referring to FIGS. 18 and 19, the liquid retaining pan 101 herein has a rectangular shape with a floor 386 and four upstanding sides 388 formed of aluminum sheet material, and is dimensioned to be fitted within the lower portion of the trolley unit 22 to lie inside the inside walls of the end panels 82 and 83 and the left and right side panels 74 and 75 when the trolley is in use. In this instance, the height of the sides 388 of the pan 101 are formed to extend approximately 4 inches upwardly from the bottom 56 of the trolley 22 the left side edge extending into the vertical slots 95 formed in the lower left edges of the dividing walls 94.

To provide a drain for liquids collected in the pan 101, a drain plug 390 is disposed to releasably seal a drain opening 392 formed through one of the lateral sides 388 of the pan adjacent the floor 386. In this instance, the drain plug 390 is formed as a flap-type valve comprising a spring metal flap 394 secured to its upper end to the side 388 of the pan 101 and having a laterally inwardly directed stopper 396 attached to the other end and disposed to seal the drain opening 392. The metal flap 394 is formed to have a relaxed condition with the stopper 396 laterally spaced outwardly from the drain hole 392, as shown in FIG. 19, but is normally pressed laterally inwardly with the stopper sealing the drain hole by the front end panel 82 when the trolley unit 22 is in use. However, after completion of use, when the sides 40 and 42 of the trolley unit 22 are separated for removal of the bins 54 containing compacted trash, the front end panel 82 will release its holding pressure on the flap 394, thereby permitting the flap and plug 396 to deflect laterally and unseal the drain opening 392 to automatically drain liquids from the pan 101. In this respect, it should be apparent that other types of drain plugs 390 can be used which require manual release, and that such drain plugs could be provided in either or both ends of the pan 101.

Figure 36:
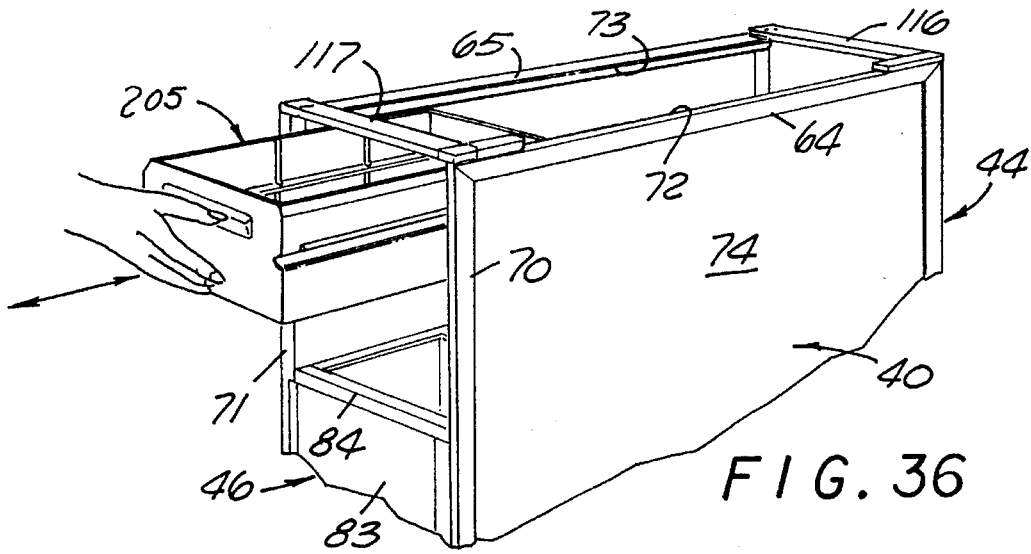
FIG. 36 is a fragmentary perspective view illustrating insertion of a conventional tray into the upper portion of the trolley unit.

It should be noted that since the end walls 44 and 46 and the dividing walls 94 of the trolley unit 22 do not extend the full height of the sides 40 and 42, an open space is created between the side below the latch handles 116 and 117, and through which the upper portion 28 of the frame 23 of the compactor unit 20 projects when the trolley is coupled with the compactor unit. Preferably, the longitudinal length of the upper portion 28 of the compactor unit 20 is dimensioned such that the control panel 36 will be vertically aligned with the front end 44 of the trolley unit 22, and the housing 32 will be substantially flush with the inner sides of the left and right side panels 74 and 75 and project downward to slightly about the top bars 84 of the end panels 82 and 83 so as to substantially fill the open space in the trolley unit 22 above the chambers 52. Additionally, the inner walls of the left and right side panels 74 and 75 may be provided with longitudinally extending bars 203 (see FIGS. 31, 35 and 36) for permitting a conventional service drawer 205 to be slidably mounted in the open space above the chambers 52 for purposes of permitting the trolley unit 22 to be also used for serving as well as trash collection.

When it is desired that trash collected in trolley unit 22 be compacted, the trolley is coupled with the compactor unit 20 by pushing the trolley onto the compactor frame 23 with the trolley wheels 48 supported on the frame base portion 24 and the trolley top rails 72 and 73 overlying the compactor trolley support rails 30 and 31. As best seen in FIGS. 2, 39 and 47, a pair of laterally spaced parallel wheel guides 398 defined by walls 400 upstanding from the base portion 24 of the compactor frame 23 are provided for guiding the wheels 48 for the trolley unit 22 onto the frame. Disposed adjacent the rear wall portion 26 of the compactor frame 23 between the wheel guides 398 is an upstanding elongated handle 402 attached to a pair of laterally spaced compactor wheels 404 (only one of which is shown in FIG. 47) by a pivot shaft 406, and which functions to allow the compactor unit 20 to be easily moved onto and out of the galley unit 12.

As shown in FIG. 47, the handle 402 includes a forwardly bent portion 408 which projects forwardly into the space between the wheel guides 398 when its attached compactor wheels 404 are positioned to lie below the plane of the frame base portion 24. When in this position, the compactor wheels 404 support the rear end of the frame 23 above the floor of the galley unit 12 for rolling the compactor unit 20 by lifting its forward end, such as may be required for maintenance or service. Movement of the handle 402 rearwardly to the broken line portion of FIG. 47, however, results in the compactor wheels 404 being pivoted about the shaft 406 upwardly above the plane of the frame base portion 24, thereby lowering the rear end of the frame 23 onto the floor of the galley unit 12. Notably, since the handle 402 projects onto the space between the wheel guides 398, when the compactor wheels 404 are in position to support the rear end of the compactor frame 23 above the floor of the galley 12, if the trolley unit 22 is moved onto the compactor unit 20 with the handle in this position, the end of the trolley will engage the handle and move the handle rearwardly, thereby automatically retracting the compactor wheels 404 to insure that the compactor frame 23 is fully seated on the galley floor during a compacting operation.

Figure 41:
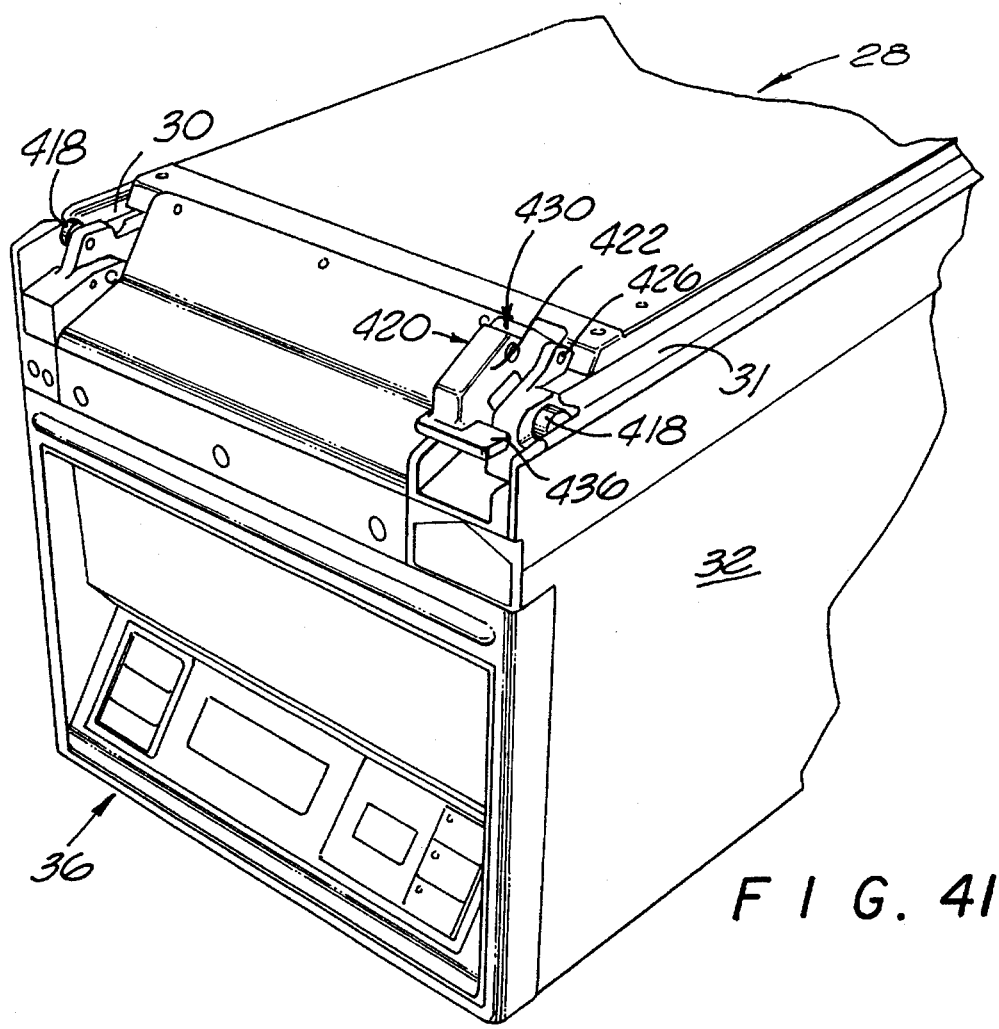
FIG. 41 is an enlarged fragmentary front perspective view of the frame of the compactor unit.
Figure 42:
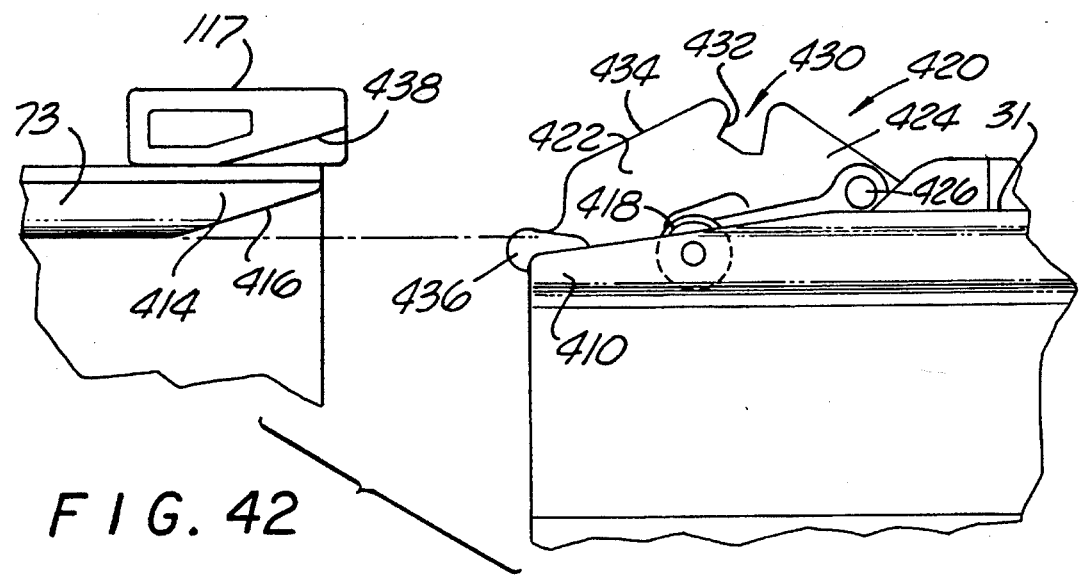
FIG. 42 is a fragmentary side elevational view depicting the top rails of the trolley unit in line to mate with the trolley support rails of the compactor unit.
Figure 43:
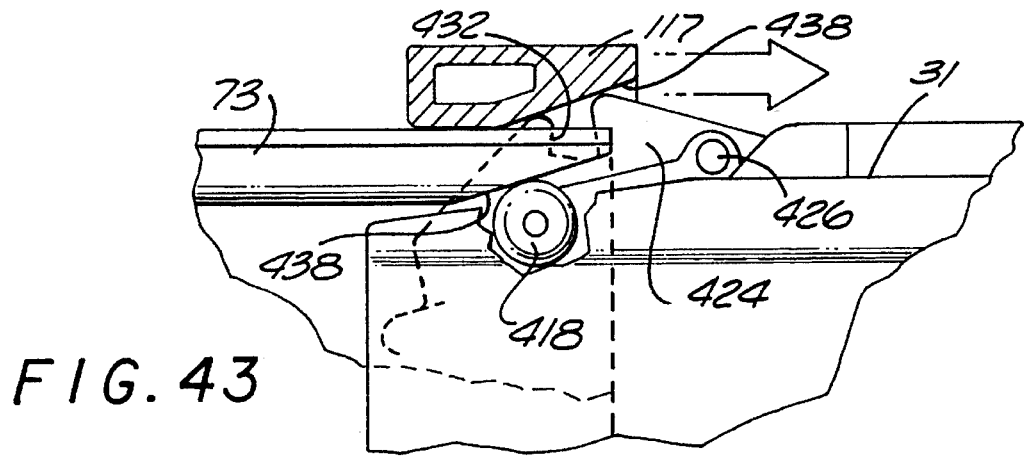
FIG. 43 is a fragmentary side elevational view, partially in cut away cross section showing the mating of the top rails with the trolley support rails of the compactor unit.

With primary reference to FIGS. 41–44, to guide the top rails 72 and 73 of the trolley unit 22 onto the trolly support rails 30 and 31 of the compactor frame 23, the upper sides of the forward end portions 410 of the support rails are inclined slightly downwardly and forwardly and small rollers 418 are provided on the forward end portions to project vertically above the inclined surfaces. As best shown in FIGS. 41-43, lower sides of the terminal end portions 414 of the top rails at each end 44 and 46 of the trolley unit 22 are formed with downwardly sloping ramps 416 so that when the top rails are initially pushed onto the support rails 30 and 31, the sloping ramps of the top rails will engage the rollers 418 and be cammed slightly upwardly onto the support rails.

In accordance with a further important feature of the present invention, a safety interlock device, generally designated 420, is provided for releasably locking the trolley unit 22 to the frame 23 of the compactor unit 20, and for preventing the compaction ram 34 from being operated if the trolley is not properly positioned for a compaction operation, or if the trolley is dislodged before completion of a compaction cycle. Toward this end, as best seen in FIGS. 41–46, disposed laterally inwardly of the forward end portion 410 of the right side trolley support rail 31 is a latch operator comprising an elongated latch body 422 having a rear end 424 which is pivotally attached to the compactor frame 23 by a laterally extending horizontal pivot pin 426, and which is normally disposed to project forwardly in a generally horizontal direction. Positioned about the pivot pin 426 is a torsion spring 428, one end of which engages the latch body 422 and the other end of which engages the compactor frame 23, and which is adapted to bias the latch body toward its normal, generally horizontal position.

Figure 44:
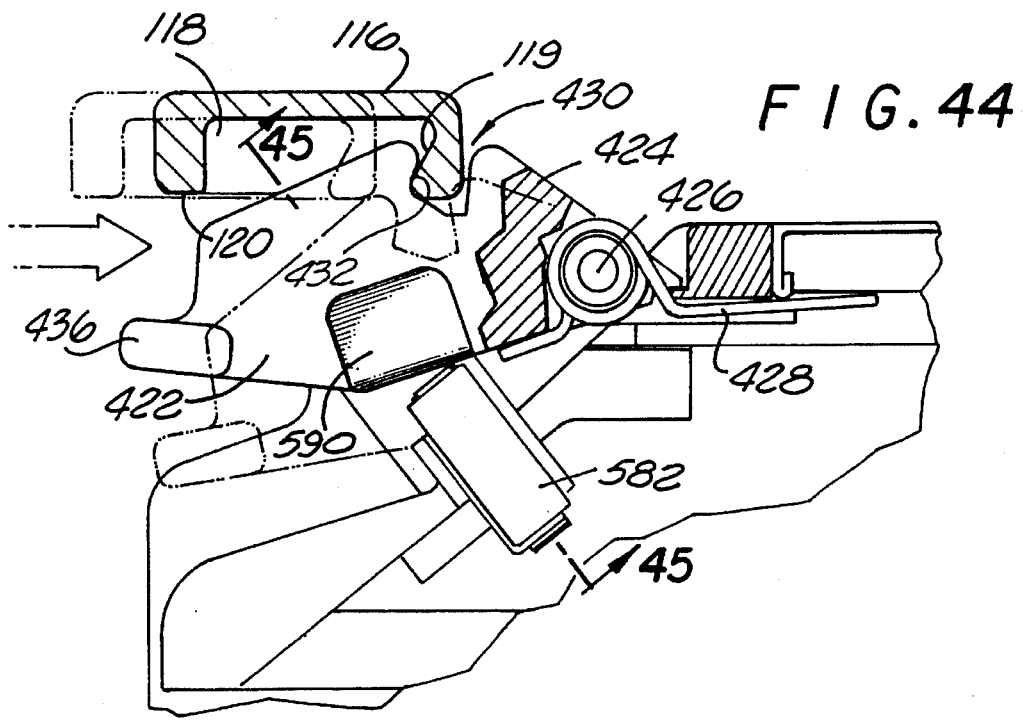
FIG. 44 is an enlarged fragmentary side elevational view, partially in cut away cross section depicting the position of the front latch handle when the trolley unit has been properly positioned on the compactor unit for a compaction cycle.

As best seen in FIGS. 42–44, the upper side of the latch body 422 extends from its rear end 424 upwardly and forwardly above the upper side of the trolley support rail 31, and terminates in a downwardly directed generally U-shaped recess 430 having an undercut forward wall 432. Forwardly from the recess 430, the upper side of the latch body 422 defines a downwardly projecting ramp 434 which extends to a position below the upper side of the trolley support rail 31, and terminates in a laterally disposed actuating tab 436.

As schematically represented in FIGS. 42–44 which depicts the rear end 46 of the trolley unit 22 as shown in FIG. 2, initially engaging the compactor unit 20, as the trolley is pushed onto the compactor frame 23, the ramps 416 of the trolley top rails 72 and 73 will ride over the rollers 418 onto the trolley support rails 30 and 31 of the frame 23, and as this occurs, the right end portion 113 of the latch handle 117 at the rear end 46 of the trolley will engage the downwardly projecting ramp 434 of the latch body 422 and, due to the weight of the trolley, will deflect the latch body downwardly about its pivot pin 426 against the bias of the spring 428. To facilitate the downward deflection of the latch body 422, in this instance, the underside of the rear end latch handle 117 is formed with a downwardly directed inclined surface 438 adjacent its right side end 113, and which is provided to engage the ramp 434 of the latch body, as shown in FIGS. 42 and 43. Notably, a corresponding inclined surface 438 is also provided adjacent the left side end of the latch handle 116 at the front end 44 of the trolley unit 22 so that either end 44 or 46 of the trolley can be initially pushed onto the compactor unit 20. As will be explained below, deflection of the latch body 422 results in an automatic shut off of the compaction ram 34, thereby to ensure that the trolley 22 is not be removed from the compactor frame 23 unless the compaction ram is fully retracted.

Referring to FIG. 44, as the trolley unit 22 is pushed fully onto the compactor unit 20, the latch handle 116 adjacent the front end 44 will then engage the downwardly projecting ramp 434 of the latch body 422 and deflect the body downwardly. However, when the undercut inner edge 119 of the channel 118 formed along the bottom 120 of the latch handle 116 reaches the groove 430 in the latch body 422, the latch body will snap upwardly under the bias of the spring 428 to assume its normal, generally horizontal position. Importantly, in this position, the trolley unit 22 is securely locked in position on the compactor frame 23 and can not be pulled away from the compactor unit 20 due to the engagement of the undercut forward wall 432 of the groove 430 of the latch body 422 with the undercut inner edge 119 of the channel 118 in the latch handle 116. To remove the trolley unit 22 from the compactor unit 20, positive action is required, as the flight attendant or operator must first depress the latch body 422 by depressing the operator tab 436 to move the groove 430 of the latch body away from and out of engagement with the latch handle 116.

Figure 40:
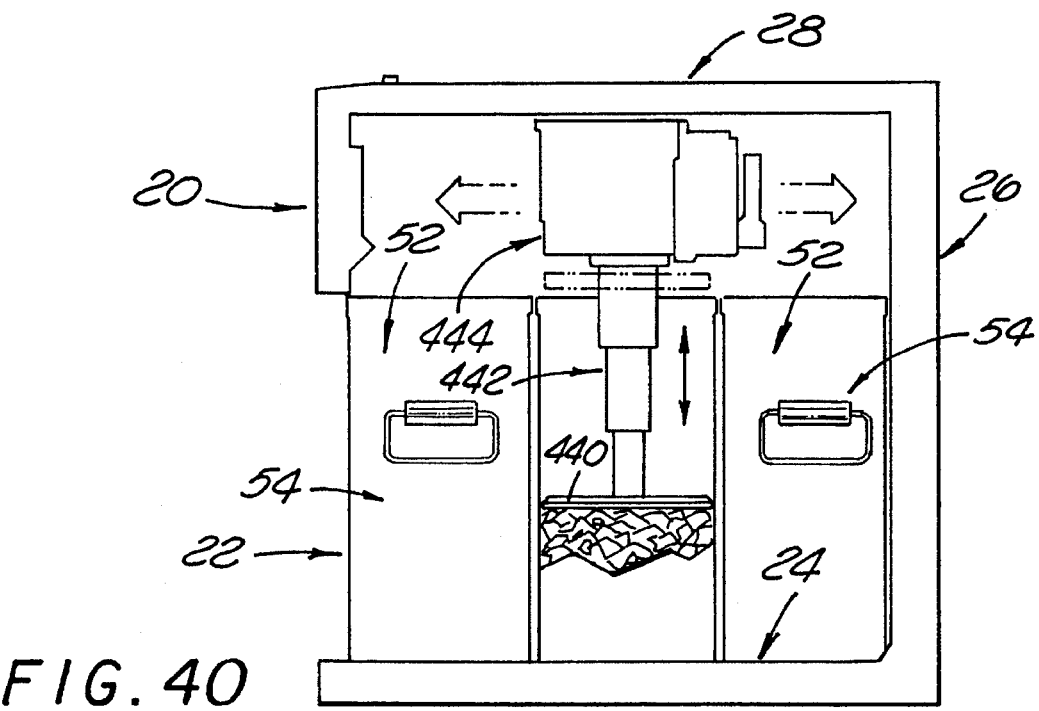
FIG. 40 is a schematic side view depicting compaction of trash in the bins of the trolley unit when coupled with the compactor unit.

As diagramatically illustrated in FIG. 40, when the trolley unit 22 is mated with the compactor unit 20, the compaction ram 34 will sequentially compact the trash in each bin 54 by indexing from the rear end 46 of the trolley to the front end 44, stopping over each trolley compartment 52 and extending a compacting platen 440 downwardly into the bin. To extend and retract the platen 440 of the compaction ram 34, a three stage hydraulic fluid operated piston assembly 442 is supported by a carriage assembly 444 mounted within the housing 32 for longitudinal movement along laterally spaced tracks 446 disposed below the trolley support rails 30 and 31.

Figure 52:
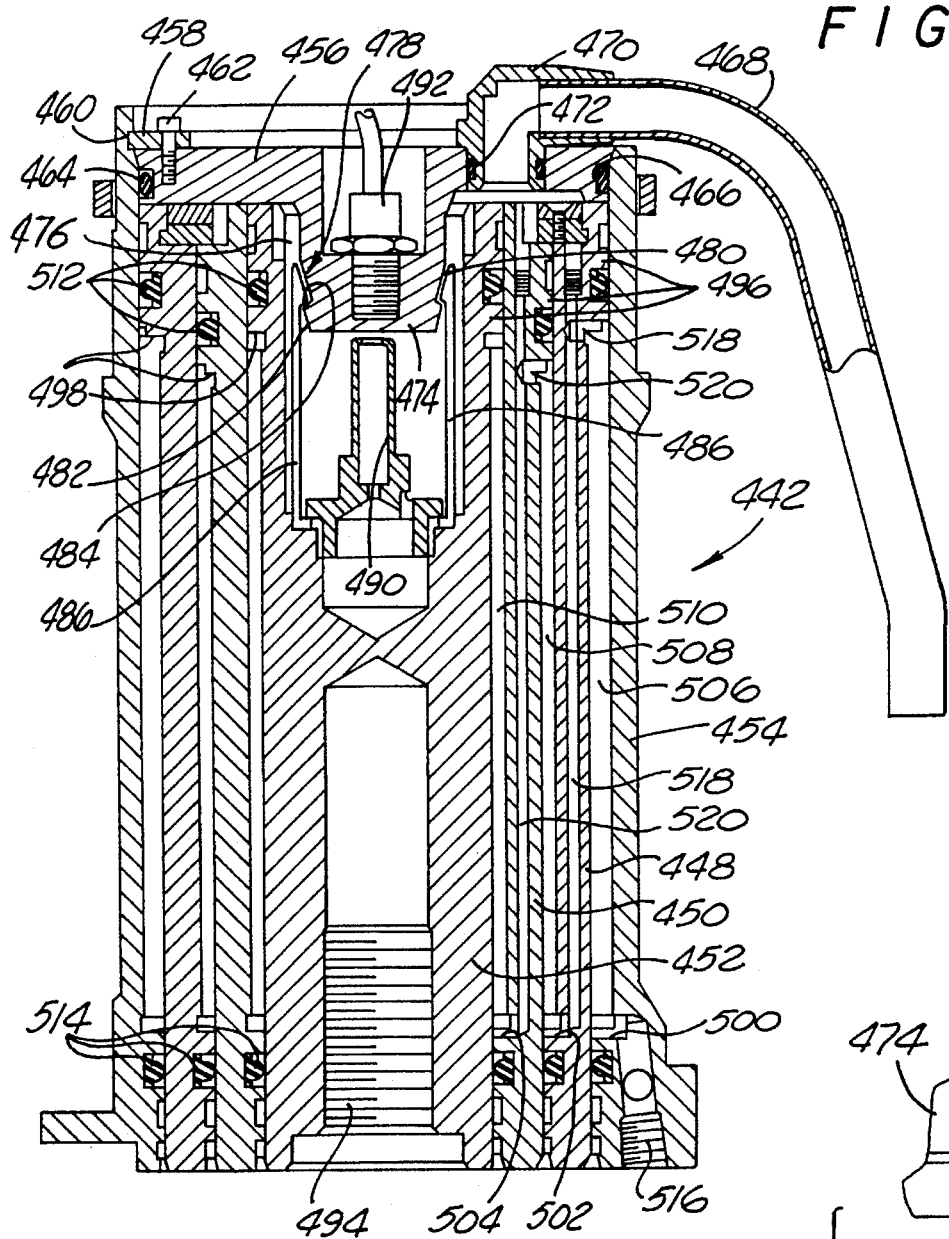
FIG. 52 is a cross sectional view of the piston assembly of the compaction ram of the compactor unit.
Figure 53:
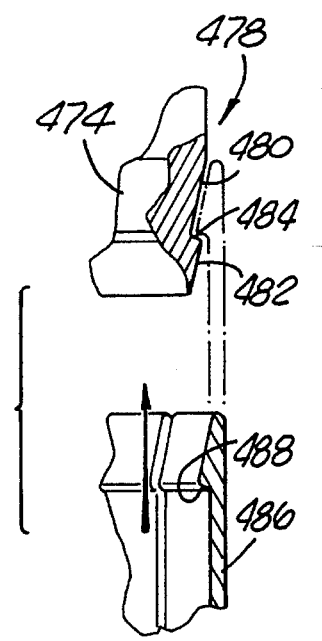
FIG. 53 is a fragmentary perspective view partially in cross section illustrating the latching mechanism for locking the piston in the retracted position.

As shown in FIGS. 52 and 53 the piston assembly 442, shown in the fully retracted position, herein comprising three concentrically mounted cylindrical piston sections 448, 450 and 452, each approximately 6 inches in length, telescoped within an outer cylindrical casing 454 secured at its upper end to the carriage assembly 444. The upper or extension end of the casing 454 is closed by a generally disc-shaped end plate 456, herein attached by an enlarged diameter annular retaining ring 458 fitted into a peripheral groove 460 around the inside upper end of the casing and which is secured to the end plate by bolts 462. To seal the inside of the casing 454 at the top, an 0-ring seal 464 is herein provided in a laterally open groove 466 formed peripherally around the end plate 456, and a hydraulic conduit 468 is coupled to an L-shaped connection 470 disposed through the top of the end plate to direct pressurized fluid into the upper end of the casing, the conduit being herein sealed to the end plate by an 0-ring seal 472.

The center of the end plate 456 is formed to include a downwardly extending cylindrical lock post 474 which projects downwardly into a relatively large diameter cylindrical cavity 476 formed in the upper end of the inner piston section 452, and which is shaped to form an annular locking step 478 defined by two axially spaced and radially inwardly tapering cylindrical wall portions 480 and 482 connected by a relatively short, slightly axially downwardly inclined radial wall portion 484 forming an axially upwardly facing shoulder. Disposed to project upwardly within the cylindrical cavity 476 of the inner piston section 452 are a plurality of spring fingers 486, preferably four in number, and which are disposed to mate with and frictionally engage the locking step 478 of the lock post 474, when the inner piston section 452 is moved upwardly to the fully retracted position. To releasably lock the inner piston section 452 to the locking step 478, each of the spring fingers 486 includes a radially inwardly and axially downwardly facing shoulder 488 adapted to mate with the radial wall portion 484 of the locking step 478, and when so mated, forms a fail-safe mechanical lock which releasably holds the inner piston section to the end plate 456. Preferably, the spring fingers 486 are formed to release from the locking step 478 under a downwardly directed load of about 200 pounds which is sufficient to ensure that the ram will not inadvertently extend during noncompaction conditions.

Also disposed within the cylindrical cavity 478 of the inner piston section 452 is an upwardly projecting cylindrical bar magnet 490, the upper end of which lies just below the lower end of the lock post 478 when the inner piston section is in its fully retracted position. The bar magnet 490 is intended to actuate a magnetic reed switch 492 disposed centrally in the lock post 474 and which sends a signal to the electrical system of the compactor unit 20 to indicate that the compaction ram 34 is in the fully retracted, inoperative position.

Figure 39:
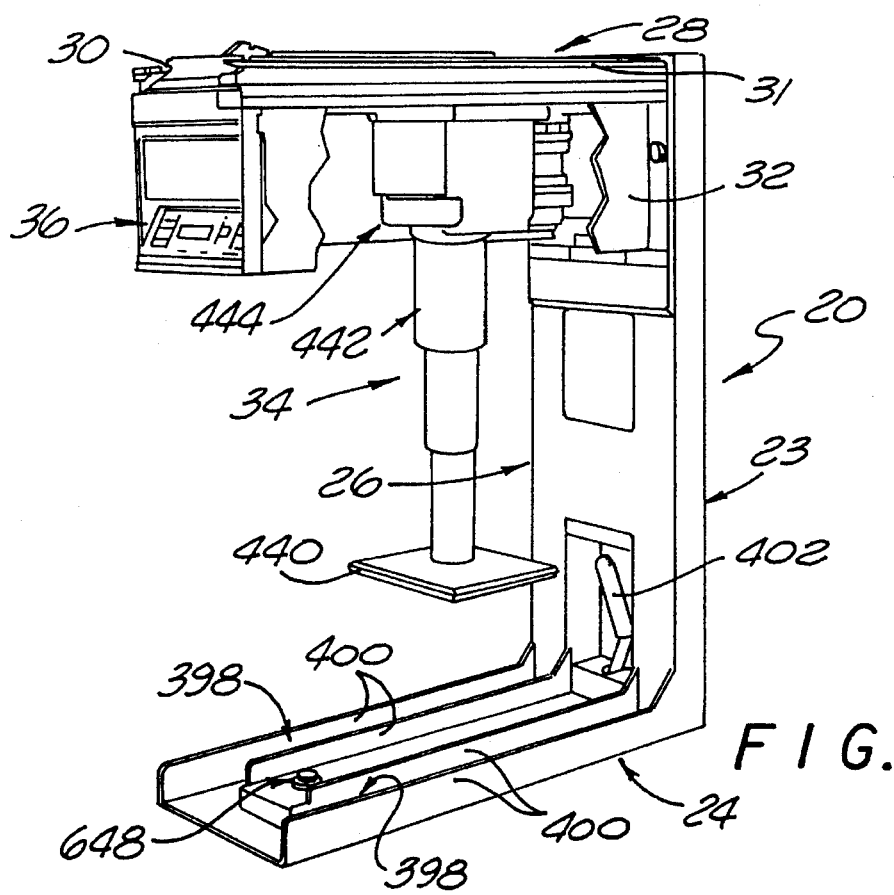
FIG. 39 is a perspective view of the compactor unit of the present invention.

As best seen in FIGS. 39 and 52, the compaction platen 440 of the compaction ram 34 is secured to the lower end of the inner piston section 452, herein by a threaded shaft (not shown) which projects upwardly into a threaded axial bore 494 formed centrally through the lower end of the inner piston section. Thus, when the inner piston section 452 is in its fully retracted position with the spring fingers 486 engaged with the locking step 478 of the lock post 474, the platen is securely held in the inoperative position.

It is important to note that since the trolley support rails 30 and 31 on which the trolley unit 22 is supported, are positioned to be above the platen 440 of the compaction ram 34, the lateral dimension of the platen is not restricted to the distance between the trolley support rails, but rather is limited only by the size of the cross-sectional opening of the bins 54, thus enabling larger size bins to be used to increase overall efficiency. Further, the platen 440 which herein has a cross-sectional size of approximately eight inches in length and ten inches in lateral width, will closely fit into the bins 54 and substantially eliminate any possibility of trash extruding around the platen during compaction, thereby further enhancing the efficiency of the compaction process.

Each of the piston sections 448, 450 and 452 is adapted to extend downwardly under the force of pressurized hydraulic fluid admitted into the upper end of the casing 454, and each includes a radially outwardly projecting peripheral flange 496 around the upper end which forms a stop shoulder 498 for limiting downward travel. As shown in FIG. 52, the stop shoulder 498 of the outer piston section 448 is adapted to engage an upwardly and radially inwardly directed peripheral shoulder 500 formed around the lower inside end of the casing 454, while the stop shoulders 498 of the middle piston section 450 and inner piston section 452 are each adapted to engage upwardly and radially inwardly directed peripheral shoulders 502 and 504 formed, respectively, around the lower inner ends of the outer and middle piston sections 448 and 450. Longitudinally extending cylindrical outer, middle and inner chambers 506, 508 and 510 are thus formed between, respectively, the peripheral flanges 496 at the tops of each piston section 448, 450 and 452, and the peripheral shoulders 500, 502 and 504, at the lower ends of, respectively, the casing 454, outer piston section 448 and middle piston section 450, and which serve as chambers for receiving pressurized hydraulic fluid to retract the compacting ram 34. Herein, packing seals 512 are disposed in outwardly open peripheral grooves formed in the inner, middle and outer piston sections 452, 450 and 448 adjacent the upper ends, and corresponding packing seals 514 are disposed in inwardly open grooves formed in the lower ends of the middle and outer piston sections 450 and 448, and the casing 454, and which function to form fluid seals for sealing the ends of the chambers 510, 508 and 506 between the piston sections and the casing.

To admit hydraulic fluid into the casing 454 for retracting the compaction ram 34, a hydraulic fluid passage 516 is formed in the lower or retraction end of the casing and which communicates between a fluid supply line (discussed later in connection with FIG. 38) and the outer chamber 506 formed between the inner wall of the casing and the outer wall of the outer piston section 448. To permit fluid in the outer chamber 506 to communicate with the middle chamber 508, a passageway 518 is formed to extend between the upper end of the outer piston section 448 and the lower end of the middle chamber 508, a corresponding passageway 520 being formed in the middle piston section 450 to provide fluid communication between the upper end of the middle chamber 508 and the lower end of the inner chamber 510.

In operation, since the cross sectional area of the piston sections 448, 450, and 452 at the upper extension end is greater than that at the lower retraction end, pressurized hydraulic fluid admitted into the piston assembly 442 through conduit 468 and passage 516 will result in net downward force tending to extend the platen 440. As the pressure of the hydraulic fluid increases due to the engagement of spring fingers 486 with the locking stop 478, the downward force will reach an amount sufficient to release the spring fingers, thereby permitting the piston sections 448, 450 and 452 to extend and move the platen 440 downwardly into the associate bin 54 and chamber 52. As the platen 440 encounters trash within the bin 54, the resistance creates an increase in the fluid supply line pressure, thereby increasing the compaction force generated by the compaction ram 34. Preferably, the hydraulic system is designed to produce a maximum supply line pressure of 825 psi, which enables the platen 440 to produce approximately 7,000 pounds of force on trash within the bins 54. Upon reaching the maximum supply line pressure, the compaction ram 34 automatically reverses and moves the platen 440 upwardly to the fully retracted and locked position in preparation for the next compaction cycle.

As best seen in FIGS. 49–51, the carriage assembly 444 includes a generally rectangular shaped frame 522 of generally rectangular horizontal cross section formed of machined structured aluminum, supported on the tracks 446 by four toothed wheels 526, 527, 528 and 529 disposed on each upper corner of the frame. In this instance, the front wheels 526 and 527 are each mounted to the forward end 534 of the frame 522 by stub axles 536, and the rear wheels 528 and 529 are secured to the lateral ends of a drive axle 538 journaled through the rear end 540 of the frame. Attached to the frame 522 forwardly of the drive axle 538 is an electric drive motor 542 having a laterally projecting drive shaft 544 to the end of which is secured a drive gear 546. The drive gear 546, in turn, drivingly engages a gear 548 formed on the drive axle 538 and serves to rotate the drive axle and attached wheels 528 and 529 for moving the carriage assembly 444 along the tracks 446. Also supported by the frame 522 of the carriage assembly 444 to project downwardly therefrom is the compaction ram 34 and associated components, including a hydraulic fluid reservoir 550 and pump 552.

It is important to note that the tracks 446 along which the carriage assembly 444 moves are mounted to the trolley support rails 30 and 31. As best seen in FIG. 54, the trolley support rails 30 and 31 are each formed as an elongated structural aluminum extrusion secured at its rear end to the upper end of the rear wall portion 26 of the frame 23 of the compactor unit 20, and extends in cantilever fashion forwardly to the operating control panel 36. The trolley support rails 30 and 31 are laterally spaced to be received inside the left and right sides 40 and 42 of the trolley unit 22, and include upper, slightly concave support surfaces 554 which are adapted to mate with and support cooperatively shaped lower surfaces 556 formed along the underside of the top rails 72 and 73 of the trolley.

Below the support surfaces 554 of each trolley support rail 30 and 31, each trolley support rail 30 and 31 has a laterally inwardly open generally C-shaped recess 558 defining a horizontal lower surface 560 extending parallel with the support surface 554, and which forms a mounting to which elongated rectangular blocks 562 of machined steel having upwardly projecting lateral teeth are secured to define the tracks 446 along the carriage assembly 444 moves. Notably, each longitudinal side of the frame 522 of the carriage assembly 444 also includes a laterally outwardly projecting flange 564 disposed vertically below the wheels 526 and 528, 527 and 529, and which forms an upwardly facing horizontal abutment surface 566 which lies closely below a corresponding downwardly facing horizontal abutment surface 568 formed by the lower side of the trolley support rail 30, 31.

To isolate the forces generated by the compaction ram 34 during a compaction operation from the floor of the galley unit 12, the wheels 48 of the trolley unit 22 are mounted to the bottom 56 of the trolley through mounting blocks 570, best seen in FIGS. 47 and 48, which are secured to the bottom 56 of the trolley by elongated carriage bolts 572 slidably received in vertical bores 574 formed through the blocks. Importantly, the mounting blocks 570 are vertically spaced downwardly below the bottom 56 of the trolley unit 22 to provide a relatively small gap 576 therebetween, the size of the gap being slightly larger than the spacing between the abutment surface 568 of the trolley support rails 30 and 31 and the abutment surface of the frame 566 of the carriage assembly 444. Disposed in downwardly opening recesses 578 formed around the carriage bolts 572 in the upper face of each of the blocks 570 are wheel support compression springs 580 which bias the blocks downwardly away from the bottom 56 of the trolley unit 22. With this construction, the trolley unit 22 is permitted to move vertically downwardly relative to the wheels 48 against the bias of the wheel support springs 580.

During compaction of trash within the bins 54, the platen 440 exerts a force downwardly which acts against the bottom 56 of the trolley unit 22 tending to push the trolley downwardly against the force of the springs 580. However, since the top rails 72 and 73 of the trolley unit 22 are engaged with the trolley support rails 30 and 31, the trolley is suspended from the support rails and prevented from any appreciable downward movement, and the downward loads on the trolley bottom 56 are therefore transferred through the trolley side and end panels 74, 75, 82 and 83 and the channels 58, 59, 60, 61, 64, 65, 66, 67, 68, 69, 70 and 71 to the support rails.

Notably, the downwardly directed compaction force generated on the trolley unit 22 by the compaction ram 34 is accompanied by a corresponding upwardly directed reaction force of equal magnitude on the carriage assembly 444 which supports the compaction ram. The upwardly directed reaction force acting on the carriage assembly 444 is, in turn, transmitted through the frame 522 to the upwardly facing abutment surfaces 566 underlying the corresponding downwardly facing abutment surfaces 568 formed on the trolley support rails 30 and 31 which causes the carriage to actually raise upwardly until the abutment surfaces engage, thereby transferring the upwardly directed forces to the trolley support rails. Thus, since the downward loads on the trolley unit 22 are transmitted through the trolley to the support rails 30 and 31, and the corresponding reactive forces of the compaction ram 34 are transmitted through the frame 522 of the carriage assembly 444 to the trolley support rails, these loads will cancel, and the floor of the galley unit 12 will experience no load increase, except as may be applied by compression of the wheel support springs 580.

In accordance with a further important aspect of the invention, the compaction unit 20 includes multiple automatic shut-off mechanisms which prevent initiation of a compaction cycle if the trolley unit 22 is not fully and properly mated with the compaction unit, and which will automatically shut-off the compaction ram 34 if the trolley should be attempted to be removed from the compaction unit prior to completion of a compaction cycle, and also includes sensing devices for insuring that that compaction ram is accurately and precisely positioned over each of the bins 54 in each chamber 52 of the trolley before a compaction cycle can be performed. Further, the compaction unit 20 includes a sensor device for insuring that the compactor ram 34 is in its fully retracted, inoperative position before a compaction cycle can be initiated, and for insuring that the ram is fully retracted before the system can index from one compaction position to the next. A hydraulic fluid sensor is additionally provided to automatically retract the compaction ram should an abnormally low hydraulic fluid condition occur, such as may be caused by fluid leak, and pressure sensors are provided to automatically retract the ram upon completion of a compacting operation.

Figures 45, 46:
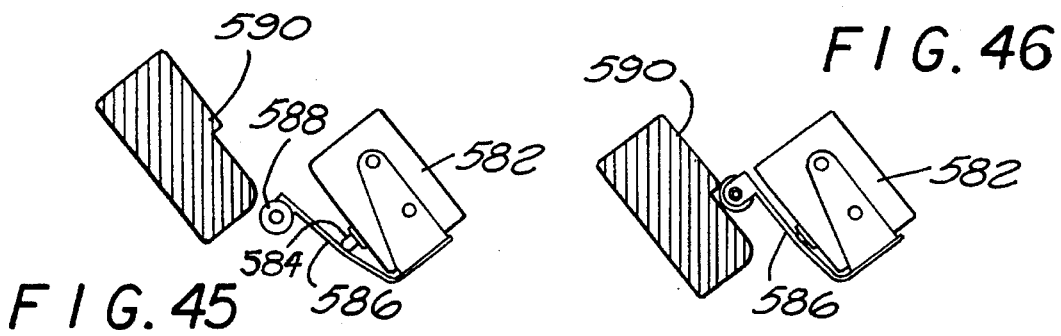
FIG. 45 is a side elevational view as viewed in the direction of the arrow 45—45 of FIG. 44.
FIG. 46 is a view similar to FIG. 45 but showing the position of the microswitch when the latch lock is in the depressed phantom line position of FIG. 44.

Toward the foregoing ends, as shown in FIGS. 44–46, coupled to the compactor frame 23 below the latch body 422 is a conventional normally closed micro-switch, generally designated 582, having a switch plunger 584 adapted to be depressed by the side of a leaf spring type operator 586 having a roller 588 disposed on its free end. The micro-switch 582 is coupled to the electrical operating circuit of the compactor unit 20 such that it acts as an automatic shut-off when the plunger 584 is depressed. Normally, the leaf spring operator 586 is laterally spaced away from the switch plunger 584, as shown in FIG. 45, but can be cammed into engagement with the switch plunger as a result of a downward movement of a cam block 590 formed on the side of the latch body 422, as seen in FIG. 46 which depicts the position of the cam block when the latch body is in the broken line position of FIG. 44. Thus, if the latch body 422 is depressed from its normal position, the micro-switch 582 will be automatically activated to shut-off the compactor unit 20, so that if the trolley unit 22 is not fully pushed into locking engagement with the latch body, the compaction ram 34 can not be operated, and should the latch body 422 be manually depressed to prematurely remove the trolley from the compactor unit during a compaction cycle, the compactor unit will also automatically shut-off.

To also ensure that the trolley unit 22 has been fully and properly mated with the compactor unit 20 before a compaction cycle can be initiated, a pair of laterally spaced interlock switches 592 are positioned on the rear wall portion 26 of the compactor unit frame 23, and which must be activated before compaction. As best seen in FIG. 49, these interlock switches 592 each comprise normally open push button activated switches having an enlarged operating button 594 which project forwardly from the rear wall portion 26 adjacent its upper end below the trolley support rails 30 and 31, and are positioned to be engaged by the front or rear end panels 44 or 46 of the trolley unit 22 when the trolley has been fully and properly mated with the compactor unit 20. Unless and until these interlock switches 592 are closed by depression of the buttons 594, the compaction ram 34 will be inoperative.

To accurately and precisely position the carriage assembly 444 along the tracks 446 for each compaction operation, and to insure that the compaction ram 34 is not operated until it has been properly located over the chamber 52 to be compacted, rear, middle and front chamber sensors 596, 598 and 600 are disposed at spaced locations along the left side track, and which operate to provide a signal that the drive motor 542 of the carriage assembly should be turned off and locked when the carriage has reached the desired position over the chamber to be compacted. Additionally, a normally closed, plunger operated carriage switch 602 is carried by the carriage assembly 444, and which is activated by rear, middle, and front detent openings 604, 606 and 608 formed at precisely located spaced points along the right side track. Only if the carriage assembly 444 is precisely positioned over the desired chamber 52 will the carriage switch 602 open to allow a compaction cycle to be initiated.

In this instance, the rear, middle and front chamber sensors 596, 598 and 600 each comprise a Hall-effect type sensor 610 disposed to sense a magnet 612 carried by the carriage assembly 444. The carriage switch 602 herein includes a leaf-spring operator 614 secured to the switch and which carries a roller operator 616 biased to drop into the detent openings 604, 606 and 608 along the track, thereby to open the switch.

As the drive motor 542 moves the carriage assembly 444 from one chamber 52 to the next, for example from the rear chamber to the middle chamber, the middle chamber Hall sensor 598 will detect the approach of the magnet 612 and send a signal which will then turn off and lock the drive motor causing the carriage to stop over the middle chamber. If, however, the carriage switch 602 has not been activated, by roller 616 having seated in the middle groove 606, the compaction ram 34 can not be extended to perform a compaction cycle. This ensures that the compaction ram 34 will not extend unless it is precisely positioned over the chamber 52 with the platen 440 positioned to extend into the bin 54 without damaging the trolley or bin.

Figure 37:
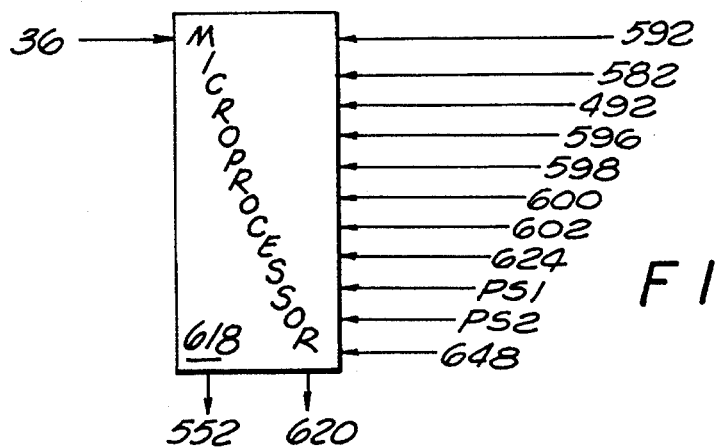
FIG. 37 is a schematic illustration of the electrical connections to the control system microprocessor for affecting operation of the compactor unit.

It should be noted that the compactor unit 20 includes an electronic operating system having a microprocessor control unit 618 for performing various checks and functions necessary for proper operation. As schematically illustrated in FIG. 37, the microprocessor 618 receives the various electrical signals from the control panel 36 and the switches and sensors of the compactor unit 20, and, through logic sequences, performs the checks and functions required for operating the compaction ram 34 and indexing of the carriage assembly 444, as well as insuring that the trolley unit 22 has been properly positioned on the compactor unit 20.

Figure 38:
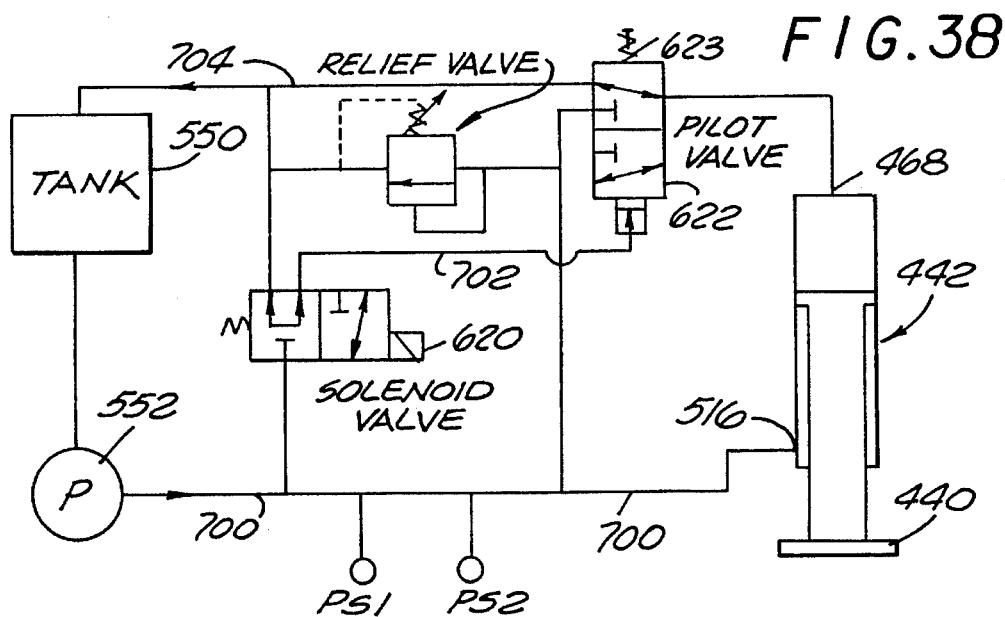
FIG. 38 is a schematic diagram of the hydraulic circuit for the compaction ram of the compactor unit.

As schematically illustrated in FIG. 38, which shows the hydraulic circuit for the compaction ram 34, herein in the inoperative condition with the platen 440 fully retracted, when a compaction cycle is initiated, the microprocessor unit 618 will initially check to insure that the trolley unit 22 is properly positioned and locked to the compactor unit 20 by checking the condition of the interlock switches 592 and the microswitch 582, and will check to insure that the platen 440 is fully retracted and the carriage assembly 444 properly positioned over the rear chamber 52 by checking the condition of the magnetic reed switch 492 and the carriage switch 602 and Hall-effect sensor 596. Assuming all switches 592, 582, 492, 602 and 596 are in the proper condition, the microprocessor 618 will activate the pump 552 to supply pressurized hydraulic fluid from the reservoir tank 550 to a hydraulic supply line 700. The microprocessor 618 will also activate a solenoid valve 620 in the hydraulic fluid supply line 700 to move the valve to the left from the condition shown in FIG. 38 to couple the supply line with a fluid line 702 leading to a spring biased pilot valve 622. Pressurized fluid supplied to line 702 will then move the pilot valve 622 against the bias of its spring 623 upwardly from the position shown to connect the supply line with the inlet conduit 468 leading to the upper extension end of the piston assembly 442. Notably, the supply line 700, from the pump 552 also supplies pressurized fluid to the lower retraction end of the piston assembly 442 through the passage 516 so that both the extension and retraction ends of the piston assembly receive pressurized hydraulic fluid when the pump is operating. Due, however, to the larger surface area of the combined piston sections 448, 450, and 452 exposed to the pressurized fluid at the extension end of the piston assembly 442 as compared with the surface area exposed at the retraction end, the pressurized fluid will cause the piston sections to extend, thereby to move the platen 440 downwardly into the bin 54 disposed in the chamber 52 at the rear end 46 of the trolley 22.

To prevent the possibility of the hydraulic pump 552 becoming damaged by the loss of fluid pressure, disposed within the hydraulic fluid supply tank 550 is a fluid sensor 624 which will send a signal to the microprocessor 618 to retract the compaction ram 34 if the amount of fluid in the hydraulic system drops below a preselected amount. Herein, as seen in FIGS. 54 and 55, the fluid sensor 624 comprises a inner and outer elongated hollow cylindrical tubes 626 and 628 formed of electrically conducive material concentrically mounted to project downwardly into the tank 550 and are secured therein by a bottom cap 630 formed of insulating material, and to which an upstanding rod 632 is attached, herein by a screw 634, and which extends upwardly centrally through the inner tube 626 to a top end cap 636, also formed of insulating material, the rod having a threaded upper end 638 which is received in a threaded hole in the end cap.

An annular space 640 is formed between the walls of the inner and outer tubes 626 and 628, and openings 642 are formed through the tube walls to permit fluid to flow between the tubes within the annular space. Projecting through the top cap 636 are a pair of contact posts 644, one of which is connected to the inner tube 626 and the other which is connection to the outer tube 628, and which send output signals to the microprocessor 618. By sensing the change in capacitance between the inner and outer tubes 626 and 628, as a result of the change in the dielectric constant in the annular space 640 which occurs as hydraulic fluid within the tank 550 is removed and replaced by air, the microprocessor 618 can detect if an abnormally low hydraulic fluid level within the tank occurs. Preferably, the microprocessor 618 is calibrated such that a low fluid level indication will result before the fluid level in the tank 550 has become so low that further operation of the pump 552 would cause damage.

Should, the microprocessor 618 receive a low fluid signal from the fluid sensor 624 during a compaction cycle, the microprocessor will actuate the solenoid valve 620 to move the valve to the left to the position shown in FIG. 38. In this position, the line 702 to the pilot valve 622 will then be directed to a return line 704, thereby relieving pressure to the pilot valve and causing the pilot valve 622 to shift to the position shown under the bias of its spring 623. This, in turn, couples the extension end of the piston assembly 442 through the pilot valve 622 with the return line 704, allowing the fluid in the extension end to bleed back to the tank 550. In this condition, with the pump 552 still operating, the platen 440 will be automatically retracted since pressurized fluid is now supplied to only the retraction end of the piston assembly 442 through the pressure supply line 700. A malfunction indication is then sent to a display screen on the control panel 36 by the microprocessor 618 to inform the flight attendant or operator of the low fluid condition.

If, during the course of a compaction operation a premature attempt is made to remove the trolley unit 22 from the compactor unit 20, depression of the latch body 422 of the safety interlock device 420 will cause the microswitch 582 to be activated whereby the microprocessor 618 will immediately turn-off the pump 552 to deactivate the piston assembly 442. The microprocessor 618 will then display instructions on the control panel 36 advising of the shut down and what steps should be taken to correct the condition. In this regard, it is desirable that under these conditions the piston assembly 442 not be automatically retracted since the trolley unit 22 may have been physically moved such that the platen 440 is no longer properly aligned with the chamber 52 and an automatic retraction could damage the bin 54 and/or trolley.

Returning to the normal operating conditions, once the solenoid valve 620 has been moved to supply fluid to the pilot valve 622 and the extension side of the piston assembly 442 is coupled to the fluid supply line 700, the pressure on the extension end of the piston sections 448,450 and 452 will become sufficient to overcome the locking fingers 478, and the piston assembly begins to extend the platen 440 downwardly into the bin 54 in the rear chamber 52. Simultaneously, a time clock circuit within the microprocessor 618 is activated, and the microprocessor sequentially polls the output of one of two pressure sensors disposed in the fluid supply line 700. The first pressure sensor, designated PS1, is adapted to sense a low pressure of approximately 525 psi, and the second pressure sensor, designated PS2, is adapted to sense a higher pressure of approximately 825 psi.

If the microprocessor 618 receives a signal from the low pressure sensor PS1 that the fluid pressure within the supply line 700 has reached 525 psi before a preset time on the microprocessor time clock has elapsed, the microprocessor will activate the solenoid valve 620 to retract the platen 440. This condition typically occurs when the bin 54 is over half full of compacted trash. If, however, the low pressure sensor PS1 has not indicated that the set pressure has been reached after the preset allotted time has elapsed, the microprocessor 618 then begins to poll the high pressure sensor PS2. When the high pressure sensor PS2 has indicated that the pressure in the supply line 700 has reached the higher level, the microprocessor will then activate the solenoid valve 620 and retract the platen 440. This latter condition occurs when the bin 54 is empty or has relatively little trash therein to be compacted.

Upon completion of the compaction cycle and retraction of the platen 440 and locking of the inner piston section 452 to the casing 454, the microprocessor 618 will initiate an index process to move the carriage assembly 444 forwardly to the middle chamber 52 of the trolley unit 22. After again checking that the trolley unit 22 is properly positioned on the compactor unit 20, and that the platen is fully retracted, the microprocessor 618 starts the carriage motor 542 to rotate the drive wheels 528 and 529 forwardly along the tracks 446.

As the carriage assembly 444 approaches the middle chamber position, the middle Hall sensor 598 will sense the magnet 612 which tells the microprocessor 618 to turn off the motor 542. The microprocessor 618 will then check the carriage switch 602 to determine if the roller 616 has seated in the middle groove 606. If the carriage switch 602 is found to not have been activated, the microprocessor 618 will incrementally "step" the carriage motor 542 forwardly or rearwardly, depending upon whether or not the associated groove has been passed, until the carriage switch is activated indicating that the platen 440 is properly aligned for compaction with the middle chamber 52 of the trolley unit 22. Thereafter, the microprocessor 618 activates the solenoid valve 620 to commence the compaction cycle for the middle chamber 52.

It should be noted that the microprocessor 618 can be designed to permit a flight attendant or operator to separately select individual chambers 52 of the trolley unit 22 for compaction. In the presently preferred embodiment of the invention, the microprocessor is designed so that in addition to an all chamber selection button, individual rear, middle and front chamber selection buttons are provided on the control panel 36 to permit such selection. Additionally, the microprocessor 618 can be designed to display various messages on a display screen on the control panel 36 to indicate the current status of the apparatus, warning and error messages, and other information helpful to operation of the compaction unit 20.

Additionally, the trolley unit 22 and the bins 54 are each capable of being cleaned simply by removal and washing in conventional automatic catering kitchen washing systems. To clean the compactor unit 20, the compaction ram 34 must be extended without a trolley unit 22 being mounted on the compaction frame 23. To achieve this result, a foot operable clean switch 648 is provided on the lower portion 24 of the frame 23 of the compactor unit 20 between the wheel guides 398, and which serves as an over-ride for the microswitch 582 of the safety interlock device 420, and the two interlock switches 592. Activation of the clean switch 648 enables ground personnel to extend and retract the piston assembly 442 even though no trolley unit 22 is mated with the compaction unit 20.

From the foregoing, it will be appreciated that the present invention provides an efficient and effective trash collection and compaction apparatus 10 that provides a one-step trash handling system which allows for the source-separation of recycleable trash, yet which reduces significantly the time and effort heretofore required for collection and compaction of trash. Further, the trash collection and compaction apparatus 10 is small in size, light in weight, and reliable in use, yet meets all FAA and global airworthiness requirements for use aboard commercial passenger aircraft to provide a safe, organized and sanitary system capable of reducing large quantities of trash into a very small volume to provide substantial saving in aircraft space. Moreover, the trash collection and compaction apparatus 10 is simple to use and can be installed in virtually any aircraft in place of a conventional service cart without requiring and modification or structure change in the aircraft or its galley unit.

While the foregoing discussion of the presently preferred embodiment has been presented in connection with use of the trash collection and compaction apparatus 10 on aircraft, is should be apparent that the apparatus of the invention can also find utility in other applications such as on passenger trains, ships and buses, as well as others. Further, while a particular form of the invention has been illustrated and described, it will be apparent that various modifications and changes can be made without departing from the spirit and scope of the invention.

What is claimed is:

1. A trash collection and compacting apparatus primarily intended for use on board a passenger aircraft during flight, said apparatus comprising:

a trash compactor unit including:

a rigid metal frame defining generally horizontal elongated upper and lower vertically spaced frame sections, said lower frame section adapted to support said compactor unit on a floor in an aircraft, and said upper frame section having a pair of horizontally disposed and laterally spaced elongated support rails; and a compaction ram mounted to said upper frame section and disposed to project downwardly therefrom below said support rails, said compaction ram including an extendable and retractable compaction platen; and a trolley unit having a generally rectangular shaped horizontal bottom with upstanding sides defined by front and rear end panels, and left and right side panels, and including:

at least one upwardly open trash chamber formed between said bottom, said end panels and said side panels;

wheels rotatably attached to said bottom for moving said trolley unit through the aircraft for collection of trash in said chamber;

a pair of generally horizontally disposed elongated top rails secured to said side panels and extending between said end panels, said top rails being adapted to mate with said support rails of said compactor unit with said compaction ram disposed to vertically overlie said chamber; and a removable upwardly open trash bin disposed within said chamber and within which trash is collected, whereby upon mating of said top rails of said trolley unit with said support rails of said compactor unit, extension of said compactor platen will move said platen downwardly into said chamber and said bin, thereby to compact the trash collected therein.

2. A trash collection and compacting apparatus as set forth in claim 1 wherein said trolley unit includes front and rear horizontally disposed and laterally extending elongated latch handles each having one end coupled to said left side panel and an opposite end coupled to said right side panel above said top rails, said front and rear latch handles being positioned to substantially overlie, respectively, said front and rear end panels.

3. A trash collection and compacting apparatus as set forth in claim 2 wherein said right side panel is rigidly secured to said bottom and said left side panel is pivotally attached to said bottom with said front and rear end panels being rigidly secured to said left side panel; and latch means for releasably coupling said front and rear end panels to said right side panel such that upon release of said latch means, said left side panel and said front and rear end panels can be pivoted laterally away from said right side panel.

4. A trash collection and compacting apparatus as set forth in claim 3 wherein said front and rear latch handles are each pivotally attached at said other end to said right side panel for rotational movement about a generally vertical axis, and including independent lock means for releasably locking said one end of each of said latch handles to said left side panel.

5. A trash collection and compacting apparatus as set forth in claim 4 wherein said latch means include: a front latch member attached to said front end panel; a rear latch member attached to said rear end panel; a releasable front latch operator coupled to said right side panel and engageable with said front latch member; a releasable rear latch operator coupled to said right side panel and engageable with said rear latch member; and means coupled with each of said front and rear latch handles for independently operating said front and rear latch operators in response to pivotal movement of said latch handle about said other end.

6. A trash collection and compacting apparatus as set forth in claim 5 wherein said independent lock means each include a latch finger formed on said one end of said latch handle engageable with a latch lock secured to said left side panel, and a releasable latch block pivotally coupled to said left side panel and engageable with said latch finger to hold said latch finger engaged with said latch lock.

7. A trash collection and compacting apparatus as set forth in claim 6 wherein said latch block includes a spring biased plunger engageable with said latch finger to hold said finger engaged with said latch lock, and means operable to retract said plunger against the bias of said spring to move said plunger out of engagement with said latch finger and permit said latch finger to be disengaged from said latch lock.

8. A trash collection and compacting apparatus as set forth in claim 1 wherein said trolley unit further includes generally rectangular shaped fire door plates, one pivotally attached to each of said left and right side panels, and each movable between a first inoperative position disposed vertically against said side panel and a second operative position disposed horizontally over said upwardly open trash chamber, thereby closing said chamber.

9. A trash collection and compacting apparatus as set forth in claim 8 wherein each of said fire door plates is magnetically retained in said inoperative position.

10. A trash collection and compacting apparatus as set forth in claim 1 including means for suspending said trolley unit from said compactor unit such that downwardly directed compaction forces generated on said trolley bottom by said compaction ram are transferred to said support rails through said top rails, and upwardly directed reactive forces in said compaction ram are also transmitted to said support rails such that said compaction forces are canceled by said reactive forces.

11. A trash collection and compacting apparatus as set forth in claim 10 including means permitting said wheels of said trolley unit to move upwardly relative to said trolley bottom such that said trolley unit is suspended by said top rails from said support rails of said compactor unit.

12. A trash collection and compacting apparatus as set forth in claim 10 wherein said compactor unit includes releasable interlock means engageable with said trolley unit for releasably locking said trolley unit to said compactor unit with said top rails fully mated with said support rails.

13. A trash collection and compacting apparatus as set forth in claim 12 wherein said right side panel of said trolley unit is rigidly secured to said bottom and said left side panel is pivotally attached to said bottom, said left side panel being rigidly secured to said end panels, and including locking means for releasably coupling said end panels to said right side panel such that upon release of said locking means, said left side panel can be pivoted about said bottom to move laterally away from said right side panel.

14. A trash collection and compacting apparatus as set forth in claim 10 wherein said trolley unit includes at least two separate upwardly open trash chambers, and said compactor unit includes a carriage assembly moveably carried by said upper frame section, said compaction ram being coupled with said carriage assembly for movement therewith, and means for moving said carriage assembly to discrete positions on said upper frame section overlying each of said separate trash chambers of said trolley unit.

15. A trash collection and compacting apparatus as set forth in claim 10 wherein said trolley unit includes three longitudinally spaced separate trash chambers formed by two longitudinally spaced vertically extending dividing panels each secured to said right side panel inwardly of said end panels.

16. A trash collection and compacting apparatus as set forth in claim 15 wherein said right side panel of said trolley unit is rigidly secured to said bottom and said left side panel is pivotally attached to said bottom, said left side panel being rigidly secured to said end panels, and including locking means for releasably coupling said end panels to said right side panel such that upon release of said locking means, said left side panel can be pivoted about said bottom to move laterally away from said right side panel.

17. A trash collection and compacting apparatus as set forth in claim 16 including individual latch means carried by each of said dividing panels for releasably securing said dividing panels to said left side panel.

18. A trash collection and compacting apparatus as set forth in claim 17 wherein said compactor unit includes a carriage assembly moveably carried by said upper frame section, said compaction ram being coupled with said carriage assembly for movement therewith, and means for moving said carriage assembly to discrete positions on said upper frame section overlying each of said separate trash chambers of said trolley unit.

19. A trash collection and compacting apparatus as set forth in claim 18 including a single handle operator attached to said left side panel for simultaneously releasing each of said individual latch means to uncouple both of said dividing panels from said left side panel.

20. A trash collection and compacting apparatus as set forth in claim 19 wherein said trolley unit further includes front and rear elongated latch handles disposed to extend laterally between said left and right side panels above said top rails, each of said latch handles including separate means for independently operating said locking means releasably coupling said front and rear end panels to said right side panel.

21. A trash collection and compacting apparatus as set forth in claim 20 wherein each of said trash bins is box-shaped having a bottom and four upstanding sidewalls, and means for releasably coupling one of said four sidewalls to the other three remaining sidewalls such that said one sidewall can be separated to facilitate dumping of compacted trash from said bin.

22. A trash collection and compacting apparatus as set forth in claim 20 wherein said trolley unit includes fire door panels mounted to said left and right side panels and which can be positioned to overlie horizontally said open upper ends of said bins and said chambers to close the same.

23. A trash collection and compacting apparatus comprising:
a movable trolley unit including:
a generally rectangular box-shaped frame having a generally horizontally disposed bottom defining front and rear longitudinally spaced ends and laterally spaced left and right sides; a right side panel rigidly secured to said right side of said bottom and projecting upwardly therefrom; a left side panel pivotally attached to said bottom by a hinge and projecting upwardly therefrom; and front and rear vertical end panels rigidly secured to said left side panel; releasable locking means for rigidly coupling each of said end panels to said right side panel; a pair of longitudinally spaced vertical dividing walls rigidly attached to said right side panel and extending vertically over said bottom between said front and rear ends; latch means for releasably securing each of said dividing panels to said left side panel thereby to form with said side panels and said end panels front, middle and rear upwardly open chambers; and a pair of longitudinally extending elongated top rails, one rigidly secured to each of said left and right side panels; and wheels mounted to said bottom to project downwardly therefrom for movably supporting said trolley unit; and
a compactor unit including:
a rigid frame defining vertically spaced upper and lower support surfaces, said upper support surface of said frame including a pair of longitudinally projecting laterally spaced support rails adapted to engage with said top rails of said trolley unit and to support said trolley unit thereon, a carriage assembly movably mounted to said upper support surface, said carriage assembly having a compaction ram projecting downwardly therefrom, said compaction ram including an extendable and retractable compaction platen coupled therewith and movable between a retracted inoperative position and on extended compacting position; and means for selectively moving said carriage assembly along said upper support surface and for discretely positioning said compaction ram to separately extend said platen into each of said front, middle and rear chambers of said trolley unit.

24. A trash collection and compacting apparatus as set forth in claim 23 wherein said trolley unit includes front and rear horizontally disposed and laterally extending elongated latch handles each having one end coupled to said left side panel and an opposite end coupled to said right side panel above said top rails, said front and rear latch handles being positioned to substantially overlie, respectively, said front and rear end panels.

25. A trash collection and compacting apparatus as set forth in claim 24 wherein said front and rear latch handles are each pivotally attached at said other end to said right side panel for rotational movement about a generally vertical axis, and including independent lock means for releasably locking said one end of each of said latch handles to said left side panel.

26. A trash collection and compacting apparatus as set forth in claim 25 wherein said releasable lock means include: a front locking member attached to said front end panel; a rear locking member attached to said rear end panel; a releasable front latch operator coupled to said right side panel and engageable with said front locking member; a releasable rear latch operator coupled to said right side panel and engageable with said rear locking member; and means coupled with each of said front and rear latch handles for independently operating said front and rear latch operators in response to pivotal movement of said latch handle about said other end.

27. A trash collection and compacting apparatus as set forth in claim 26 wherein said independent lock means each include a latch finger formed on said one end of said latch handle engageable with a latch lock secured to said left side panel, and a releasable latch block pivotally coupled to said left side panel and engageable with said latch finger to hold said latch finger engaged with said latch lock.

28. A trash collection and compacting apparatus as set forth in claim 27 wherein said latch block includes a spring biased plunger engageable with said latch finger to hold said finger engaged with said latch lock, and means operable to retract said plunger against the bias of said spring to move said plunger out of engagement with said latch finger and permit said latch finger to be disengaged from said latch lock.

29. A trash collection and compacting apparatus as set forth in claim 28 wherein said trolley unit further includes generally rectangular shaped fire door plates, one pivotally attached to each of said left and right side panels, and each movable between a first inoperative position disposed vertically against said side panel and a second operative position disposed to extend horizontally over each of said front, middle and rear upwardly open trash chambers, thereby closing said chambers.

30. A trash collection and compacting apparatus as set forth in claim 29 wherein each of said fire door plates is magnetically retained in said inoperative position.

31. A trash collection and compacting apparatus as set forth in claim 23 including means for suspending said trolley unit from said compactor unit such that downwardly directed compaction forces generated on said trolley bottom by said compaction ram are transferred to said support rails through said top rails, and upwardly directed reactive forces in said compaction ram are also transmitted to said support rails such that said compaction forces are canceled by said reactive forces.

32. A trash collection and compacting apparatus as set forth in claim 31 including means permitting said wheels of said trolley unit to move upwardly relative to said trolley bottom such that said trolley unit is suspended by said top rails from said support rails of said compactor unit.

33. A trash collection and compacting apparatus as set forth in claim 31 wherein said compactor unit includes releasable interlock means engageable with said trolley unit for releasably locking said trolley unit to said compactor unit with said top rails fully mated with said support rails.

34. A trash collection and compacting apparatus as set forth in claim 33 wherein said compactor unit includes switch means coupled to said interlock means and which prevents said compaction ram from extending said platen when said trolley unit is unlocked from said compactor unit.

35. A trash collection and compacting apparatus as set forth in claim 34 wherein said compactor unit further includes interlock switch means for independently preventing said compaction ram from extending when said trolley unit is not fully mated with said compactor unit.

36. A trash collection and compacting apparatus as set forth in claim 31 including a single handle operator attached to said left side panel for simultaneously releasing each of said individual latch means to uncouple both of said dividing panels from said left side panel.

37. A trash collection and compacting apparatus as set forth in claim 36 wherein said trolley unit further includes front and rear elongated latch handles disposed to extend laterally between said left and right side panels above said top rails, each of said latch handles including separate means for independently operating said locking means releasably coupling said front and rear end panels to said right side panel.

38. A trash collection and compacting apparatus as set forth in claim 37 wherein a removable open upper ended trash bin is disposed in each of said front, middle and rear chambers, said trash bin being adapted to receive trash collected in said trolley unit and to have collected trash compacted therein by said compaction ram.

39. A trash collection and compacting apparatus as set forth in claim 38 wherein said trolley unit includes fire door panels mounted to said left and right side panels and which can be positioned to overlie horizontally said open upper ends of said bins and said chambers to close the same.

40. A trash collection and compacting apparatus as set forth in claim 23 including position sensing means mounted on said upper support surface and on said carriage assembly for accurately positioning said compaction ram discretely over each of said front, middle and rear chambers.

41. A trash collection and compacting apparatus as set forth in claim 23 wherein said compactor unit includes a hydraulic fluid system coupled with said compaction ram for extending and retracting said compacting platen, said hydraulic fluid system including fluid level sensor means operable to retract said platen if a low hydraulic fluid condition exists in said hydraulic fluid system.

42. A trash collection and compacting apparatus as set forth in claim 23 wherein said compaction ram includes mechanical latch means for releasably locking said compaction platen in said retracted inoperative position.

43. A mobile trash collection trolley unit for use in combination with a compactor unit of the type including a rigid support frame defining a longitudinally extending upper frame portion having a pair of laterally spaced horizontal support rails extending longitudinally therealong, and a compaction ram mounted to said upper frame portion and including an extensible compacting platen projecting below said support rails, said trolley unit comprising:

a generally rectangular box-shaped frame defined by a generally rectangular shaped horizontal bottom with upstanding sides defining front and rear end panels, and left and right side panels;

at least one upwardly open trash chamber formed between said bottom, said end panels and said side panels;

latch means releasably coupling said left and right side panels together such that upon release of said latch means, said left and right side panels can be laterally separated relative to each other;

wheels rotatably attached to said bottom for moving said trolley unit over a surface for the collection of trash in said chamber; and a pair of generally horizontally disposed elongated top rails secured to said side panels and extending between said end panels, said top rails being adapted to mate with said support rails of said compactor unit with said compaction ram disposed to vertically overlie said chamber, whereby upon mating of said top rails of said trolley unit with said support rails of said trolley unit with said support rails of said compactor unit, extension of said compacting platen will move said platen downwardly into said chamber, thereby to compact the trash collected therein.

44. A mobile trash collection trolley unit as set forth in claim 43 wherein said trolley unit further includes a removable upwardly open trash bin disposed in said chamber, and within which trash is collected and compacted.

45. A mobile trash collection trolley unit as set forth in claims 43 wherein said right side panel is rigidly secured to said bottom and left side panel is pivotally attached to said bottom with said front and rear end panels being rigidly secured to said left side panel; and said latch means releasably coupling said front and rear end panels to said right side panel such that upon release of said latch means, said left side panel and said front and rear end panels can be pivoted laterally away from said right side panel.

46. A mobile trash collection trolley unit as set forth in claim 45 wherein said trolley unit includes front and rear horizontally disposed and laterally extending elongated latch handles each having one end coupled to said left side panel and an opposite end coupled to said right side panel above said top rails, said front and rear latch handles being positioned to substantially overlie, respectively, said front and rear end panels.

47. A mobile trash collection trolley unit as set forth in claim 46 wherein said front and rear latch handles are each pivotally attached at said other end to said right side panel for rotational movement about a generally vertical axis, and including independent lock means for releasably locking said one end of each of said latch handles to said left side panel.

48. A mobile trash collection trolley unit as set forth in claim 47 wherein said latch means include: a front latch member attached to said front end panel; a rear latch member attached to said rear end panel; a releasable front latch operator coupled to said right side panel and engageable with said front latch member; a releasable rear latch operator coupled to said right side panel and engageable with said rear latch member; and means coupled with each of said front and rear latch handles for independently operating said front and rear latch operators in response to pivotal movement of said latch handle about said other end.

49. A mobile trash collection trolley unit as set forth in claim 48 wherein said independent lock means each include a latch finger formed on said one end of said latch handle engageable with a latch lock secured to said left side panel, and a releasable latch block pivotally coupled to said left side panel and engageable with said latch finger to hold said latch finger engaged with said latch lock.

50. A mobile trash collection trolley unit as set forth in claim 49 wherein said latch block includes a spring biased plunger engageable with said latch finger to hold said finger engaged with said latch lock, and means operable to retract said plunger against the bias of said spring to move said plunger out of engagement with said latch finger and permit said latch finger to be disengaged from said latch lock.

51. A mobile trash collection trolley unit as set forth in claim 50 wherein said trolley unit further includes generally rectangular shaped fire door plates, one pivotally attached to each of said left and right side panels, and each movable between a first inoperative position disposed vertically against said side panel and a second operative position disposed horizontally over said upwardly open trash chamber, thereby closing said chamber.

52. A mobile trash collection trolley unit as set forth in claim 51 wherein each of said fire door plates is magnetically retained in said inoperative position.

53. A mobile trash collection trolley unit as set forth in claim 52 including means permitting said wheels of said trolley unit to move upwardly relative to said trolley bottom such that said trolley unit is suspended by said top rails from said support rails of said compactor unit.

54. A mobile trash collection trolley unit as set forth in claim 53 wherein said trolley unit includes three longitudinally spaced separate trash chambers formed by two longitudinally spaced vertically extending dividing panels each secured to said right side panel inwardly of said end panels.

55. A mobile trash collection trolley unit as set forth in claim 54 including individual latch means carried by each of said dividing panels for releasably securing said dividing panels to said left side panel.

56. A mobile trash collection trolley unit as set forth in claim 55 including a single handle operator attached to said left side panel for simultaneously releasing each of said individual latch means to uncouple both of said dividing panels from said left side panel.

57. A mobile trash collection trolley unit as set forth in claim 56 wherein said trolley unit further includes front and rear elongated latch handles disposed to extend laterally between said left and right side panels above said top rails, each of said latch handles including separate means for independently operating said locking means releasably coupling said front and rear end panels to said right side panel.

58. A mobile trash collection trolley unit as set forth in claim 57 wherein a removable open upper ended trash bin is disposed in each of said chambers, said trash bin being adapted to receive trash collected in said trolley unit and to have collected trash compacted therein by said compaction ram.

59. A mobile trash collection trolley unit as set forth in claim 58 wherein each of said dividing panels includes an upwardly projecting elongated brush extending laterally between said left and right side panels and projecting above said open upper end of said trash bin.

60. A trash collection and compacting apparatus comprising:

a trash compactor unit including:
   a rigid metal frame having front and rear ends and defining a generally horizontal elongated lower frame portion adapted to support said compactor unit on a surface, a generally vertical rear frame portion projecting upwardly from said lower frame portion, and a generally horizontal elongated upper frame portion projecting forwardly from said rear frame portion;
   a pair of laterally spaced elongated trolley support rails rigidly secured to said upper frame portion and extending longitudinally along the length thereof;
   a pair of laterally spaced elongated tracks coupled to said upper frame portion and extending longitudinally parallel with said support rails;
   a carriage assembly moveably supported on said tracks for longitudinal movement thereon between discrete preselected locations;
   a compaction ram mounted to said carriage assembly between said support rails, said compaction ram including an extensible compacting platen disposed below said support rails and vertically moveable between an upper retracted inoperative position and a lower extended compacting position;
   motor means mounted to said carriage assembly for moving said carriage assembly between said discrete preselected locations along said track;
   hydraulic fluid means mounted to said carriage assembly for moving said compaction platen between said retracted and extended positions; and
   control means mounted to said frame for actuating said motor means and said hydraulic fluid means; and
a moveable trash collection trolley unit having three longitudinally spaced upwardly open trash collection chambers formed therein, and adapted to be mated with said trash compactor unit for the compaction of trash in each of said chambers, said trash collection trolley unit including:
   a generally rectangular shaped bottom wall defining front and rear longitudinally spaced ends and left and right laterally spaced sides;
   a right side panel rigidly secured to said right side of said bottom and projecting upwardly therefrom;
   a left side panel pivotally attached to said left side of said bottom by a hinge and projecting upwardly therefrom;
   each of said right side and left side panels terminating upwardly in a longitudinally extending top rail adapted to mate with one of said trolley support rails of said compactor unit to suspend said trolley unit from said compactor unit;
   front and rear vertical end panels rigidly secured to said left side panel and extending upwardly from said bottom to a position vertically spaced substantially below said top rails, said front and rear end panels each including locking means for releasably coupling said end panel to said right side panel;
   a pair of longitudinally spaced vertical dividing panels rigidly attached to said right side panel and extending vertically over said bottom between said front and rear ends, and being spaced to define with said end panels and said side panels front, middle and rear longitudinally spaced chambers within said trolley unit, said dividing walls each having a vertical height substantially the same as said front and rear end panels, and including latch means for releasably coupling said panel to said left side panel;

front and rear elongated, generally rectangular shaped latch handles coupled to said left and right side panels adjacent, respectively, said front and rear ends and extending laterally therebetween, said latch handles each including means for uncoupling said latch handle from said left side panel; and four trolley support wheels attached to said bottom and projecting downwardly therefrom for permitting said trolley unit to be freely moved for the collection of trash in each of said chambers.

61. A trash collection and compacting apparatus as set forth in claim 60 wherein said trolley unit further includes generally rectangular shaped fire door plates, one pivotally attached to each of said left and right side panels, and each movable between a first inoperative position disposed vertically against said side panel and a second operative position disposed to extend horizontally over each of said front, middle and rear chambers, thereby closing said upwardly open trash collection chambers.

62. A trash collection and compacting apparatus as set forth in claim 60 wherein a removable open upper ended trash bin is disposed in each of said chambers, said trash bin being adapted to receive trash collected in said trolley unit and to have collected trash compacted therein by said compaction ram.

63. A trash collection and compacting apparatus as set forth in claim 62 wherein each of said trash bins is box-shaped having a bottom and four upstanding sidewalls, and means for releasably coupling one of said four sidewalls to the other three remaining sidewalls such that said one sidewall can be separated to facilitate dumping of compacted trash from said bin.

64. A trash collection and compacting apparatus as set forth in claim 60 including a single handle operator attached to said left side panel for simultaneously releasing each of said latch means to uncouple both of said dividing panels from said left side panel.

65. A trash collection and compacting apparatus as set forth in claim 64 wherein each of said latch handles including separate means for independently operating said locking means releasably coupling said front and rear end panels to said right side panel.

66. A trash collection and compacting apparatus as set forth in claim 60 including means permitting said wheels of said trolley unit to move upwardly relative to said bottom such that said trolley unit is suspended by said top rails from said trolley support rails of said compactor unit.

67. A trash collection and compacting apparatus as set forth in claim 67 wherein said discrete preselected locations of said carriage assembly correspond to the positions of said front, middle and rear chambers of said trolley unit when said trolley unit is supported by said trolley support rails of said compactor unit.

68. A trash collection and compacting apparatus as set forth in claim 67 wherein said compactor unit includes position sensing means cooperatively mounted on said upper frame portion and on said carriage assembly for accurately positioning said carriage assembly with said compaction ram precisely over each of said front, middle and rear chambers.

69. A trash collection and compacting apparatus as set forth in claim 68 wherein said compactor unit includes releasable interlock means engageable with said trolley unit for releasably locking said trolley unit to said compactor unit with said top rails fully mated with said trolley support rails.

70. A trash collection and compacting apparatus as set forth in claim 67 including interlock switch means coupled to said upper frame portion for preventing said motor means from moving said carriage assembly and for preventing said hydraulic fluid means from extending and retracting said compacting platen when said trolley unit is not supported by said trolley support rails of said compactor unit.

71. A trash collection and compacting apparatus as set forth in claim 70 wherein said interlock switch means includes multiple switch means attached to said support frame at predetermined positions to be operated by said trolley unit when said trolley unit is fully mated with said compactor unit and supported by said trolley support rails.

72. A trash collection and compacting apparatus as set forth in claim 71 including a clean switch means coupled to said support frame for overriding said interlock switch means to permit said hydraulic fluid means to extend and retract said compaction platen when said trash collection trolley unit is not supported on said compactor unit.

73. A trash collection and compacting apparatus as set forth in claim 70 wherein said compactor unit further including mechanical latch means for releasably retaining said compacting platen in its retracted inoperative position.

74. A trash collection and compacting apparatus as set forth in claim 73 including platen switch means carried by said carriage assembly for preventing said motor means from moving said carriage assembly when said compacting platen is not latched in its retracted inoperative position.

75. A trash collection and compacting apparatus as set forth in claim 70 wherein said hydraulic fluid means includes a hydraulic fluid pump and a hydraulic fluid reservoir, said hydraulic fluid reservoir including fluid level sensor means operable to retract said compaction platen when a low hydraulic fluid condition exists in said hydraulic fluid reservoir.

76. A trash collection and compacting apparatus as set forth in claim 60 wherein said trash collection trolley unit includes a liquid retaining pan supported by said bottom and extending between said end panels and said side panels, said liquid retaining pan preventing liquid collected in said front, middle and rear chambers from leaking from said trolley unit.

77. A trash collection and compacting apparatus as set forth in claim 76 wherein said liquid retaining pan includes a drain opening through which liquids can be drained from said pan, and a removable drain plug for normally closing said drain opening.

78. A trash collection and compacting apparatus as set forth in claim 60 wherein said compactor unit includes frame support wheels pivotally mounted to said lower frame portion, said support wheel being selectively moveable between an inactive position above said lower frame portion, and an operative position projecting below said lower frame portion for supporting said frame above said surface.

79. A trash collection and compacting apparatus as set forth in claim 78 wherein said frame support wheels are moved between said inactive and operative positions by a rotatable handle, said handle being disposed to be engaged by said trolley unit when said wheels are in the operative position and to be rotated to move said wheels automatically to said inactive position when said trolley unit is mated with said compactor unit.

\* \* \* \* \*